United States Patent
Ding et al.

(10) Patent No.: US 9,813,494 B2
(45) Date of Patent: Nov. 7, 2017

(54) CONTEXT-AWARE PEER-TO-PEER COMMUNICATION

(71) Applicant: InterDigital Patent Holdings, Inc., Wilmington, DE (US)

(72) Inventors: Zongrui Ding, Portland, OR (US); Chonggang Wang, Princeton, NJ (US); Paul L. Russell, Jr., Pennington, NJ (US); Qing Li, Princeton Junction, NJ (US); Hongkun Li, Malvern, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 249 days.

(21) Appl. No.: 14/400,279

(22) PCT Filed: May 9, 2013

(86) PCT No.: PCT/US2013/040260
§ 371 (c)(1),
(2) Date: Nov. 10, 2014

(87) PCT Pub. No.: WO2013/169974
PCT Pub. Date: Nov. 14, 2013

(65) Prior Publication Data
US 2015/0127733 A1    May 7, 2015

Related U.S. Application Data

(60) Provisional application No. 61/645,922, filed on May 11, 2012, provisional application No. 61/645,051, (Continued)

(51) Int. Cl.
*G06F 15/16* (2006.01)
*H04L 29/08* (2006.01)
(Continued)

(52) U.S. Cl.
CPC ............ *H04L 67/104* (2013.01); *H04L 67/16* (2013.01); *H04W 4/005* (2013.01); *H04W 4/08* (2013.01);
(Continued)

(58) Field of Classification Search
None
See application file for complete search history.

(56) References Cited

U.S. PATENT DOCUMENTS 7,739,402 B2 * 6/2010 Roese ................. G01S 5/02
709/242
2002/0049049 A1   4/2002 Sandahl et al.
(Continued)

FOREIGN PATENT DOCUMENTS

WO   WO 2012/006446 A1   1/2012
WO   WO 2013/169974 A1   11/2013

OTHER PUBLICATIONS

3rd Generation Partnership Project (3GPP), S1-120059, "Suggested D2D Terminologies (Operator Managed, Operator Assisted, Operator Free)", Intel Corporation, 3GPP TSG-SA WG1 Meeting #57, Kyoto, Japan, Feb. 13-17, 2012, 3 pages.
(Continued)

*Primary Examiner* — Brian Whipple
(74) *Attorney, Agent, or Firm* — Condo Roccia Koptiw LLP

(57) ABSTRACT

Methods and systems are disclosed for determining context information for one or more peers to be used in a peer discovery and/or peer association process(es) and/or to otherwise facilitate P2P proximity communications. For example, a method for determining peer context information may include receiving a context-aware identifier (CAID). The CAID may include one or more items of context information associated with the peer in addition to an
(Continued)

indication of an identity of the peer. A first portion of the CAID may be decoded to determine a first item of context information associated with the peer. The first portion of the CAID may be decodable without having to process a payload portion of the message. It may be determined whether to continue processing one or more of the CAID or the message based on the first item of context information. The CAID may be used in discovery and/or association procedure(s).

20 Claims, 36 Drawing Sheets

Related U.S. Application Data filed on May 11, 2012, provisional application No. 61/645,902, filed on May 11, 2012, provisional application No. 61/730,652, filed on Nov. 28, 2012, provisional application No. 61/730,657, filed on Nov. 28, 2012, provisional application No. 61/730,688, filed on Nov. 28, 2012.

(51) Int. Cl.
*H04W 4/08* (2009.01)
*H04W 8/00* (2009.01)
*H04W 8/24* (2009.01)
*H04W 4/00* (2009.01)
*H04W 76/02* (2009.01)

(52) U.S. Cl.
CPC ............ *H04W 8/005* (2013.01); *H04W 8/24* (2013.01); *H04W 76/023* (2013.01)

(56) References Cited

U.S. PATENT DOCUMENTS

| | | | |
|---|---|---|---|
| 2006/0164995 A1* | 7/2006 | Djernaes | H04L 45/02 370/238 |
| 2007/0110025 A1* | 5/2007 | Guichard | H04L 63/0272 370/351 |
| 2009/0016255 A1 | 1/2009 | Park | |
| 2009/0323647 A1 | 12/2009 | Park et al. | |
| 2010/0332583 A1 | 12/2010 | Szabo | |
| 2011/0223937 A1 | 9/2011 | Leppänen et al. | |
| 2012/0011247 A1 | 1/2012 | Mallik et al. | |
| 2012/0102073 A1 | 4/2012 | Patel | |
| 2014/0219107 A1* | 8/2014 | Racz | H04L 41/0631 370/242 |

OTHER PUBLICATIONS

3rd Generation Partnership Project (3GPP), TR 22.803 V0.2.0, "Technical Specification Group SA, Feasibility Study for Proximity Services (ProSe) (Release 12)", Feb. 2012, pp. 1-18.
Heile et al., "Wireless Medium Access Control (MAC) and Physical Layer (PHY) Specifications for Peer Aware Communications (PAC)", IEEE P802.15.8, Feb. 8, 2012, 2 pages.
IEEE, "IEEE Standard for Local and Metropolitan Area Networks-Part 15.4: Low-Rate Wireless Personal Area Networks (LR-WPANs)—Amendment 5: Physical Layer Specifications for Low Energy, Critical Infrastructure Monitoring Networks", IEEE Std 802.15.4k™ -2013, IEEE Computer Society, Jun. 2013, 148 pages.
IEEE, "IEEE Standard for Local and Metropolitan Area Networks-Part 15.4: Low-Rate Wireless Personal Area Networks (LR-WPANs)", IEEE Std 802.15.4™ -2011, IEEE Computer Society, Sep. 5, 2011, 314 pages.
IEEE, "MAC Enhancement for IEEE 802.15.4-2006", IEEE 802.15.4e, IEEE 802.15 WPAN™ Task Group 4e (TG4e), Available at http://www.ieee802.org/15/pub/TG4e.html, 2006, 2 pages.
Lee et al., "PAC Introduction", Project: IEEE P802.15 Working Group for Wireless Personal Area Networks (WPANs), IEEE 802.15/12/0004-01-0pac, Jan. 2012, 20 pages.
Lee, "Peer Aware Communications (PAC) Study Group 5 Criteria", IEEE P802.15 Wireless Personal Area Networks (WPANs), IEEE 802.15/12/0064-01, Jan. 2012, 4 pages.

* cited by examiner

| Octets: variable | 1 | 1 |
|---|---|---|
| MHR fields | Command Frame Identifier | Capability Information |

| Bits: 0 | 1 | 2 | 3 | 4-5 | 6 | 7 |
|---|---|---|---|---|---|---|
| Reserved | Device Type | Power Source | Receiver On When Idle | Reserved | Security Capability | Allocate Address |

| Octets: variable | 1 | 2 | 1 |
|---|---|---|---|
| MHR fields | Command Frame Identifier | Short Address | Association Status |

FIG. 14

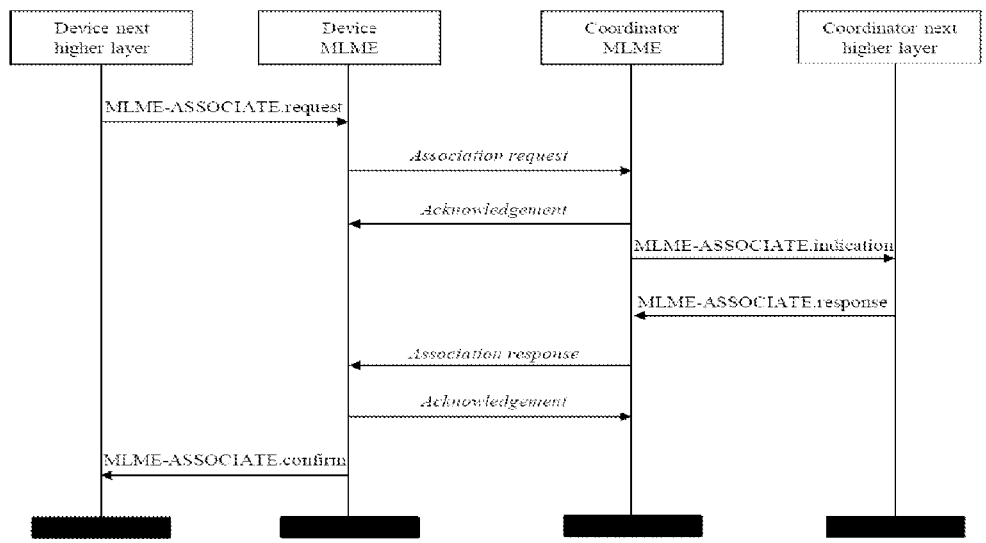

FIG. 15

| Octets: variable (refer to 5.2.2.4.1) | 1 | 1 | 1 | 2 |
|---|---|---|---|---|
| MHR fields | Command Frame Identifier (defined in Table 5) | Capability Information | Hopping Sequence ID | Channel Offset |

FIG. 16

| Octets: variable (refer to 5.2.2.4.1) | 1 | 2 | 1 | 1 | Variable |
|---|---|---|---|---|---|
| MHR fields | Command Frame Identifier (defined in Table 5) | Short Address | Association Status | Hopping Sequence Length | Hopping Sequence |

FIG. 17

| Octets: variable | 1 | 1 |
|---|---|---|
| MHR fields (5.2.2.4.1) | Command Frame Identifier (Table 5) | Capability Information (5.3.1.2) |
FIG. 18
| Octets: variable | 1 | 2 | 1 | variable |
|---|---|---|---|---|
| MHR fields (5.2.2.4.1) | Command Frame Identifier (Table 5) | Short Address (5.3.2.2) | Association Status (5.3.2.3) | Beacon Bitmap (5.2.4.24.3) |
FIG. 19
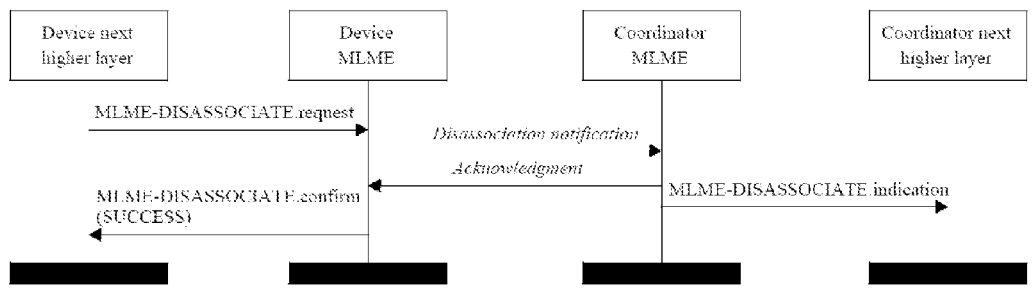
FIG. 20
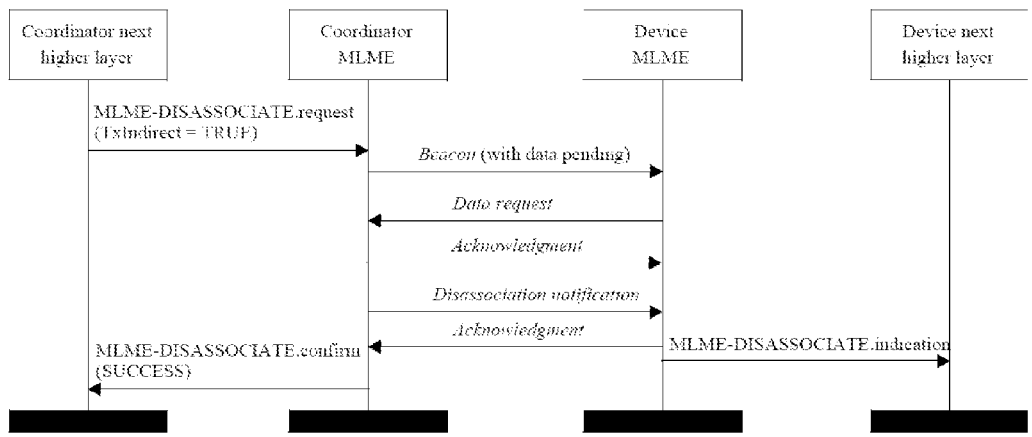
FIG. 21

| Octets: variable | 1 | 1 |
|---|---|---|
| MHR fields | Command Frame Identifier | Disassociation Reason |
FIG. 22
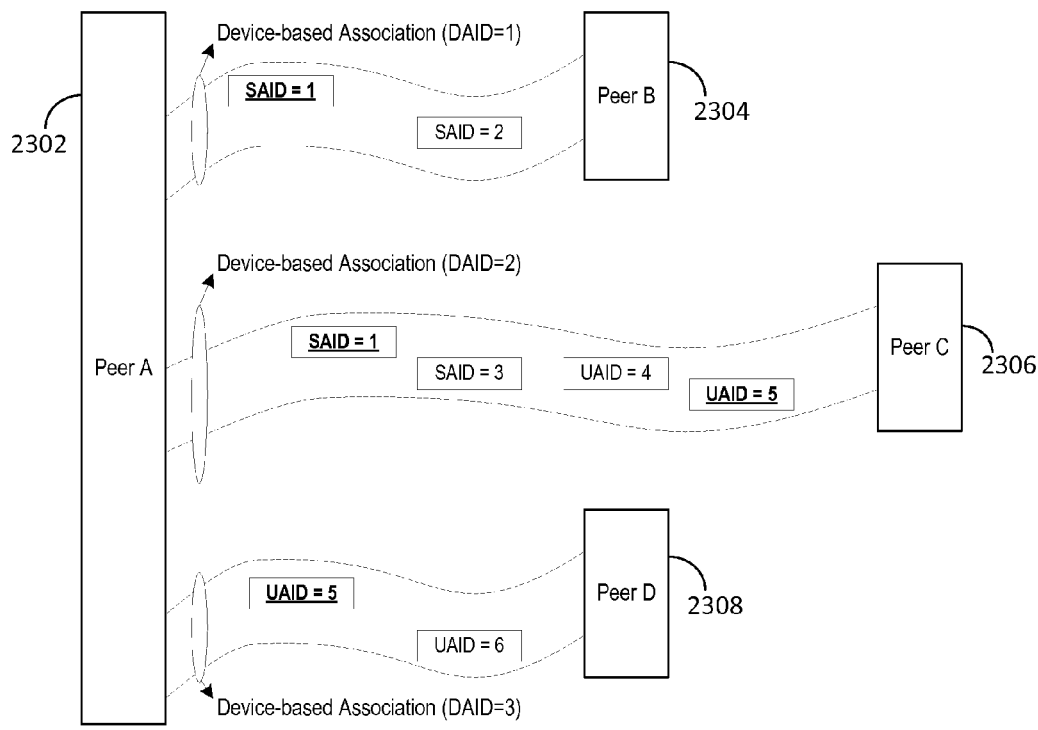
FIG. 23
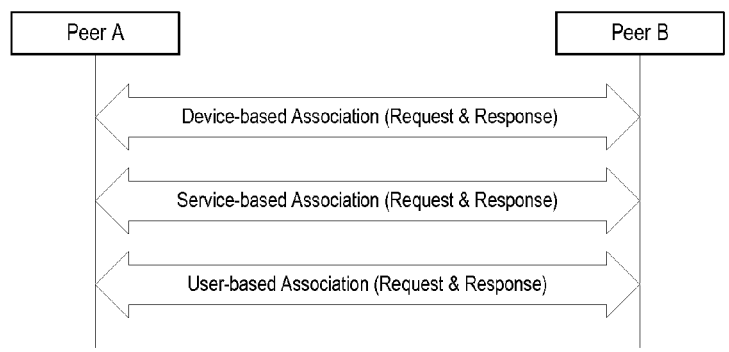
FIG. 24

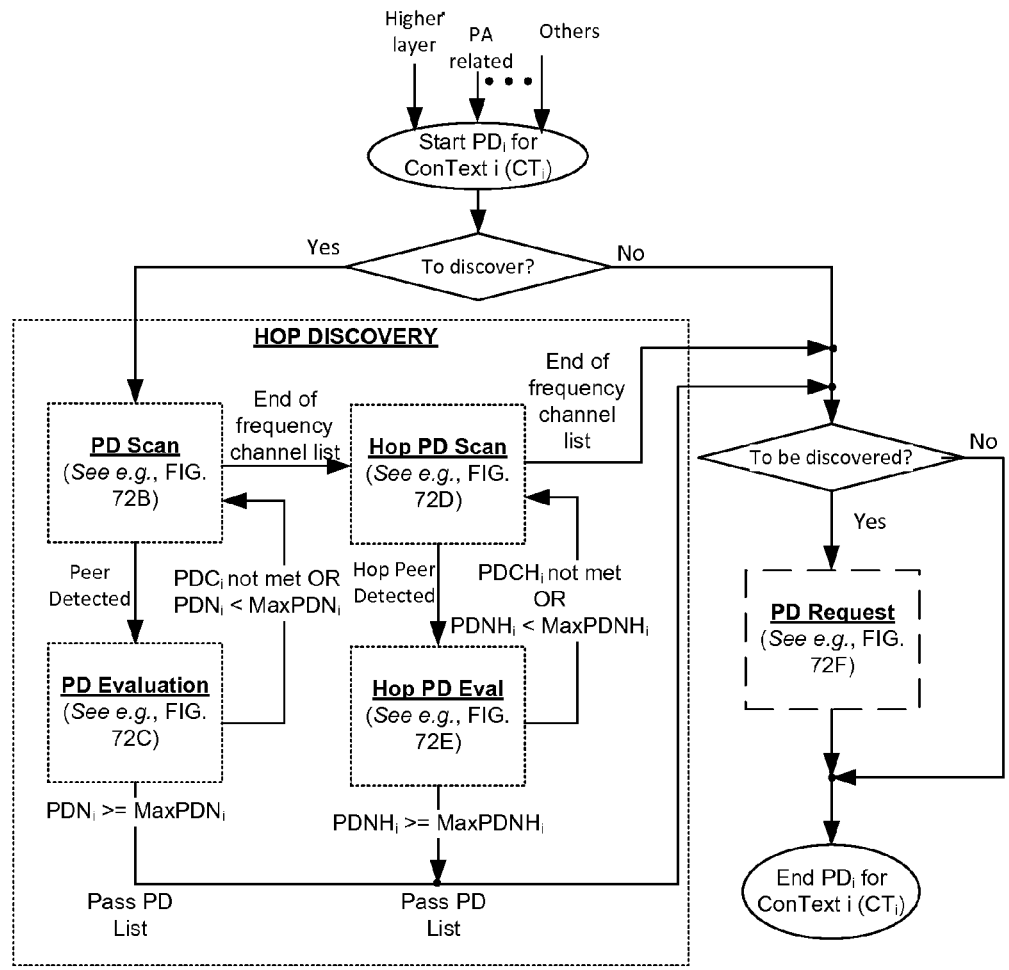

CT$_i$: ConText i, the desired context of the Context-Aware Category (CACat) list
PD$_i$: Peer Discovery for CTi
FC$_j^i$: Frequency Channel number j for CTi
FCL$_i$: Frequency Channel List for CTi
T$_{PDSi}$: Time window for Peer Discovery Scanning for CTi
PDC$_i$: Peer Discovery Criteria for CTi
PDCH$_i$: Peer Discovery Criteria Hop for CTi
PD$_j^{i,k}$: k Peers Discovered on frequency channel j for CTi
PDL$_j^i$: Peer Discovered List on frequency channel j for CTi
PDLH$_j^i$: Peer Discovered List Hop on frequency channel j for CTi
PDP$_j^i$: Peer Discovered Parameters on frequency channel j for CTi
PDPH$_j^i$: Peer Discovered Parameters Hop on frequency channel j for CTi
PDN$_i$: total Peer Discovered Number for CTi
PDNH$_i$: total Peer Discovered Number Hop for CTi
MaxPDN$_i$: Max required PDN for CTi
MaxPDNH$_i$: Max required PDNH for CTi
PDR$_i$: Peer Discovery Request for CTi
T$_{PDRi}$: Time interval or period of sending PDR for CTi
T$_{PDRmax}$: max Time interval for PDR for CTi
PAR$_i$: Peer Association Response for CTi

CONTEXT-AWARE PEER-TO-PEER COMMUNICATION

CROSS-REFERENCE TO RELATED APPLICATIONS

This application is the National Stage Entry under 35 U.S.C.§371 of Patent Cooperation Treaty Application No. PCT/US2013/040260, filed May 9,2013, which claims the benefit of U.S. Provisional Patent Application No. 61/645, 902, filed May 11, 2012; U.S. Provisional Patent Application No. 61/645,922, filed May 11, 2012; U.S. Provisional Patent Application No. 61/646,051, filed May 11, 2012; U.S. Provisional Patent Application No. 61/730,652, filed Nov. 28, 2012; U.S. Provisional Patent Application No. 61/730, 657, filed Nov. 28, 2012; and U.S. Provisional Patent Application No. 61/730,688, filed Nov. 28, 2012; the contents of which are hereby incorporated by reference in their entirety.

BACKGROUND

Peer-to-Peer (P2P) proximity communication may utilize knowledge of the proximity of one or more peers in order to communicate information utilized for applications or services in an infrastructure-based and/or infrastructure-less configuration. P2P proximity communication may be implemented in using a centralized system and/or a fully distributed system without a central controller. The term peer may refer to a user, a user device, and/or multiple devices associated with a given user such as MS in 2G, a UE in 3GPP, an FFD or RFD in IEEE 802.15 (WPAN), and/or other types of WTRUs. Examples of P2P devices that may utilize P2P proximity communication techniques may include cars, medical devices, smart meters, smart phones, tablets, laptops, game consoles, set-top boxes, cameras, printers, sensors, home gateways, and/or the like. Compared to infrastructure-less P2P communications, infrastructure-based communications typically utilize a centralized controller for handling user information, scheduling among users, and/or performing connection management. For example, cellular communications systems may be utilized for infrastructure-based P2P communication systems. In infrastructure-less P2P communications, peers may have equal and/or shared responsibility for initiating, maintaining, and/or terminating a given session.

SUMMARY

Methods and systems are disclosed for determining context information for one or more peers to be used in a peer discovery and/or peer association process(es) and/or to otherwise facilitate peer-to-peer (P2P) proximity communications. For example, a method for determining peer context information may include detecting or receiving a message (e.g., from a peer or peer device). The message may include a context-aware identifier (CAID). The CAID may include one or more items of context information associated with the peer in addition to an indication of an identity of the peer. The method may further include determining (e.g., decoding) a first portion of the CAID to determine a first item of context information associated with the peer. The first portion of the CAID may be decodable without having to process a payload portion of the message. The method may further include determining whether to continue processing one or more of the CAID or the message based on the first item of context information.

For example, the first item of context information may include an indication of a context-aware category (CACat), and the CACat may be associated with a service type that the peer is attempting to establish P2P proximity communications for. Thus, determining whether to continue processing one or more of the CAID or the message based on the first item of context information may include determining if a local service is associated with the CACat, and determining to continue processing one or more of the CAID or the message when it is determined that the local service is associated with the CACat. A second portion of the CAID may be decoded to determine a second item of context information associated with the peer based on determining to continue processing the CAID when it is determined that the local service is associated with the CACat. The second item of context information may include an indication of an application associated with the CACat. It may be determined whether a local instance of the application is being executed. If so, the local peer may determine to continue processing one or more of the CAID or the message when it is determined that the local instance of the application is being executed.

Further, a third portion of the CAID may be decoded to determine a third item of context information associated with the peer based on determining to continue processing the CAID when it is determined that the local instance of the application is being executed. For example, the third item of context information may include an indication of a user identity for the peer. It may be determined if a local user is interested in communicating with a peer user associated with the user identity for the peer. For example, it may be determined to continue processing one or more of the CAID or the message when it is determined that the local user is interested in communicating with the peer user associated with the user identity for the peer.

The CAID may include various sub-identifiers or other items of context information such as other personal information (PI) for a peer (e.g., the CAID may be a subset of PI for the peer and may include various types of PI for the peer). One or more of a user-based association identifier (UAID), a device-based association identifier (DAID), and/or a service-based association identifier (SAID) may be derived for the peer during an association procedure based on context information indicated by the CAID for the peer. For example, UAIDs, DAIDs, and/or SAIDs may be association-related identifiers that may be derived and/or utilized as association-specific CAIDs for association-related actions. In an example, the CAID may be a hierarchal identifier and a lower level of the hierarchal identifier may be decoded on condition a higher level of the hierarchal identifier indicates a service that is of interest to a decoding peer. The CAID may include multi-hop information for communicating with the peer. A local peer may attempt to associate with the peer based on the one or more items of context information associated with the peer comprised in the CAID. The CAID may be encoded using one or more of a orthogonal code or pseudo-random number (PN) and/or security key sequence derived from the one or more items of context information and/or received from higher layers such as service layer, application layer, etc.

Examples of peer device for discovering potential peers based on context information are disclosed. For example, the peer device may include a processor and may be configured to perform a peer discovery (PD) scan based on one or more desired items of context information. The peer device may be configured to identify a context-aware identifier (CAID) for a potential peer during the PD scan. The CAID may include one or more items of context information associated with the potential peer in addition to an indication of an identity of the potential peer. The peer device may be configured to perform a PD evaluation of the potential peer using the one or more items of context information associated with the potential peer to determine whether to initiate an association procedure with the potential peer.

The peer device may be configured to perform a PD request procedure in order to be discovered by the potential peer based on determining that the one or more items of context information associated with the potential peer match at least one item of context information for a local peer associated with the peer device. The peer device may be configured to broadcast a local CAID that indicates the at least one item of context information during the PR request procedure. The potential peer may be a multi-hop peer, and the CAID may indicate multi-hop information for the potential peer. The peer device may be configured to determine whether one or more of a plurality of broadcast CAIDs are associated with the desired items of context information. The plurality of broadcast CAIDs may be broadcast using one or more of code division multiplexing, time division multiplexing, or frequency division multiplexing based on context information included in the plurality of broadcast CAIDs. For example, code division multiplexing may be utilized and the plurality of CAIDs are broadcast substantially concurrently using the same time and frequency radio resources.

A wireless transmit receive unit (WTRU) may be an example of a peer device that is configured to associating with one or more other WTRUs in a given proximity in a context-aware manner. For example the WTRU may be configured to perform context-aware peer discovery based on context information broadcast using a context-aware identifier (CAID). The WTRU may be configured to select at least one peer for potential association based on a first item of context information encoded in a first portion of the CAID. The first portion of the CAID may be decodable without having to process a non-CAID portion of the broadcast. The WTRU may be configured to determine to associate with a peer corresponding to the CAID based on a second item of context information encoded in a second portion of the CAID.

In an example, a peer device may be configured to perform one or more different types of peer association (e.g., such as device-based peer association, service-based peer association, and user-based peer association) in a parallel and/or in a serial manner. Accordingly, device-based association identifiers (DAIDs), service-based association identifiers (SAIDs), and/or user-based association identifiers (UAIDs) may be used to identify each established association relationship and the context associated with the established association.

In an example, a peer device may be configured to conduct unified peer association procedure which may consist of one or more of a context-aware association, a context-aware association update, a context-aware disassociation, and a context-aware re-association. The unified peer association procedure may be leveraged for different purposes including configuring channel access parameters such as channel switch and duty-cycle schedule, configuring peer discovery parameters such as channel sequence to be scanned and discovery period.

In an example, the CAID may be broadcast by a peer that is a virtual leader for a service or application associated with the CAID. The WTRU may be configured to perform one or more of a context-aware association, a context-aware association update, a context-aware re-association, or a context-aware disassociation with a given peer in order to change the virtual leader for the service or application associated with the CAID.

The WTRU may be configured to associate with the peer corresponding to the CAID by associating with multiple peers using orthogonal association messages broadcast at substantially the same time. For example, the messages may a plurality of association requests and/or a plurality of association response. The WTRU may be configured to adjust a context aware peer discovery process based on context information determined during a context aware peer association process. The WTRU may be configured to associate with the peer corresponding to the CAID using an intermediary or relay peer. For example, the intermediary or relay peer may include one or more of a Node-B (NB) or an evolved Node-B (eNB) of a third generation partnership (3GPP) radio access network (RAN). The WTRU may be configured to concurrently perform a context-aware association procedure with two or more peers. The WTRU may be configured to concurrently perform a context-aware association procedure that establishes two or more of a service-based association, a device-based association, or a user-based association with the peer.

BRIEF DESCRIPTION OF THE DRAWING(S)

A more detailed understanding may be had from the following description, given by way of example in conjunction with the accompanying drawings wherein:

FIG. 14 illustrates an example of an association response command as defined in IEEE 802.15.4-2011.

FIG. 15 illustrates a signaling diagram for an example process for fast association as specified in IEEE 802.15.4e.

FIG. 16 illustrates an example DSME-association request command as defined in IEEE 802.15.4e.

FIG. 17 illustrates an example DSME-association response command as defined in IEEE 802.15.4e.

FIG. 18 illustrates an example RSLN-association request command as defined in IEEE 802.15.4 k.

FIG. 19 illustrates an example RSLN-association response command as defined in IEEE 802.15.4 k.

FIG. 20 illustrates a signaling diagrams of an example process for disassociation initiated by a device.

FIG. 21 illustrates a signaling diagrams of an example process for disassociation initiated by a coordinator.

FIG. 22 illustrates an example of a disassociation notification format as defined in IEEE 802.15.4-2011.

FIG. 23 illustrates examples of context-aware association that may be performed at different levels such as one or more of a device-based association, service-based association, and/or user-based association.

FIG. 24 illustrates an example of separate device-based association, service-based association, and user-based association.

FIG. 72A illustrates an example context-aware hop discovery process.

DETAILED DESCRIPTION

Figure 1A:
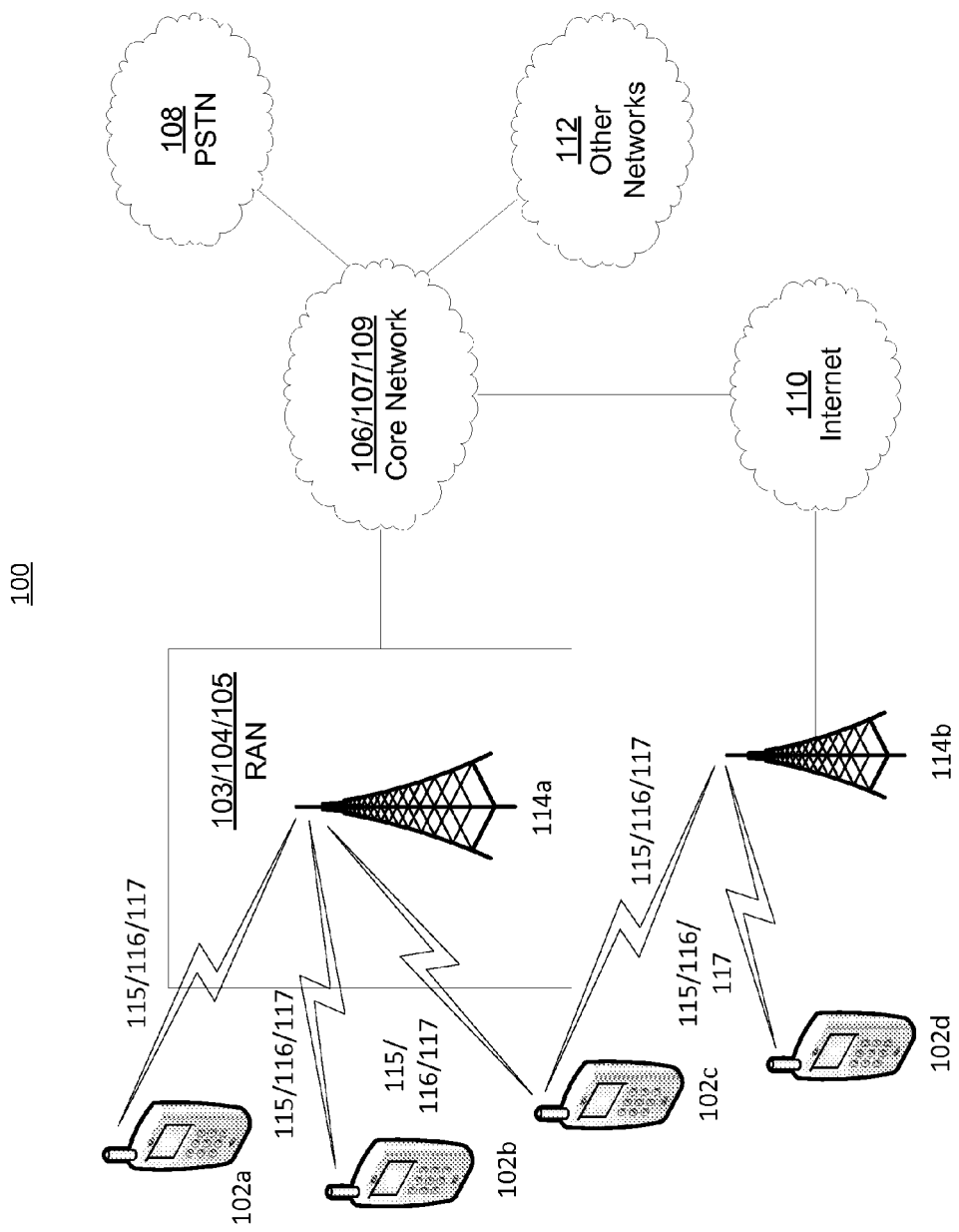
FIG. 1A is a system diagram of an example communications system in which one or more disclosed embodiments may be implemented.

A detailed description of illustrative embodiments will now be described with reference to the various figures. Although this description provides a detailed example of possible implementations, it should be noted that the details are intended to be exemplary and in no way limit the scope of the application.

When referred to hereafter, the terminology "wireless transmit/receive unit (WTRU)" may include but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" may include but is not limited to an evolved Node-B, a site controller, an access point (AP), or any other type of interfacing device capable of operating in a wireless environment.

WTRUs may include a transmitter and/or receiver (e.g., transmitters and/or receivers may be referred to collectively and/or individually as a transceiver). The transceiver may utilize methods to detect the operation of other WTRUs within its general vicinity. For example, typical transceiver functions used to scan channels in the spectrum may include Energy Detect (ED), Carrier Sense (CS) and Clear Channel Assessment (CCA) mechanisms. Some typical definitions of ED/CS/CCA receive power mechanisms are as follows: the ED mechanism may indicate "true" if it detects the energy of an incoming signal above a given threshold level and may indicate "false" otherwise; the CS mechanism may indicate "true" if it detects and locks on to a preamble of an incoming signal and may indicate "false" otherwise; the CCA may utilize a mechanism to determine if the channel/medium is "busy" or "idle"; the CCA mechanism may determine the channel to be "busy" if either the CS or ED mechanism indicates "true"; the CCA mechanism may determine the channel to be "idle" if both the CS and ED mechanisms indicate "false" or if the ED mechanism indicates "true" for a specified duration, while the CS mechanism indicates "false." The ED and CS indications may be made available at the Physical layer. The CCA may be available at the Physical and medium access control (MAC) Layer.

Wherein described herein, a peer may refer to a user or a device such as mobile station (MS) in Second Generation (2G), a UE in 3GPP, a full function device (FFD) or reduced function device (RFD) in IEEE 802.15/wireless personal area network (WPAN), and/or other types of WTRUs. A peer may be a group of users or devices sharing a group ID. Peer-to-peer (P2P) proximity communications may refer to infrastructure-based or infrastructure-less communications among peers within proximity. Peer discovery may refer a procedure used for a peer to find, locate, and/or otherwise identify another peer(s). For example, a peer may perform a discovery procedure prior to peer association to enable P2P proximity communications. Peer association may refer to a procedure used by one or more peers to establish logic relationship with another peer(s) before P2P data transmission is commenced. For example, peer association may include procedures such as peer attachment, peering, pairing, link establishment, and/or the like.

An association identifier (ID) may refer to a locally unique identifier to identify each established association relationship among peers. An association ID may be assigned during peer association or peer re-association and may be updated during a peer association update procedure. Peer association updating may refer to a procedure used for a peer to update an association identifier and/or association context of an existing association relationship with other peer(s). Peer disassociation may refer to a procedure used for a peer to cancel an existing association relationship with other peer(s). Peer re-association may refer to a procedure used for a peer to re-associate a cancelled association relationship with other peer(s).

A virtual leader may be a peer defined to represent, manage, and/or coordinate P2P communications among a group of peers (e.g., among the one or more additional members of the group and the virtual leader). The virtual leader and the other members of the group may share a context-based service and/or application. A virtual leader may be dynamically determined and/or changed within the group. The virtual leader may perform functions for the group such as context management, context-aware discovery broadcast, context-aware peer association, group membership management, synchronization, link management, channel accessing control, reliable data transmission, routing management, power control and interference management, channel measurement coordination, and/or the like. A peer may be the virtual leader for an applications. Each application may have a virtual leader. In an example, a peer may be the virtual leader for one application, and each application may have one virtual leader. Other terms for virtual leader may include group leader, group header, group controller, group, coordinator, group master, group manager, cluster leader, cluster, header, cluster, controller, cluster coordinator, cluster master, cluster manager, zone leader, zone, header, zone controller, zone coordinator, zone master, zone manager, and/or the like.

A sub virtual leader may be a peer defined to extend coverage through multi-hop methods based on the physical or logical topology. A sub virtual leader may be configured to act as a virtual leader to manage a subgroup of peers utilizing the same context-based service and/or application. In an example, a sub virtual leader may be configured to act as a peer (e.g., a member) under the management of the virtual leader and/or a sub virtual leader of the same group. The sub virtual leader may perform a subset of functions of the virtual leader.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may be in communication with another RAN (not shown) employing a GSM radio technology.

The core network 106/107/109 may serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
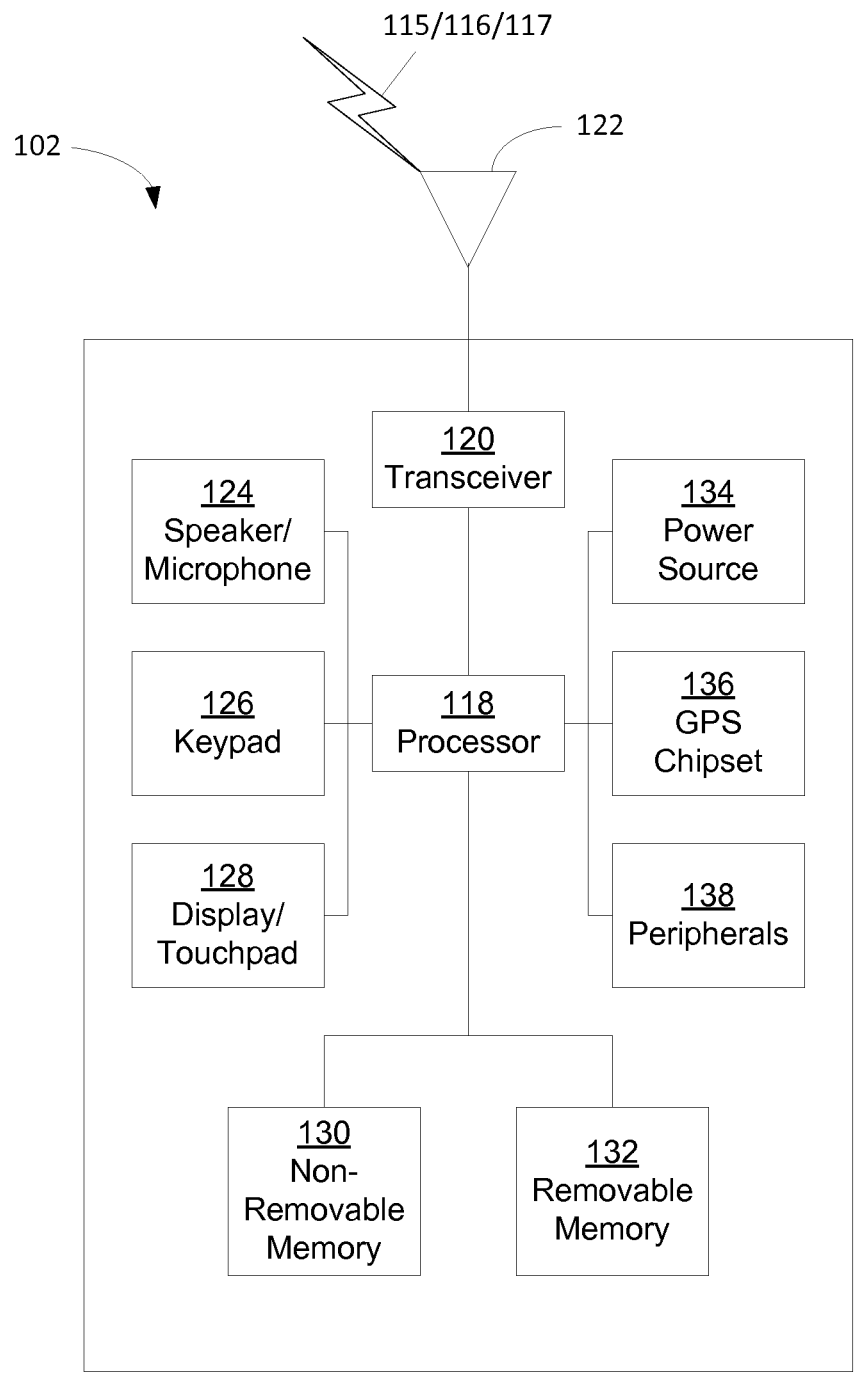
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
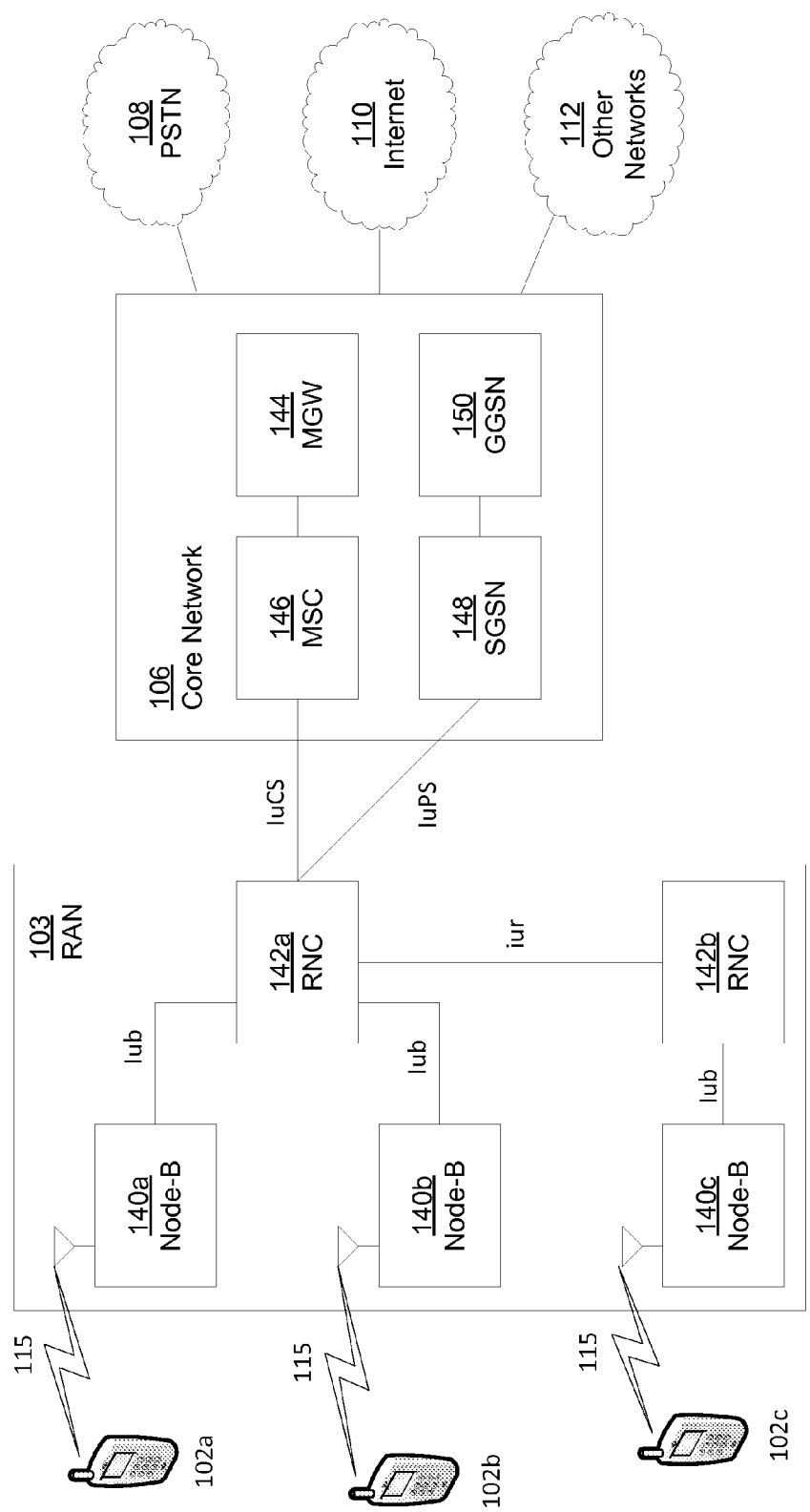
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may be connected to the networks 112, which may include other wired or wireless networks that are owned and/or operated by other service providers.

Figure 1D:
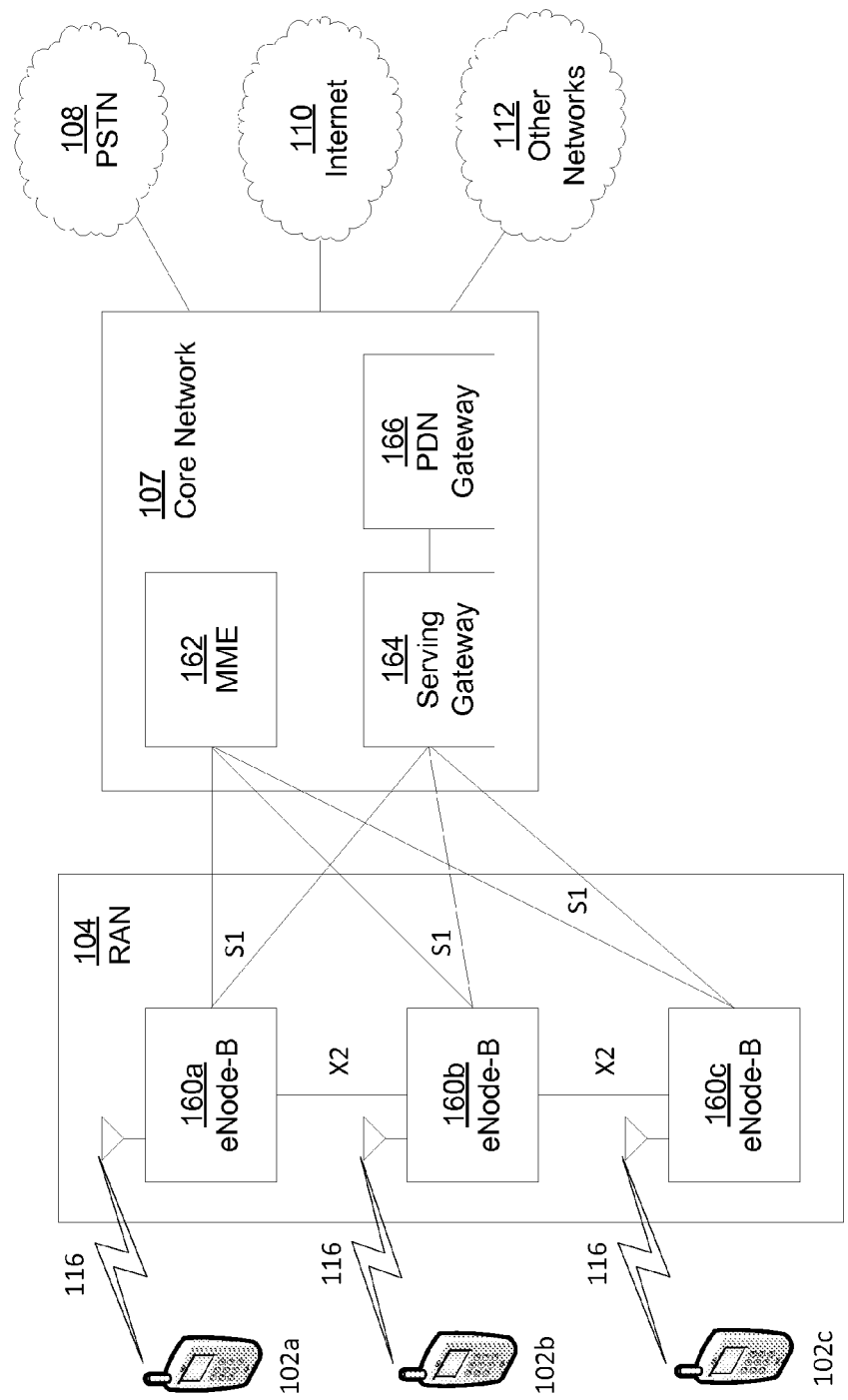
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
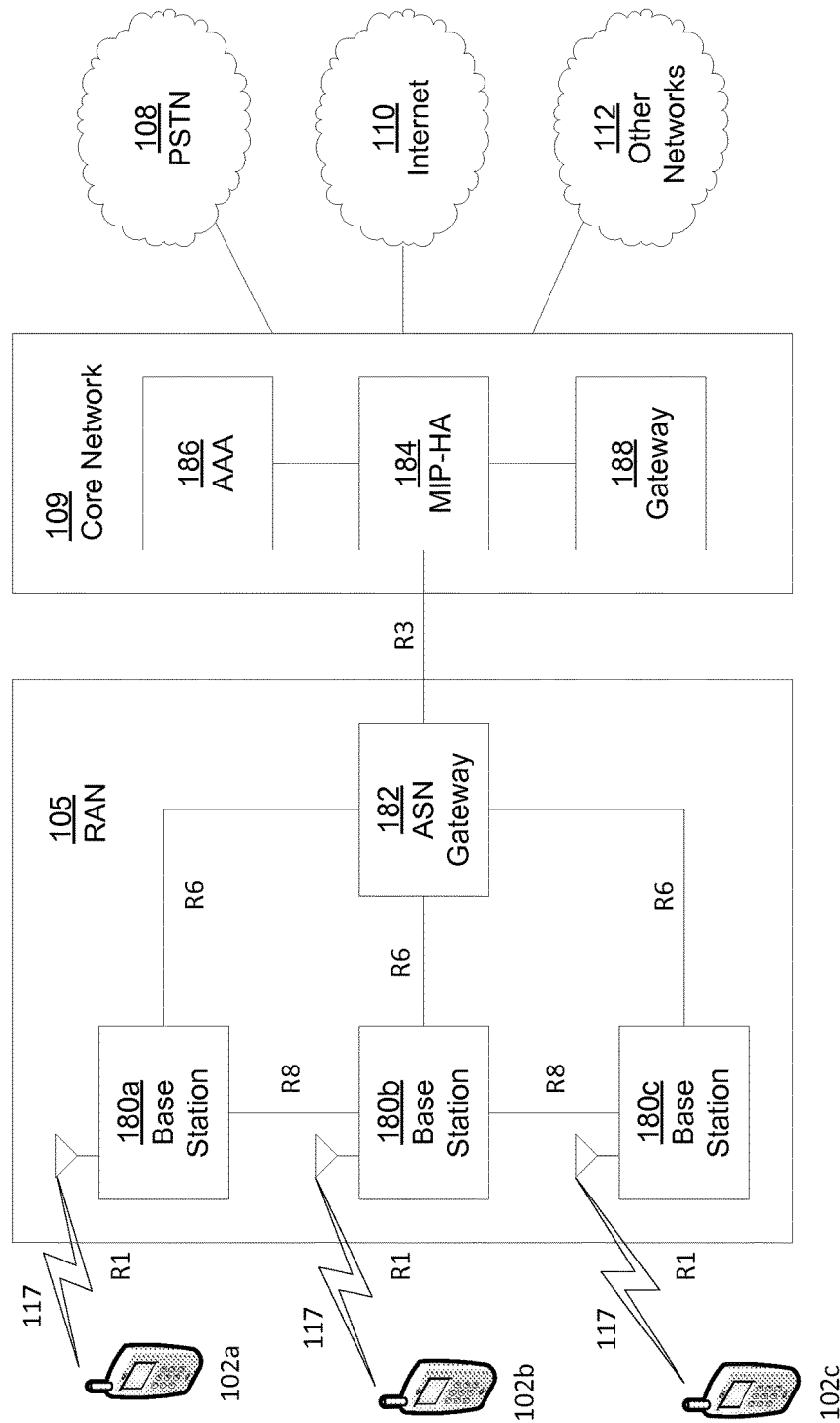
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

P2P proximity communication may utilize knowledge of the proximity of one or more peers in order to communicate information utilized for applications or services in an infrastructure-based and/or infrastructure-less configuration. P2P proximity communication may be implemented using a centralized system and/or a fully distributed system without a central controller. A peer may be a user or a device such as MS in 2G, a UE in 3GPP, an FFD or RFD in IEEE 802.15 (WPAN), and/or other types of WTRUs. Examples of P2P devices that may utilize P2P proximity communication techniques may include cars, medical devices, smart meters, smart phones, tablets, laptops, game consoles, set-top boxes, cameras, printers, sensors, home gateways, and/or the like. Compared to infrastructure-less P2P communications, infrastructure-based communications typically utilize a centralized controller for handling user information, scheduling among users, and/or performing connection management. For example, cellular communications systems may be utilized for infrastructure-based P2P communication systems. In infrastructure-less P2P communications, peers may have equal and/or shared responsibility for initiating, maintaining, and/or terminating a given session.

P2P proximity communications may be utilized to facilitate operation of proximity-based applications. For example, typical examples of proximity based applications that may utilize P2P proximity communications may include social networking, advertising, emergency services, gaming, smart transportation, network of network operations, and/or the like. The uses and capabilities of the P2P proximity communications may vary based on the types of proximity-based application.

As an example, social networking applications may be configured to allow peers in proximity to interact with each other at the application level, such as sending/receiving messages via Facebook or Twitter. In social networking applications, two-way communication among two or more peers may be utilized. Depending on the scenario, traffic data rates may vary for these applications. For example, at certain times traffic data rates may be low (e.g., for text-based chatting) and at other times the traffic date rate may be relatively high (e.g., for content sharing such as video sharing).

P2P proximity communications may be utilized for advertising purposes. For example, a store may broadcast promotions and/or coupons to potential customers (e.g., peers) within the proximity of the store location. In this scenario, one-way communication with low data traffic may be typical. However, two-way communication may be utilized, for example for personalized advertisements. Similar to the broadcast of advertisements, emergency communications between peers may involve one-way communications that are broadcast to individuals that may be affected by the emergency. Although such emergency alarms may be utilized, two-way communication may be used, for example to facilitate emergency safety management. Emergency communications may be subject to a higher priority than other P2P use cases and/or may have increased privacy requirements (e.g., if sensitive medical data is being communicated).

P2P proximity communications may be utilized to facilitate gaming applications. For example, multiple peers may initialize or participate in interactive games, such as online multiplayer games that follow certain rules. Interactive P2P gaming may require relatively low latency.

P2P proximity communications may be utilized to support smart transportation. For example, cars and other transportation vehicles may be connected via car-to-car and/or car-to-infrastructure communication links in order to support advanced applications such as congestion/accident/event notifications, interactive transportation management (e.g., carpooling and train scheduling), smart traffic control, and/or the like. Data rates in these scenarios may be relatively low in most typical scenarios; however, these applications may require highly reliable message delivery and/or very low latency.

P2P proximity communications may be utilized to facilitate network of network functionality. For example, P2P proximity communications may be used to provide coverage extension of infrastructure-based communication network and/or to offload traffic from the infrastructure. Multi-hop communication techniques may be utilized in order to implement the network of network functionality. Multi-hop, or ad hoc, wireless networks may use two or more wireless hops to convey information from a source to a destination.

Examples of multi-hop communications may include Mobile ad hoc networks (MANETS) and Multi-hop cellular networks. MANETS may include a group of mobile nodes that communicate without a fixed wireless infrastructure. Communication between the mobile nodes may be performed by direct connection or through multiple hop relays. Multi-hop cellular network communications differ from traditional cellular communications that employ a single hop between mobile units and the base station in that one or more relay nodes may be utilized to communicate information between the mobile node and the cellular network. Several different types of relay technologies may be used, for example fixed relays (e.g., powered infrastructure equipment that may not be directly connected to the network backbone), mobile relays (e.g., other users opportunistically agree to relay packets from another user), as well as mobile fixed relays (e.g., fixed relays that are mounted on buses or trains and thus moving).

These applications of proximity communications may be highly related to machine-to-machine (M2M) communications and the Internet of Things (IoT), for example the implementation of smart environment and/or smart transportation functionality. By leveraging P2P wireless communications, the performance of those M2M/IoT applications may be improved. additional new M2M/IoT applications may be enabled by improving P2P communications. Several standard development organizations (SDOs) are actively pursuing P2P communication standardization to achieve such improvements, such as the Institute of Electrical and Electronics Engineers (IEEE) 802.15.8 standard and the Third Generation Partnership Project (3GPP) Proximity Services (ProSe) study.

For example, 3GPP is evaluating infrastructure-based P2P communication methods for 3GPP ProSe. Protocols and procedures are being discussed to support multiple ProSe/Device-to-Device (D2D) operation modes. For example, Operator Free (OF) operation may include D2D communication that may be standalone (e.g., without any involvement from the network operator). As an example of OF operation, a WTRU make the initial determination of proximity, target peer discovery, and/or make direct connections with peers without any support from the network.

Operator Assisted (OA) proximity communications may refer to scenarios wherein the network operator may assist WTRUs with one or more of proximity detection, provide targeted discovery, and/or assist with authentication/security. The assistance may be provided proactively by the network and/or upon a receiving request from a WTRU. In this case the network may not monitor the reliability of D2D links and/or may not support any session continuity if the D2D link is dropped due to user movement or other degradations. If the D2D link is dropped the application layer may still provide some level of continuity by re-initiating P2P connections via the network using normal cellular transmission procedures.

Operator Managed (OM) proximity communications may refer to scenarios wherein the network assists WTRUs as in the case of OA D2D, but may follow up with radio link monitoring and management to support session continuity during D2D communication. The network may anchor the D2D traffic using network access resources. For simplicity, the network anchoring may be limited to scenarios when two WTRUs are within coverage of the same eNB/base station, but network anchoring may be extended across eNBs as session continuity may be expected even as devices move out of proximity.

IEEE is evaluating infrastructure-less P2P communication methods for IEEE 802.15.8. For example, the PHY and/or MAC protocols may be modified in order to support fully distributed peer-aware communications to support emerging services such as social networking, advertising, gaming, streaming, and/or emergency services. P2P communication features that may be addressed in IEEE 802.15.8 in order to support infrastructure-less P2P communication sessions may include peer discovery, the scalability of transmission rates, group communication, multi-hop functionality, security, applicability to various spectrum bands, and/or the like.

For example, to provide for an effective P2P sessions, minimum system targets may be specified. Techniques may be specified for the discovery of peer information without performing association with the peer. One potential goal for peer discovery may include supporting discovery signaling rates of greater than 100 kbps and allowing for the more than 100 devices to be discovered substantially simultaneously. The systems may be designed to support scalable data transmission rates (e.g., typically 10 Mbps) and/or group communications with simultaneous membership in multiple groups (e.g., typically up to 10 but more may be used). The systems may be designed in order to be operational in selected globally available unlicensed/licensed bands below 11 GHz and while still being capable of supporting the above described system goals.

In an example, infrastructure-less P2P proximity communications may be used to perform fast neighbor discovery without performing peer association. For example, the typical neighbor discovery process in IEEE 802.15.8 may be unique among IEEE 802 standards at least two aspects. First, IEEE 802.15.8 may be used for peer-to-peer and group communications and may be applicable to functions implemented at PHY and/or MAC layers. Second, the discovery process may be performed without the association process, which may further reduce the latency incurred from neighbor discovery.

IEEE 802.15.8 may utilize fast association with distributed coordination. For example, a centralized coordinator or a dedicated server may not be used to perform association. Further, as IEEE 802.15.8 devices may be coordinated in a distributed manner for P2P and group communications, and the IEEE 802.15.8 association process may be different from the association process(es) used in other IEEE 802 standards. A centralized association process may suffer from overloading if many mobile devices are present, while the distributed processes may avoid overloading in these scenarios and thus achieve faster association.

Group communication may be a functionality used to support many applications such as social networking and P2P applications. Applications utilizing group communication may be configured to implement parts of the group communication functions at PHY and/or MAC layers of the IEEE 802.15.8 device. Individual peer aware communication (PAC) devices may join multiple groups substantially simultaneously. IEEE 802.15.8 group communications may be managed without the use of a central coordinator.

Figure 2:
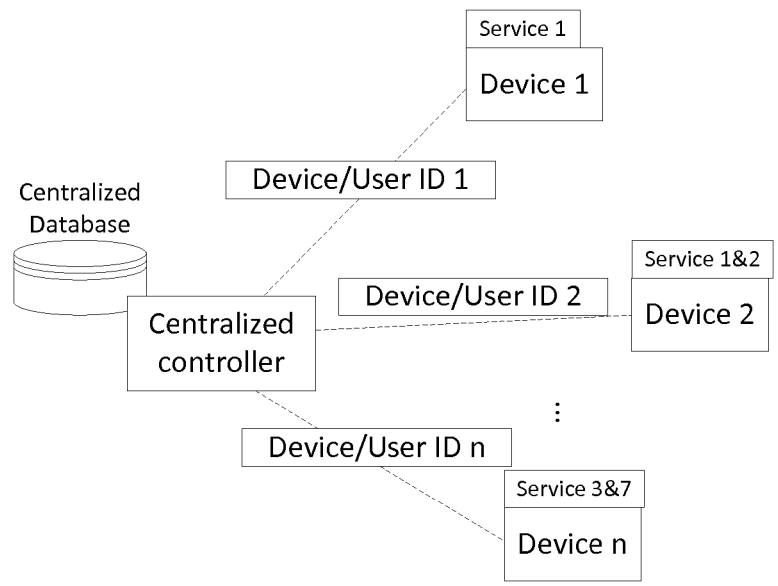
FIG. 2 illustrates an example of an infrastructure-based communication model.

For infrastructure-based communication, a centralized controller may allocate dedicated resource for users/devices that may be used for different services. The service related information may be retrieved from a central database, such as Home Subscriber Server (HSS) in a 3GPP network. FIG. 2 illustrates an example of an infrastructure-based communication model. In FIG. 2, rather than the devices communicating directly over-the-air, the P2P messages may be relayed via a centralized controller, which delivers messages to their intended recipient if that recipient is under the control of the controller. Although dedicated resources such as radio channels may be allocated for different services, an identifier may be used by the device in order to provide each device/user a level uniqueness such that each sender/receiver may identify themselves uniquely during communications. In this type of communication system, identifiers may be used for addressing different users/devices.

For example, a personal area network (PAN) ID may be used to identify the WPAN network to which a device has connected to during its association in IEEE 802.15 networks. In 3GPP, an International Mobile Subscriber Identity (IMSI), a Mobile Station Integrated Services Digital Network (ISDN) Number (MSISDN), and/or a fully qualified domain name (FQDN) may be used to address a device/user.

Figure 3:
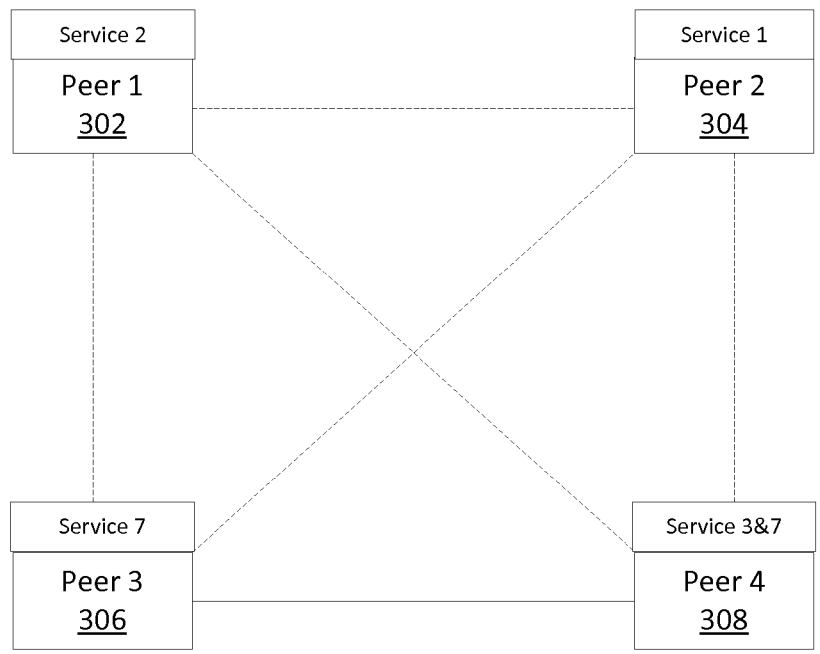
FIG. 3 illustrates an example of infrastructure-less P2P proximity communication.

FIG. 3 illustrates an example of infrastructure-less P2P proximity communication. In general, the peers within an infrastructure-less P2P communication network may form a network with linear, start, tree, and/or mesh topology where each pair of peers could potentially communicate with each other directly and/or through multi-hop. For example, two or more peers may communicate directly (e.g., without the use of a relay or intermediary network) using various communication protocols such as one or more of Bluetooth, WiFi, near-field communications (NFC), ZigBee, and/or other proximity based communication methods. The peers may communicate indirectly (e.g., via an intermediary or relay, via multi-hop, etc.), although the communications may be performed without a central controller or centralized scheduler. However, in some examples of infrastructure-less P2P proximity communication, one or more peers may act as a controller to facilitate efficient communications, for example when the P2P communications utilize a virtual leader and/or a super virtual leader. Direct communications between the peers (e.g., over-the air communications sent from a first peer and received by a second peer) may examples of proximity P2P communications.

In infrastructure-less P2P communication, the service related information of peers may be obtained without the use of a centralized controller or database. Thus, the service related information may be exchanged among peers before and/or during discovery/association.

In order to facilitate improved device P2P proximity communications between devices and allow for more meaningful discovery and association processes, context information may be utilized during P2P proximity communication sessions to provide information regarding the types of applications and devices involved in the P2P proximity communication. For example, context information may include information related to P2P communication such as one or more of information related to the type of service utilized for the P2P communication, information related to the identity and/or type of application for which the P2P communication is utilized, information related to user and/or user account associated with a device used in for the P2P communication, information related to a group associated with the P2P communication, information related to the devices involved in the P2P communication (e.g., information regarding the features, hardware, capabilities, supported communication protocols, status, and/or the like), information related to security settings and/or procedures for the P2P communication session, other types of peer information, and/or the like. Depending on the type of P2P communication, the devices involved in the P2P communication session, the purpose of the communication session, etc., the relevant context information may be different. Different types and/or combinations of context information may be utilized for different P2P communication sessions depending on the requirements/goals of that session.

For example, device capabilities may be utilized as context information for a first session, while application level information may be utilized as context information for a second communication session. In an example, both device capability information and service related information may be utilized in a third communication session. As may be appreciated, the context information that is utilized may change from session to session; however, in some contexts the context information may be fixed over time and/or may not vary from session to session.

During communication sessions such as P2P communication sessions, identifiers may be used that identifies users/devices to network entities and/or communication peers. For example, devices may be assigned unique identifiers so that communication peers may uniquely address information to be sent to a device and/or recognize that a communication is from a given device when a communication is received. Examples of identifiers may include IMSIs, radio network temporary identifiers (RNTIs), PAN IDs, IP addresses, and/or other types of identifiers.

Since P2P communication may be used for context-driven and/or ad hoc connections, additional information may be added to identifiers in order to provide for more meaningful communication sessions and/or streamline connection set-up/maintenance. For example, existing identifiers included in message headers may identify the communication peer (e.g., by user and/or device), but such identifiers typically lack context information for the peer peers other than the user/device ID. Although an application may include additional context information in the payload portion of a packet/message, the receiver may be unable to identify the context information in the message without performing additional processing to obtain the information from higher layers in the protocol stack. For example, context information such as information related to a type of service may be included in a payload of a message during a P2P communication. However, in order to determine the information related to the type of service, a peer may be required to decode the entire message so that the payload can be properly interpreted.

Since certain scenarios/architectures may lack a centralized controller that coordinates communications between peers within proximity to each other, it may be inefficient for peers to decode the entirety of received messages in order to determine context information. For example, if there are many such devices in a given proximity, peers may thus waste time and resources decoding messages from devices and/or users that may be unable and/or uninterested in utilizing services that the peer device is interested in using. The decoding of such messages may thus introduce extra overhead and latency in discovery and/or association processes.

For example, FIG. 3, Peer 1 302, Peer 2 304, and/or Peer 3 306 may be running different services (e.g. Service 2, Service 1, and Service 7, respectively) and may broadcast invitations for other peers to join. Peer 4 308 may be interested in devices using Service 3 or Service 7, but not in other services. Thus, although Peer 3 306 may be of interest to Peer 4 308, while Peer 1 302 and Peer 2 304 may not be of interest to Peer 4 308, Peer 4 308 may decode the broadcasts from each of the peers to determine who is running a service that is applicable to Peer 4 308. For example, based on existing identifiers that lack additional context information, Peer 4 308 may be unable to differentiate the messages for different services until decoding the entirety the messages. This may cause processing delay and increase power consumption.

In an example, P2P communications may be formed based on the desired services or applications (e.g., the desired context). Context-aware P2P communication may be achieved by providing a peer with relevant context information prior to one or more P2P communication procedures and optimizing or otherwise modifying the P2P communication procedure to take into account the context information. For example, the participants, procedures, and/or results of the P2P communication procedure may change based on taking into account the additional context information.

As an example, peer information (PI) may include context information about one or more communication peers that may be used during P2P communication procedures. When used herein, PI and context information may be used somewhat interchangeably. For example, PI may include information that allows for consistent identification of peers and/or services used among peers in infrastructure-less scenarios. As an example, PI may include one or more of information that describes P2P services such as context category, application, etc., information that describes user(s) and/or group(s) such as user profile, affiliation, group, etc., information that describes device(s) such as device type, group, capability, etc., information that describes P2P communication such as preferences, priority, privacy, security, etc., and/or the like.

In general, PI may include information that can be used for peer discovery and/or peer association. For example, with the knowledge of relevant context information/PI peer discovery may be modified to enable peers to discover or to be discovered based on context criteria. For instance, a peer may want to discover other peers in the proximity who are on Facebook for social networking. After discovery, the peer may associate with the peers using the application Facebook application. By providing context information regarding the Facebook application, the discovery and association procedure may be optimized to account for the context information.

To enable context-aware peer discovery and/or peer association, context information may be included in the P2P communication identifier. An identifier that includes context information may be referred to a Context-Aware Identifier (CAID). The use of a CAID may accelerate discovery and/or association by providing relevant context information to a peer in a field that can be quickly identified and parsed. Since the device identifier of a peer is often one of the first pieces of information available to a device during a P2P communication (and since the identifier may be available and interpretable at the physical layer), using CAIDs may allow the context information to be quickly determined near the beginning of a session, meaning that the context information may be available to optimize subsequent discovery and/or association procedures.

For example, using CAIDs may allow a device to facilitate priority processing among different applications and/or may allow a device to enable fast, context-based discovery and/or association procedures. The CAID included in messages may contain information related to the underlying message, such as one or more of the information related to the purpose of the message, information related to the sender of the message (e.g., the peer forwarding the message), information related to the originator of the message (e.g., the entity or organization that created the message), information related to an intended recipient of the message, information related to system requirements for making use of information included in the message, etc.

The context or context information may be differentiated into plurality of categories, and the different categories may be referred to as Context-Aware Categories (CACat). As an example, a CACat portion may be included in a CAID, and the CACat portion may indicate one or more categories of context information that are included in the CAID. The CACat portion of the CAID may be referred to as a CACat context of the CAID. As an example, Table 1 indicates example CACats and examples of services and/or applications that may be associated with a corresponding CACats. As may be appreciated, since P2P communication may be context-driven, CACats, PI, and/or other context information applicable to different use cases may be different/vary.

TABLE 1

| CACat | Services and applications |
|---|---|
| Connection | Social networking, instant message, etc. |
| Shopping/ Entertaining (Commercial) | Commercial broadcast, personalized advertisement, group-based advertisement, etc. |
| User-centric services | Gaming, streaming, content exchanges, etc. |
| Smart environment (device based) | Home/office device intelligence, personalized auto-configuration/synchronization, application schedule, content sharing, etc. |
| Health Monitoring/ Service | Peer-aware monitoring/assistance, first aid, hospital, emergency, etc. |
| Safety/security | Hazard, public emergency warning, police/public helps, etc. |
| Traffic/ transportation | Road congestion or accident alert, interactive transportation management, traffic condition alert, ticket update, etc. |
| Network of network | Multi-hop to infrastructure, off loading from infrastructure, etc. |
| . . . | . . . |

For example, including the CACat as part of the CAID may allow devices to perform faster discovery and/or association. For example, devices may quickly terminate a discovery and/association procedure for a certain peer based on reading the CAID for the peer to determine that the CACat for the peer is not applicable to services/applications that are relevant to the device. In an example, a CAID may be constructed in a hierarchical manner. For example, the CACat may be the first level of the hierarchy.

A connection category may be an example of a CACat. A connection CACat may refer to applications and/or services that feature interactions between peers and/or are associated with social networking functions between peers. For example, users that are running or operating social networking application (e.g., Facebook, Twitter, etc.) or other types of interaction-based applications (e.g., instant messaging, photo sharing, information sharing, etc.) may include a connection type CACat in their CAIDs. Potential peers may quickly determine that a given user or device is interested in forming a P2P session to support communications for applications such as social networking applications based on the connection CACat being included in the CAID of the given user or device.

In an example, a first user/device may broadcast context information (e.g., PI) for connection-type services and/or applications that may include information indicative of one or more types of service, application, and/or user that the first device/user is interested in. For example, the broadcast may indicate to other users in the proximity of the first user that the first user is interested in initiating a P2P proximity communication session for a connection-type service and/or application. The broadcast information may indicate the specific application that the first user is interested in and/or specific users with which the first user is interested in establishing communications. Based on the received context information/PI received, other peers may be triggered or enabled to perform further discovery and/or association procedures.

After association peers may be able to indicate activities or other updates for services and/or application using a context/PI broadcast. For example, a context/PI broadcast may indicate that a status update has occurred and/or that a new invitation has been sent/received for the Facebook application. In an example, for group based activities, the context information may include group information such as assignments and/or updates applicable to a group. In an example, rather than or in addition to using a traditional broadcast message to distribute the context information/PI, the context information may be exchanged among peers using multi-hop messaging (e.g., a first user sends the message to a second user, who sends the message to a third user, etc.). In an example, the context information/PI may include security information and/or security features of the broadcasting device. The context information/PI may include proximity related information such as geolocation information and/or relative location information. The context information/PI may include mobility related information such as absolute velocity information and/or relative velocity information.

As noted above, PI may be an aspect of context information. The PI may be specific-to a given device, user, and/or service/application. The context information/PI may include a CACat that indicates the context category (e.g., CACat=10 for indicating social networking, CACat=11 for gaming, etc.). The context information/PI may include application context information. For example, the application context information may indicate specific applications within an advertised CACat for which the device is attempting to obtain the P2P proximity communication. For example, a device may broadcast a CACat as social networking and may further indicate that the applications associated with the broadcast CACat is Facebook and/or Twitter using application context information in the same or a later broadcast. Further, the context information may include application related values. For example, the application related values may include one or more of an application ID, a message type (e.g., Facebook status update, friendship invitation, etc.), a user ID, and/or other application-specific information.

In an example, the context information/PI may include user context and/or group context. For example, user context information may include information relating to the user of the device that it broadcasting the context information and/or information regarding desired peers for the P2P proximity communication session. The group context information may include information relating to one or more groups that the user of the device that is broadcasting the context information belongs to and/or information regarding one or more groups that the desired peers for the P2P proximity communication session should be a member of. For example, the user/group context information may include values such as user ID(s), group ID(s), indications of group members, and/or the like. The context information/PI may include security context information. Examples of security context information may include security key(s), indications regarding security schemes, and/or the like. The context information/PI may include multi-hop context such as maximum hop count values, hop count per user ID, and/or the like. The context information may include an indication that the broadcasting device/user is a virtual leader (VL), sub-virtual leader (sub-VL) and/or super virtual leader (super-VL). For example, the indication may be a field such as a flag. The context information may include proximity context information. Examples of proximity context information may include an absolute location (e.g., latitude/longitude, address, etc.), a relative location, a detectable radio range, and/or the like. The proximity information may include geolocation information and/or mobility context information such as the absolute velocity and/or relative velocity to other peers.

Context information/PI may be static, dynamic, and/or a combination of static and dynamic information. For example, certain types of context information/PI may be static such as a CACat ID (e.g., the types of categories may be static over time), user ID, etc. Examples of dynamic context information/PI may include information related to group members, information regarding applications, etc.

In an example, context information/PI may be related to and/or may be utilized for applications related to shopping or other entertainment. For example, commercial broadcasts, such as personalized/group-based advertisements for coupons or promotions, may be sent to one or more peers. Shopping and/or entertainment may be an example of a CACat, which may be referred to as a commercial CACat. For example, the CACat of a CAID utilized for a proximity communication related to shopping or other commercial sale(s) or transaction(s) may set the CACat to a specified value used to represent commercial activities. Other peers may then determine that the communication is for shopping and/or entertainment based on reading and interpreting the CAID.

Context information/PI used for shopping scenarios may vary based on the attributes of a given scenario. For example, in some scenarios a peer may send or broadcast a coupon or other indication of a promotion on behalf of a store (e.g., retailer, specific store location, specific chain storage, etc.), on behalf of a store owner (e.g., person or user), on behalf of an item (e.g., on behalf of a manufacturer; offer applies to product and may be valid at various locations), etc. A peer and/or a group of peers may actively send requests for personalized promotions to other peers. The commercial related information may be forwarded among peers, for example in an ad hoc manner. In an example, a peer that forwards commercial-type of information to other peers may be rewarded by forwarding the information. For example, the forwarding peer may receive other promotions and/or coupons. Several peers may be utilized in order to distribute the commercial-related context information/PI among a large group of peers in an ad hoc manner using a multi-hop message transmission technique.

Depending on the specific implementation, context-information/PI for commercial-type communications may include one or more of the following types of information. One or more of the following types of information may be included in a CAID for commercial-type communications (e.g., the information may be encoded in one or more portions of the CAID). For example, the context information for a proximity-based P2P commercial-type message may include a CACat portion/context to indicate the type of service (e.g., commercial advertisement). For example, the CACat portion of the CAID may be set to a value representing commercial services. Based on receiving such a CACat, a peer may be able to determine that the message is a commercial-type message and/or or is for a commercial-type service.

In an example, the context information/PI may include application information to indicate one or more applications under this CACat. The application information may be included in an application portion/application context of a CAID. As an example, a first peer may send a message to a second peer using a CAID. The message may be a coupon for use with a department store app on the second peers mobile device. In this case, the CAID of the message may include a CACat portion and an application portion. The CACat portion may indicate that the message is for a commercial service (e.g., shopping or entertainment). The application portion may indicate the identity of the department store app. In this manner, peers that are interested in commercial messages and that include the department store app can quickly determine that the message may be of interest based on reading the CAID of the message. Examples of application information that may be included in the context information/CAID may include an indication of the creator/administrator of the application (e.g., Google, coupons.com, etc.), an indication of the identity of the application (e.g., Amazon.com mobile app, advertising software for a certain mall, etc.), one or more application-related values (e.g., application ID, item, price, reward, etc.), indication of the owner, group, store, etc. having the promotion, and/or the like. The context information/PI for a commercial message may include information regarding who can utilize or redeem the promotion, for example using one or more peer related values such as a user ID or a group ID and/or by otherwise indicating allowable group members or required memberships to access the promotion.

The context information/PI for a commercial-type CACat may include other context information that allows peers to receive/decode the message and/or correctly forward the message to other peers. The other context information may be include in the CAID for the message. For example, the context information/PI for a commercial message may include a security portion/security context information such as security key, security scheme, etc. for using or reading the commercial promotion. In an example, the context information/PI for a commercial message may include a multi-hop portion/context. For example, the multi-hop portion may indicate multi-hop related values such as a minimum and/or maximum hop count for the commercial message. The context information/PI for a commercial message may include a virtual leader portion/context, for example one or more of a Sub VL indication or flag, a Super VL indication or flag, and/or a VL indication or flag.

The context information/PI for a commercial message may include a proximity portion/context for the sending peer, which may be included in the CAID of the message. For example, the proximity portion/context may indicate an absolute location of the forwarding peer such a latitude and longitude, an address, etc. The proximity portion/context may indicate a relative location of the sending peer such a position relative other landmarks/peers. The proximity portion/context may indicate the detectable radio range of messages being sent from the sending peer and/or messages that may be sent to the sending peer. In an example, context information/PI for a commercial message may include a mobility portion/context. The mobility portion/context may indicate mobility information for the forwarding peer. The context information/PI for a commercial message may include a forward portion/context. The forward portion/context may include information related to whom should forward the message. A forwarder portion/context may indicate the identity, capabilities, and/or other information regarding the forwarder of a message. Some portions/contexts may be static in nature (e.g., CACats, user IDs, etc.) and some portion contexts may be dynamic in nature.

Another example of a potential CACat may be a CACat for user-centric services. A CACat associated with user-centric services may be utilized for messages associated with gaming, content exchanging, content sharing, and/or other types of media distribution among peers. The context information/PI for a user-centric services CACat may include various types of information depending on the implementation. The various types of information may be included in portions or contexts that may be included in a CAID.

For example, the context information/PI for a user-centric services may include an indication of an invitation for interactive gaming, an acceptance of an invitation for interactive gaming, a rejection of an invitation for interactive gaming, etc. The interactive gaming session may be implemented via the proximity communication link and/or acceptance may be performed via the proximity link, while the gaming session may be performed over a network. The gaming session may be associated with specific users and/or a group of users. In an example, the context information/PI for a user-centric services may include information related to the games and/or type of content to be exchanged. For example, a portion of the context information/PI for a user-centric service may indicate an identity of the game or gaming application. Peers may share time sensitive and/or insensitive context information or session set up using context information/PI. The context information/PI may be exchanged using multi-hop communications and/or single hop. The context information/PI for a user-centric services CACat may include one or more of security features, proximity related information, mobility related information, and/or the like.

A CAID of a message related to user-centric services may be set such that potential peers may determine information about the message from the CAID. For example, one or more pieces of context information/PI may be encoded in the CAID. As an example, a CACat may be include in the CAID and the CACat portion/context may be set to indicate that the message is for user-centric services. An application portion/context may be set to indicate the application (or multiple applications) associated with the message, for example from a group of application that fall under one or more CACats. For example, the application portion/context may be set to a value associated with a peer gaming application from an online/offline source. The context information/PI included in the application portion/context may include application related values such as a game description, a number of players, a cost, a timer, an indication of the number of players joined, etc. The context information/PI may include a user/group context of other users playing the game or sharing the content. The context information/PI may include one or more peer related values such as the level of users playing the game, previous gaming history of players playing the game, etc. The context information/PI may include Security context such as security key, scheme, etc The context information/PI for a user-centric services-type CACat may include other context information that allows peers to receive/decode the message and/or correctly forward the message to other peers. The other context information may be included in the CAID for the message. For example, the context information/PI for a user-centric services-type message may include a security portion/security context information such as security key, security scheme, etc. for using the gaming information or joining a game session. In an example, the context information/PI for a user-centric services-type message may include a multi-hop portion/context. For example, the multi-hop portion may indicate multi-hop related values such as a minimum and/or maximum hop count for the user-centric services-type message. The context information/PI for a commercial message may include a virtual leader portion/context, for example one or more of a Sub VL indication or flag, a Super VL indication or flag, and/or a VL indication or flag.

The context information/PI for a user-centric services-type message may include a proximity portion/context for the sending peer, which may be included in the CAID of the message. For example, the proximity portion/context may indicate an absolute location of the forwarding peer such a latitude and longitude, an address, etc. The proximity portion/context may indicate a relative location of the sending peer such a position relative other landmarks/peers. The proximity portion/context may indicate the detectable radio range of messages being sent from the sending peer and/or messages that may be sent to the sending peer. In an example, context information/PI for a user-centric services-type message may include a mobility portion/context.

The mobility portion/context may indicate mobility information for the forwarding peer. The context information/PI for a user-centric services-type message may include a forward portion/context. The forward portion/context may include information related to the who should forward the message. A forwarder portion/context may indicate the identity, capabilities, and/or other information regarding the forwarder of a message. Some portions/contexts may be static in nature (e.g., CACats, user IDs, etc.) and some portion contexts may be dynamic in nature (e.g., groups, game-specific information).

Another example of a potential CACat may be a CACat for smart environment services. A CACat associated with smart environment services may be utilized for messages associated with applications allowing a device to be configured for use with other devices in a given environment such as a home or office. For example, a device such a smart-phone may be configured to interact with various appliances in a home such as a television, stereo, personal computer, security system, lighting system, kitchen/cooking appliances, alarm clocks, cleaning appliances, and/or the like. To facilitate discovery and/or association in a "smart environment" a CACat may be defined for smart environment services. When communicating with other peers in the smart environment, a device may set the CACat portion of a CAID to a value indicating that the communication is for smart environment services. The context information/PI for a smart environment services CACat may include various types of information depending on the implementation. The various types of information may be included in portions or contexts that may be included in a CAID.

Using CAIDs in a smart environment settings may facilitate device auto-configuration, device auto-synchronization, and/or device self-management in a home or office setting. For example, by reading the CAID, a device may quickly determine that a given communication is for setting-up/maintaining a smart environment, for example since the CACat may be set to indicate smart environment services. The device in the smart environment may be configured to synchronize, auto-configure, and/or otherwise update themselves with other devices in the smart environment in the proximity of the peer by exchanging context information/PI, for example in the CAID of the message.

As an example, for management purposes, devices may be grouped and each device may indicate its group in the context information/PI. The application/device schedules may be exchanged among peers through context information/PI. The context information/PI may be exchanged between device using multi-hop and/or single hop techniques. The context information/PI could be enabled with security features.

Depending on the application, scenario, and/or capabilities of devices implementing the proximity services, the context information/PI for smart environment services may include one of the following context information/PI, which may be included in the CAID of a message. For example, the context information/PI of a smart environment services message may include a CACat portion/context to indicate that the message is associated with a smart environment service. The context information/PI of a smart environment services message may include an application portion/context to indicate one or more applications associated with the smart environment services CACat. For example, "smart home" providers such as Comcast may provide an application that a user may utilize to control one or more smart environment devices within their home (e.g., Comcast Xfinity Home application). The application portion/context for messages associated with the Comcast application may indicate that the application is the Comcast Xfinity Home application. The application portion/context may include application-specific and/or application related values such as an application schedule, application parameters, application privacy level, etc.

In an example, the context information/PI (e.g., for smart environment services) may include a device portion/context. The device portion/context may include device related information such as one or more of a device ID, a device type, a device group, etc. The context information/PI (e.g., for smart environment services) may include a user/owner/group portion/context that may indicate peer related values for the forwarding peer. For example, the user/owner group portion/context may include peer related values such as one or more of a user ID, a group ID, etc. for the communication peer. The context information/PI (e.g., for smart environment services) may include a security portion/context such as security key, indication of security scheme, etc. In an example, the context information/PI (e.g., for smart environment services) may include a multi-hop portion/context. For example, the multi-hop portion may indicate multi-hop related values such as a minimum and/or maximum hop count a given message.

The context information/PI (e.g., for smart environment services) may include a proximity portion/context for the sending peer, which may be included in a CAID. For example, the proximity portion/context may indicate an absolute location of the forwarding peer such a latitude and longitude, an address, etc. The proximity portion/context may indicate a relative location of the sending peer such a position relative other landmarks/peers. The proximity portion/context may indicate the detectable radio range of messages being sent from the sending peer and/or messages that may be sent to the sending peer. In an example, context information/PI may include a mobility portion/context that may be indicative of mobility related information for a peer.

Another example of a potential CACat may be a CACat for health monitoring and/or health services. A CACat associated with health monitoring and/or health services may be utilized for messages associated with applications monitoring the health of a user (e.g., application in communication with a pacemaker or other health equipment). The applications utilized a health monitoring and/or health services CACat may be configured to monitor the health of a user, provide health related assistance to a user (e.g., diagnosis, symptom monitoring, mechanism for emergency services requests, etc.), and/or otherwise provide health-related services to a user. Depending on the implementation, context information/PI for health monitoring and/or health services may have one or more portions or sub-contexts.

Health monitoring and/or health services applications may be utilized in a number of ways, and the context information/PI utilized for a specific application may be dependent on the specific scenario. Thus, depending on the implementation, context information/PI for health monitoring and/or health services may have one or more portions or sub-contexts. For example, applications that utilize proximity P2P communications for the purposes of diagnosing health problems or monitoring the health of users may utilize a first set of portions/contexts of context information/PI related to health monitoring and/or health services, while an application designed to request peer assistance for the purpose of health monitoring and/or health services may utilize a second set of portions/contexts of context information/PI related to health monitoring and/or health services. In another example, service centers such as hospitals or health clinics may broadcast their capabilities as context information/PI to indicate their service related information to proximity peers. The advertised services may include services such as emergence room, first aid, ears nose and throat specialists, etc. Such a use case may utilize a third set of portions/contexts of context information/PI related to health monitoring and/or health services.

In an example, context information/PI may include peer privacy information or restrictions. For example, the privacy restrictions may be included in context information/PI encoded in a CAID. In an example, context information/PI may include peer priority information, which may indicate the relative priority level of the services. For example a first priority level may be associated with general health monitoring and a second priority level may be associated with requests for emergency services. The second priority level may have a higher priority than the second priority level. The context information/PI may be exchanged among devices by using multi-hop and/or single hop messages. The context information/PI may be enabled with security features (e.g., may be encrypted or otherwise obscured to peers that lack proper security credentials).

The context information/PI for health monitoring and/or health services may be encoded in a CAID in order to provide for fast discovery and/or association. For example, a CACat portion/context of a P2P message may be configured to indicate the type of service, in this case health monitoring and/or health services. The CAID may include an application portion/context that may indicate one or more health monitoring and/or health services applications associated with the P2P message. For example, an application on a user's phone may communicate with a pacemaker of the user for performing heart monitoring. A message associated with this heart monitoring application may indicate its identity using the application portion/context. The application portion/context may include one or more application related values, such as an Application ID, an indication of a medical condition (e.g., heart disease, diabetes, Alzheimer's Disease, etc.), doctor information, medical treatment, medical history, links to medical records, etc. In an example, a privacy portion/context may indicate a privacy level associated with the message and may be encoded in the CAID.

In an example, the context information/PI for health monitoring and/or health services may include a user portion/context that indicates information regarding the person that is the subject of the health monitoring and/or health services. For example, peer related values such as information associated with a personal medical profile (e.g., height, weight, age, etc.) may be included in the user portion/context. In an example, the context information/PI for health monitoring and/or health services may include a security portion/context, for example an indication of security key(s), a security scheme, etc. In an example, the context information/PI (e.g., for health monitoring and/or health services) may include a multi-hop portion/context. For example, the multi-hop portion may indicate multi-hop related values such as a minimum and/or maximum hop count a given message. Certain portions/contexts within the context information/PI may be static (e.g., such as the CACat ID, doctor information, etc.) and other portions/contexts may be dynamic (e.g., such as medical condition, medical treatment, etc.).

Another example of a potential CACat may be a CACat for safety and/or security services. A CACat associated with safety and/or security services may be utilized for messages associated with applications monitoring safety systems (e.g., equipment control applications, toxic substance monitoring such as carbon monoxide or natural gas monitoring, etc.), applications associated with first responder services (e.g., police, fire, emergency medical technicians, etc.), and/or security control/monitoring systems (e.g., applications monitoring or controlling security sensors, cameras, communications with police or security groups, etc.). Applications utilizing the safety and/or security services CACat may be passive monitoring systems and/or may provide active assistance to users.

For example, a device may be configured to indicate to peers in its proximity that a hazard, traffic problem, emergency condition, etc. is occurring in a location close to the devices. A device alerting its peers of a potential hazard may set the CACat field to a value indicating that the communication is in the category of safety and/or security services. The context information/PI may further indicate that a hazard is present and may provide identifying information for the hazard. The CACat and other context information/PI may be encoded in the CAID for the message. In an example, the context information/PI could be used to indicate that a peer is requesting peer assistance/services from other peers in the vicinity. In an example, the context information/PI may be used to indicate a target group of peers for the message.

Other types of security or safety related information may be included in portions or sub-contexts of the context information/PI. For example, the context information/PI may include an indication of the source and/or accuracy level of an alert/incident indicated in the context information/PI and/or message. A peer may indicate a priority level for an incident or alert in the context information/PI. In an example, the context information/PI may be exchanged among devices using multi-hop and/or single hop methods, and the context information may be enabled with security features (e.g., encrypted with a public or private key).

According to the use case and implementation details, the context information/PI for safety and/or security services CACat include one or more portions or sub-contexts to indicate additional information about the requestor, requestee, message, and/or the event that triggered the message. For example, the context information/PI may include an application portion/context to indicate one or more applications associated with a given safety and/or security services CACat message. For example, an alert type portion/context may indicate the type of alert, such as an earthquake alert, a tsunami alert, a tornado alert, a fire alert, a burglary alert, an automobile accident alert, an closure alert, etc. The alert type portion may include alert-type related values, such as an incident location, a hazard type (e.g., gas, oil, water, biology, air, etc.), an incident severity, etc.

The context information/PI may include a source portion/context to indicate the source of the alert. For example, if the alert was generated by the National Weather Service the source portion/context may be set to a first value corresponding to the National Weather Service and if the source was the New Jersey State Police, the source portion/context may be set to a second value corresponding to the New Jersey State Police. In an example, the context information/PI may include a target/group portion/context, for example to indicate a group that is the target of the alert (e.g., residents of a certain area, people associated with a specific school or institution, etc.). In an example, the context information/PI may include a priority portion/context. For example, large scale disasters such as earthquakes and tsunamis may be associated with a very high priority and downed power line where no one was injured may be associated with a relatively low priority. In an example, the context information/PI may a security portion/context. For example, the security portion/context may indicate a security key associated with the message, a security scheme associated with the message, etc.

In an example, the context information/PI (e.g., for a safety and/or security services message) may include a multi-hop portion/context. For example, the multi-hop portion may indicate multi-hop related values such as a minimum and/or maximum hop count for the commercial message. The multi-hop portion may indicate that the message is for an important emergency (e.g., earthquake) and that the message should be forwarded to other hops without delay. The context information/PI (e.g., for a safety and/or security services message) may include a virtual leader portion/context, for example one or more of a Sub VL indication or flag, a Super VL indication or flag, and/or a VL indication or flag.

The context information/PI (e.g., for a safety and/or security services message) may include a proximity portion/context for the sending peer, which may be included in the CAID of the message. For example, the proximity portion/context may indicate an absolute location of the forwarding peer such a latitude and longitude, an address, etc. The proximity portion/context may indicate a relative location of the sending peer such a position relative other landmarks/peers. The proximity portion/context may indicate the detectable radio range of messages being sent from the sending peer and/or messages that may be sent to the sending peer. In an example, context information/PI (e.g., for a safety and/or security services message) may include a mobility portion/context. The mobility portion/context may indicate mobility information for the forwarding peer.

Another example of a potential CACat may be a CACat for traffic and/or transportation services. A CACat associated with traffic and/or transportation services may be utilized for messages associated with traffic systems (e.g., route planning applications, traffic monitoring, etc.) and/or other travel related systems (e.g., carpooling applications, air traffic systems, etc.). Applications utilizing traffic and/or transportation CACat may be passive monitoring systems and/or may provide active assistance to users.

For example, a device may be configured to provide alerts to peers in its proximity regarding traffic information. The traffic information may be included in a context information/PI that is broadcast by the peer, for example as part of the CAID of a message. In an example, a peer may be configured to update adaptive schedules for transportation services using context information/PI. For example, the peer may receive updated schedules and/or request updated schedules using context information/PI. In an example, a peer may invite or accept carpooling with other peers using context information/PI encoded in the CAID of a message. In an example, the context information/PI may include a transportation description, such as whether a trip is one-way or round trip.

In an example, the context information/PI for traffic and/or transportation services may be exchanged among devices using multi-hop communications and/or using single hop communications. The context information/PI may be enabled with security features, may be enabled with proximity related information, and/or may be enabled with mobility related information.

Depending on the specific scenario, the context information/PI for traffic and/or transportation services may vary depending on the use case and message characteristics. For example, the CACat portion/context may be set to indicate the service as traffic and/or transportation services. An alert type portion/context may be used to indicate the type of alert associated with the message, for example an accident alert, a road closure alert, a train service cancellation, etc. Examples of accident alert type portion/context related values may include an alert ID, a condition (e.g., accident, closure, delay, etc.), an alert location, an alert duration, etc. In an example, the context information/PI may include an application portion/context to indicate an identity or type of application associated with the message. For example, the application portion/context may indicate that a maps application (e.g., Google Maps, Apple Maps, MapQuest, etc.) running on a mobile device may utilize information included in the message.

In an example, the context information/PI may include a source portion/context to indicate the source of the alert. For example, the source portion/context may indicate whether the source of the alert is a police report, a news report, an observation by a peer, etc. In an example, the context information/PI may include a target/group portion/context to indicate the intended target of the alert. For example, the target/group portion/context may indicate that the alert is for passengers with a ticket for a cancelled train, commuters on a given set of roads/highways, the general public, potential carpoolers etc. The target/group portion/context may include one or more peer related values, such as carpooling requirements, ticket numbers, etc.

In an example, the context information/PI may include a priority portion/context. For example, major transportation delays such as unplanned road may be associated with a higher priority than minor traffic delays due to factors such as congestion. In an example, the context information/PI may a security portion/context. For example, the security portion/context may indicate a security key associated with the message, a security scheme associated with the message, etc.

In an example, the context information/PI (e.g., for a traffic and/or transportation services message) may include a multi-hop portion/context. For example, the multi-hop portion may indicate multi-hop related values such as a minimum and/or maximum hop count for the commercial message. The multi-hop portion may indicate that the message is important and that the message should be forwarded to other hops without delay. The context information/PI (e.g., for a traffic and/or transportation services message) may include a virtual leader portion/context, for example one or more of a Sub VL indication or flag, a Super VL indication or flag, and/or a VL indication or flag.

The context information/PI (e.g., for a traffic and/or transportation services message) may include a proximity portion/context for the sending peer, which may be included in the CAID of the message. For example, the proximity portion/context may indicate an absolute location of the forwarding peer such a latitude and longitude, an address, etc. The proximity portion/context may indicate a relative location of the sending peer such a position relative other landmarks/peers. The proximity portion/context may indicate the detectable radio range of messages being sent from the sending peer and/or messages that may be sent to the sending peer. In an example, context information/PI (e.g., for a traffic and/or transportation services message) may include a mobility portion/context. The mobility portion/context may indicate mobility information for the forwarding peer.

Thus, there may be various forms and/or types of context information/PI that may be exchanged between peers. The context information/PI may be exchanged among peers before, during, and/or after P2P communication sessions. To facilitate the exchange of such context information/PI, the context information/PI may be encoded with device identification information. In this manner, the context information/PI may be quickly decided an may be made available for processes include the P2P discovery and P2P association. Thus, rather than simply using an identifier to uniquely identifies a device during P2P discovery procedures and/or P2P association procedures, an identifiers that encodes additional context information/PI may be utilized.

Figure 4A:
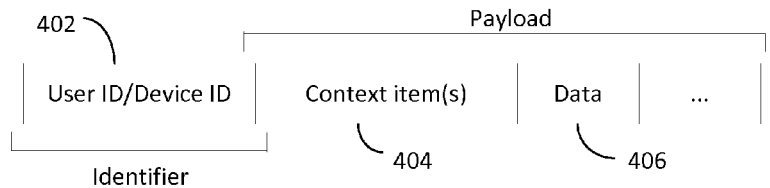
FIG. 4A illustrates an example message format that includes an identifier.
Figure 4B:
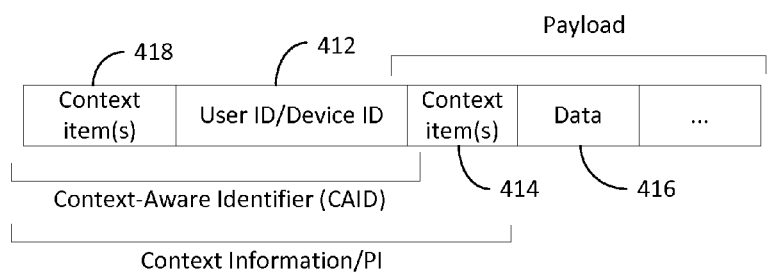
FIG. 4B illustrates an example message format that includes a CAID.

FIGS. 4A and 4B illustrate example information that may be include in a legacy message and information that may be included in message including a CAID. For example, FIG. 4A illustrates an example message format that includes an identifier, and FIG. 4B illustrates an example message that includes CAID. As shown in FIG. 4A, the existing identifier may be used to address a user or device based solely on a user ID or Device ID (e.g., User ID/Device ID 402). Thus, although the identifier may be used to uniquely identify a user and/or device, the legacy identifier may not provide any additional information about the context of the message. Instead of encoding context information with a user or device identifier, in legacy messages context item(s) 404 may be include with user data 406 in the payload of the message. Depending on the type of encoding, a device may be required to decode the entire message/packet in order to properly interpret and determine context item(s) 404.

FIG. 4B illustrates how one or more context items 418 may be encoded with User ID/Device ID 412 to form a context-aware identifier (CAID). Context information/PI may comprise information regarding the sender of a message, information regarding the intended recipient of a message, information regarding the purpose of the message, information regarding services or application associated with the message, and/or other information that may be used by a message recipient to quickly determine whether the message is of interest to the recipient. Context Information/PI may be included in a message header and/or a message payload (e.g. m Context item(s) 418 may be included in the CAID in the header of the message and Context item(s) 414 may be included with user data 416 in the payload of the message). User ID/Device ID 412 may be considered context information/PI since User ID/Device ID 412 may be an indication of information associated a sender of the message.

A CAID may be considered a multi-dimensional identifier that may include additional context information in addition to an identifier for a sender of a message and/or an identifier for a recipient of a message. Therefore, a CAID may both uniquely identify a user/device and identify a context for a given message (e.g., one or more circumstances associated with the message). In an example, a user ID or device ID may not even be included in a CAID. Instead, the CAID may solely include other types of context information/PI.

By using CAIDs, a peer may be able to filter received P2P messages based on one or more filters related to context information/PI without fully decoding the whole message. The CAID may be a subset of context information/PI that may be implemented flexibly based on different use cases and applications (e.g., the context information/PI included in a CAID may change over time and may vary based on application). Examples of context information that may be included in a CAID may include a CACat, a multi-hop indicator with a user ID, and/or any other combination of context information/PI.

In order to encode context information/PI as part of an identifier, the context information/PI and the identifier may be combined in a number of ways. Additionally, since the amount and/or type of context information may depend on the specific use case of implementation, methods may be defined for constructing a CAID. For example, a CAID may include context information/PI that may be organized as hierarchical manner, a flat manner, and/or a combination of a hierarchal and fat manner (e.g., a hybrid manner).

Figure 5:
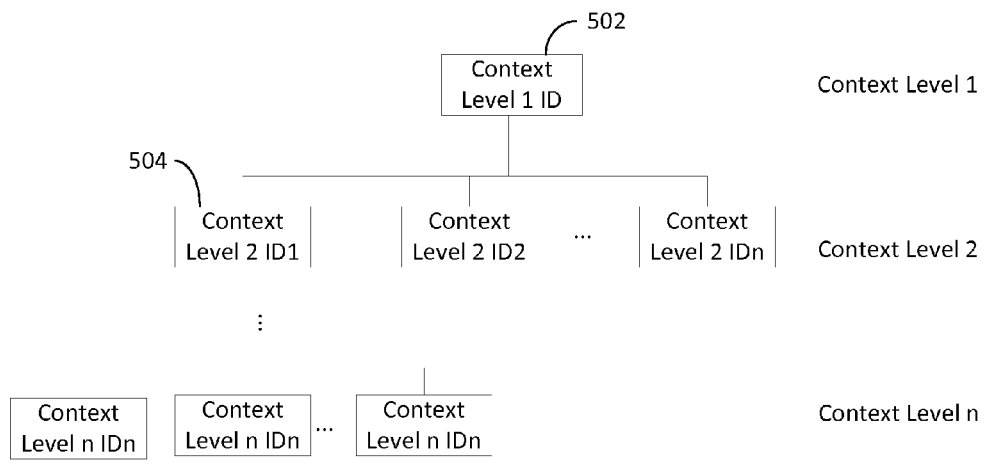
FIG. 5 illustrates an example of a hierarchal structure for a context information/PI included in a CAID.

FIG. 5 illustrates an example of a hierarchal structure for a context information/PI included in a CAID. For example, the context information/PI to be included in a proximity-based P2P message may be divided into different context levels based on one or more factors. For example, the context information/PI may be divided based on a relative level of importance, based on the specificity of the context information (e.g., more general context information such as a categorical level such as a CACat may be at a higher level and more specific information such as an application identifier may be a lower level, and application specific parameters may be at an even lower level, etc.), and/or based on some other criteria. In an example, the root level or highest level of the hierarchy (e.g., Context Level 1) may be the CACat. Thus, the root level (e.g., the CACat) may be used to indicate the category or use case for other context information/PI included in the CAID. The context information/PI within a hierarchally structured CAID may be expandable horizontally and/or vertically.

For example, Context Level 1 of FIG. 5 may include Context Level 1 ID 502, which, for example, may represent a CACat for the message. For example, the CACat may indicate the message is for connection purposes (e.g., social networking, etc.), commercial purposes (e.g., shopping, entertainment, etc.), traffic and transportation, etc. Context Level 2 may include one or more additional items of context information/PI that provide more specific context information associated with the CACat of Context Level 1. For example, supposes Context Level 1 ID 502 indicates that the message is associated with a connection-type CACat. In an example, Context Level 2 ID1 504 may be associated with an application portion/context of the CAID. For example, Context Level 2 ID1 504 may indicate that the application associated with the message is the Facebook app on a smartphone. Further, Context Level 3 may provide more detailed information about Facebook app-specific parameters such as an indication of a message type (e.g., friend request, individual message, group message, event invitation, etc.), an indication of a plug-in or sub-application associated with the message (e.g., Farmville, etc.), information about a user account associated with the message (e.g., sending user identity, recipient user identity), and/or other application specific context information. As may be appreciated, other Context Level 2 context information/PI may have Context Level 3 information although not shown in FIG. 5. Additionally, the number and type of context information included in each level may vary based on the use case or implementation.

Figure 6:
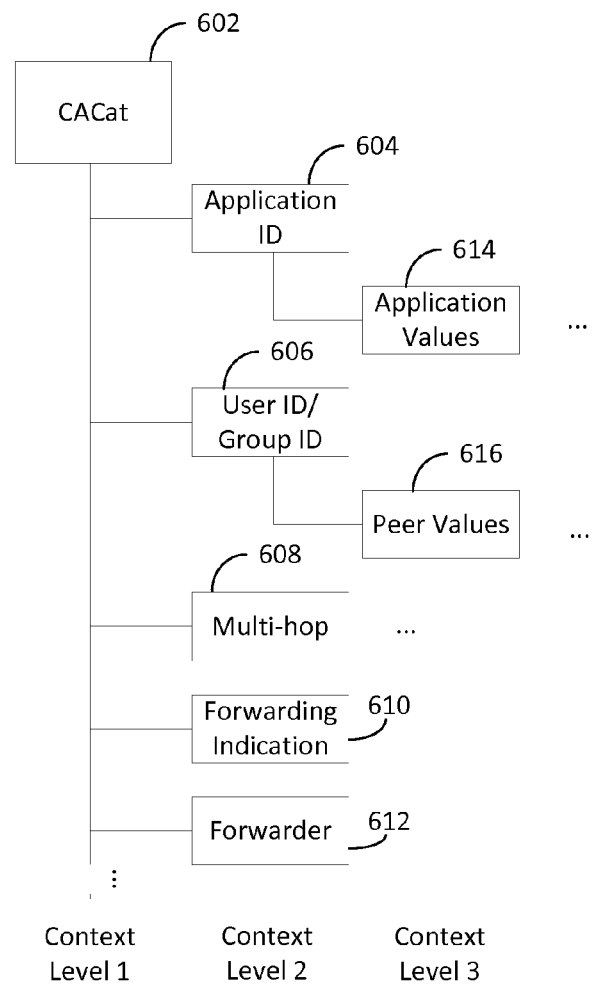
FIG. 6 illustrates an example of a hierarchal context information/PI for a commercial advertisement that may be included in a CAID.

FIG. 6 illustrates an example of a hierarchal context information/PI for a commercial advertisement that may be included in an example CAID. For example, CACat 602 may be a root context level, and may indicate the message is associated with a commercial-type CACat. The commercial-type context information PI may be divided into one or more levels so that a device receiving the CAID may begin to parse the levels to see if the underlying message is of interest. For example, the receiving device may first read CACat 602 of Context Level 1 to determine that the message is a commercial-type message. Since this user/device may be interested in commercial type messages, the device may begin interpreting Context Level 2. For example, the device may parse and interpret one or more of Application ID 604, User ID/Group ID 606 (e.g., Device ID, etc.), Multi-hop 608, Forwarding Indication 610, Forwarder 612, etc. For example, Application ID 604 may indicate that the application is a coupon application that is of interest to the receiving user/device. Based on this application-specific information, the receiving device may determine to continue parsing the CAID, for example as Context Level 3 to determine Application Values 614 (and/or Peer Values 616). In an example, Application Values 614 may indicate that the coupon included in the message is for a store that the user of the receiving device is not interested in, so the device may determine to stop parsing the CAID, to refrain from delivering the message to an application on the receiving device (or presenting the message to the rec receiving user), and/or refrain from performing further discovery and/or association procedures with the sending peer. In an another example, Application Values 614 may indicate that coupon is for a storage of interest, and the receiving device may determine to deliver the message to the application of interest and/or continue communications with the sending peer (e.g., further discovery and/or association, etc.). As illustrated in the example of FIG. 6, a CAID may be constructed to push a certain level of context into the peer discovery and association identifier (e.g., the CAID).

Figure 7:
FIG. 7 illustrates an example of a flat structure for context information/PI that may be included in a CAID.

FIG. 7 illustrates an example of a flat structure for context information/PI that may be included in a CAID. A flat structure for context information/PI may be consider a horizontal expansion of context information/PI. The order of context items included in a flat structure may be set based one on or more criteria. For example, the order may be set based on a relative level of importance. For example, a CACat may be the first context item in the sequence, followed by forwarding or multi-hop information, followed by application information, etc. A CAID may be constructed by adding one or more items of context information to a peer discovery and/or peer association identifier. By including the information that is helpful for identifying a message at the beginning of the CAID (e.g., CACat in this example, although context information/PI may be used as a root level), a receiver may quickly identify CACat upon receiving a message.

Figure 8:
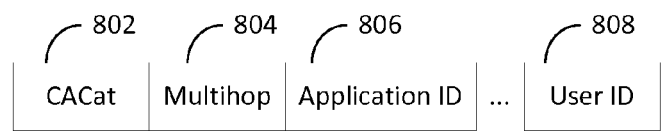
FIG. 8 illustrates an example of a flat structure for context information/PI associated with a commercial advertisement that may be included in a CAID.

FIG. 8 illustrates an example of a flat structure for context information/PI for a commercial advertisement message that may be included in a CAID. For example, CACat 808 may be the first context item in a sequence of context items included in a CAID. A receiver may quickly parse the CAID to determine the CACat. In this example, CACat 802 may indicate that the message is related to a commercial CACat. If the receiving device is interested in commercial-type messages, the device may continue parsing the CAID. If the receiving device is not interested in commercial-type messages, the device may stop reading the CAID and/or may determine not to decode the payload portion of the message. In an example, the receiver may continue to parse each successive context item (e.g., Multihop 804, Application ID 806, . . . , User ID 808) to determine whether the message is of interest. Other types of identifiers/context items may be used (e.g., device ID) and the order of the context items may vary depending on the type of application and/or the specific scenario.

In an example, rather utilizing a hierarchal context information/PI structure that may utilize dynamically expanding/contracting context levels (e.g., the specific context levels and/or the number of context items in a context level may change on a message-by-message basis), a defined hierarchal structure that includes a constant number of context levels and/or a fixed number (and/or identity) of context items per context level may be used. Such a context information structure may be referred to as a hybrid context information structure. Different types of messages, different users, and/or different applications may use different hybrid context information structures in a CAID.

In an example, a context manager (CM) may be utilized for managing or otherwise defining the exchange of context information. For example, a CM may be a logical control entity that manages the context information of a group of peers. The context information under the management of the CM may include some or all context information/PI that may be included in a CAID. The CM may be configured to manage CAIDs, such as defining the CAID structure, determining the type of information included in the CAID, etc. The CM may be implemented in the peer devices (e.g., CM functionality is included in peers that exchange P2P proximity messages) and/or in one or more nodes included in an infrastructure-based communication network. For example, the CM may be implemented in an WTRU, in the coordinator of an IEEE 802.15 network, in a packet gateway (P-GW), a serving gateway (S-GW), an eNB, an MME, a policy charging and rules function (PCRF), and/or a HSS of a 3GPP cellular network, and/or the like.

A CM may configured to perform one or more of the following functions, in any combination. For example, a CM may be configured to manage context information/PI (e.g., one or more of CACat, application-specific context information, CAIDs, etc.) for one or more peers and/or for one or more applications. A CM may be configured to generate the CAIDs for use by one or more peers. For example, the CM may generate a CAID for a peer based on the context information that may be used by the peer for P2P communication. A CM may be configured to exchange and update context information peers participating in P2P communication. For example, the CM may update the context information at one or more communication layers such as the PHY layer (e.g., using PHY layer signaling), the MAC layer (e.g., using MAC layer signaling), and/or using cross-layer techniques (e.g., using a combination of PHY/MAC layer signaling and/or some other layer signaling such as RRC). The CM may be implemented in the coordinator of an IEEE 802.15 network and/or in network entities (e.g., P-GW/S-GW/eNB/MME/HSS/PCRF/etc.) of a 3GPP cellular network.

In an example, a CM may be configured to provide inputs such as context information for the discovery and/or association procedures in P2P communication sessions. The CM may be configured to update the context information based on the outputs/results of discovery and/or association procedures.

In an example, context information may be managed by CM in an infrastructure-less networks (e.g., an ad hoc network). For example, for infrastructure-less P2P communications, a CM may be provisioned (e.g., pre-programmed) with certain context information for one or more peers by the CM manufacturer and/or service provider. The CM may obtain additional context information from the data exchange among peers. In an example, the CM may obtain context information during data exchange between peers occurring during and/or coinciding with peer discovery and/or peer association procedure(s). Based on the results of peer discover and/or peer association procedure(s), the CM may update the current context information and/or generate new context information.

If the infrastructure-less P2P communication is an extension of an infrastructure-based network (e.g., direct D2D communications between devices attached to a 3GPP network), the CM may be configured to obtain context information from the infrastructure-based network.

In an example, a CM may be configured to generate the CAID used for P2P communication based on one or more of the services being utilized by the peer, the applications executing on the peer device, peer information about the peer, and/or other types of context information such as CACat, etc. In an example, applications and/or services may agree on a pre-defined CACat set and/or on a predefined set of context information.

Table 2 illustrates examples of how a CM may generate a CAID for different applications and/or services. For example, if a peer wants to find peers using the applications associated with social networking applications, the CM in the peer device may use the CACat as CAID for fast discovery of peers in the proximity. If the peer already knows the specific application for which it wants to find peers, the CAID may be set as the CACat+the App ID for the application. If the peer knows specific group of peers that it wants to discover for a specific app, the CAID may be expressed as a CACat+App ID+User ID/Group ID. As may be appreciated, other combinations may be used based on the specific scenario for which the CAID is to be used.

TABLE 2

| CACat | Service/Application | CAID Example |
|---|---|---|
| Connection | Finding peers using social software | CACat |
| | Finding peers using Facebook | CACat + App ID |
| | Finding peer A (or a group of peers) using Facebook | CACat + App ID + User ID/Group ID |
| Shopping/ Entertaining (Commercial) | Finding advertisement from a store (e.g., Macys) | CACat + User ID (Macys) |
| | Finding coupons for clothes | CACat + App ID + App values |
| User-centric services | Finding peers playing a game (app) | CACat + App ID |
| | Finding peers interested in games for multi-hop | CACat + App ID + Multi-hop indicator |
| Emergency | Notifying the peers with an emergency | CACat |
| | Notifying the peers with an accident | CACat + App ID |

The CAID may be constructed in a hierarchical, flat and/or hybrid manner from the context information/PI. For hierarchical CAIDs, the first level (e.g., CACat in an example) may be standardized. By including the context information in the identifier used for peer discover and/or peer association, context information may be determined at a lower layer of the communication protocol stack (e.g., PHY, MAC, etc.) without having to decode the payload of the message. Such a mechanism that makes context information available at lower layers may facilitate context-aware fast discovery and/or association procedures being implemented at the PHY and/or MAC layers.

In an example, the CM may be included in/implemented by one or more nodes in an infrastructure-based network (e.g., a 3GPP network). Context information may be managed by a CM in the infrastructure-based networks. For example, a CM may obtain context information from one more devices connected to the infrastructure-based network and/or one or more controlling entities of the infrastructure-based network. Examples of controlling entities in an infrastructure-based network may include coordinators in an IEEE 802.15 network, coordinators in an 802.11 network, and/or P-GWs, eNBs, MMEs, etc. in a 3GPP cellular network.

The P2P CM functionalities may be centralized or distributed. For example, in a 3GPP network, the CM may reside with or interface with an eNB. In an example, the CM may reside within or interface with core network (CN) entities such as one or more of a PCRF, an HSS, an MME, a P-GW, etc. In an example, a CM may be classified as and/or divided into two logical entities: a CM-C (e.g., Context Manager-Core Network) and a CM-P (e.g., Context Manager-Peer). The CM-C may be implemented inside one or more entities within the network infrastructure and/or may interface to one or more entities with the network infrastructure (e.g., while residing inside or outside of the network infrastructure). A CM-P may reside within or be implemented by one or more peer devices.

Figure 9:
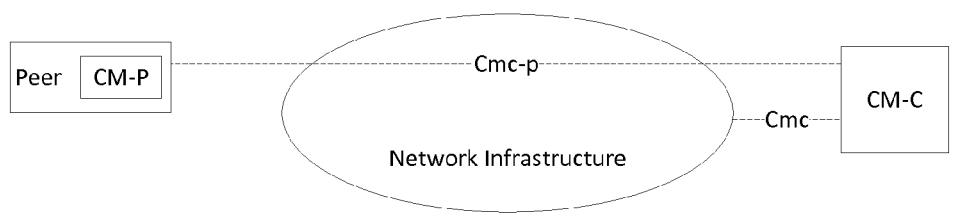
FIG. 9 illustrates an example of a distributed CM architecture where the CM-C is implemented outside of a network infrastructure.

FIG. 9 illustrates an example of a distributed CM architecture where the CM-C is implemented outside of a network infrastructure. For example, the CM-C may interface with the network infrastructure (e.g., a network coordinator, PCRF, MME, P-GW, eNB, etc.), through reference point Cmc. The CM-C may receive context information from the network entities and/or may send context information to the network entities via the Cmc. the CM-C may communicate with a CM-P implemented in a peer through a Cmc-p reference point. The CM-C and the CM-P may exchange context information via the Cmc-p.

Figure 10:
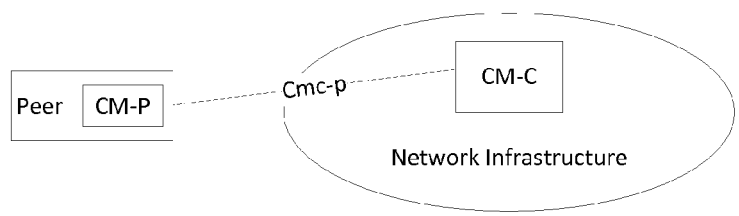
FIG. 10 illustrates an example of a distributed CM architecture where the CM-C is implemented within a network infrastructure.

FIG. 10 illustrates an example of a distributed CM architecture where the CM-C is implemented within a network infrastructure. Since the CM-C may be implemented in a network entity of the network infrastructure in FIG. 10, a Cmc reference point may not be utilized. However, the Cmc-p reference point may still be utilized for communications between the CM-C and the CM-P. In an example, other communications paths (e.g., different communication paths than the Cmc-p and Cmc reference points) may be used by a CM for exchanging context information and/or CAIDs.

In an example, a CAID may be generated by a CM (e.g., as a single logical entity and/or as a distributed entity with a CM-P and CM-C) in an infrastructure-based networks. For example, in an infrastructure-based networks, the CAID may be generated by a standalone CM, by a CM-P, and/or by a CM-C. For example, a CAID may be generated at the CM-P implemented in a peer. As an example, the CM-P may generate a CAID based on the context information available at the CM-P. The CM-P may indicate the CAID to CM-C and/or may send associated context information to the CM-C. Receiving new or updated context information and/or receiving new or updated CAID(s) at the CM-C may trigger the CM-C to update to the context information for the peer stored at the CM-C. The CM-C may provide context information to the CM-P, and the context information may be used for generating a CAID at the CM-P.

In an example, a CAID may be generated at a CM-C located inside or outside of the network infrastructure. As an example, the CM-C may generate a CAID based on the context information available at the CM-C. The CM-C may indicate the CAID to CM-P and/or may send associated context information to the CM-P. Receiving new or updated context information and/or receiving new or updated CAID(s) at the CM-P may trigger the CM-P to update to the context information stored at the CM-P in the peer. The CM-P may provide context information to the CM-C, and the context information may be used for generating a CAID at the CM-C.

Table 3 illustrates examples of CAID generation in an infrastructure-based network. For example, some types of CAIDs may be generated at a CM-P and other types of CAIDs may be generated at the CM-C. For example, some purely local P2P communications such as finding a peer to play a game against may be performed without involving the infrastructure-based network. In these cases, the CM-P may generate the CAID based on local context information/PI stored at the peer device. In other scenarios, one or more items of context information may be available at the network. For example, the infrastructure-based network may have additional information related to the cost or amount charged to a user for using certain services or applications. In this case, the CAID for P2P messages invoking such applications or services may be generated at the CM-C and sent to the CM-P. In many scenarios, the CAID may be generated at either the CM-C or CM-P, which may communicate the generated CAID (and/or underlying context information) to the other CM entity.

TABLE 3

| CACat | Service and applications | CAID Example |
| --- | --- | --- |
| Connection | Finding peers using social software | CACat as CAID generated by CM-P or CM-C |
| Shopping/ Entertaining (Commercial) | Personalized advertisement | CACat as CAId generated by CM-P |
| | Finding coupons for clothes | CACat + App ID + app values (clothes) as CAID generated by CM-P or CM-C |
| User-centric services | Finding peers playing a game (app) | CACat + App ID generated by CM-P |

Peer association may refer to a procedure used by one or more peers to establish a logic relationship with another peer(s) before P2P data transmission is commenced. For example, peer association may include procedures such as peer attachment, peering, pairing, link establishment, and/or the like.

Tradition peer association mechanisms, for example as defined in IEEE 802.15.4-2011, IEEE 802.15.4e, and/or IEEE 802.15.4 k, allow an RFD and/or FFD to send an association request to a peer FFD so that the peers can begin data transmission. The current association procedure is device-based and centralized, and is not related to user context or service context on the device. Disassociation is defined in IEEE 802.15.4-2011, which can be initiated by an RFD or an FFD, and is an example of device-based disassociation.

Figures 11, 12, 13:
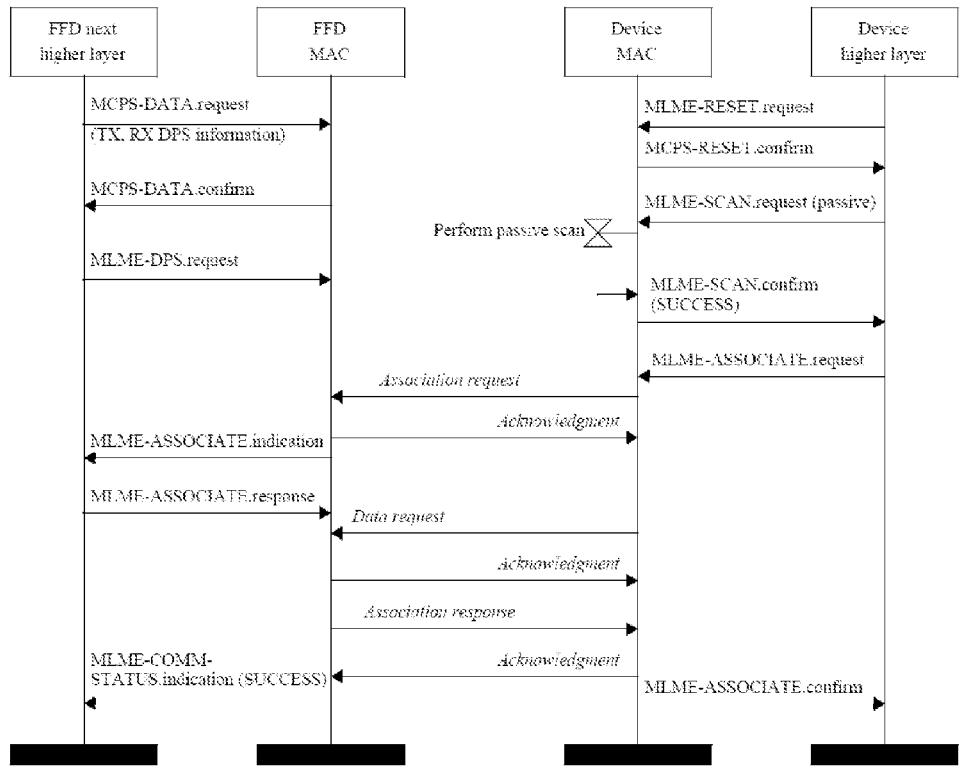
FIG. 11 is a signaling diagram of an example process for association in compliance with IEEE 802.15.4-2011.
FIG. 12 illustrates an example of an association request command as defined in IEEE 802.15.4-2011.
FIG. 13 illustrates an example of a capability information element that may be included in an association request command as defined in IEEE 802.15.4-2011.

FIG. 11 is a signaling diagram of an example process for association in compliance with IEEE 802.15.4-2011. As illustrated in FIG. 11, an association request and an association response may be exchanged between the requesting device and an FFD. The requesting device, in order to receive an association response from the FFD, may issue a data request command. In some scenarios, exchange of the data request command may increase the time it takes to complete the association process due to the indirect transmission nature in IEEE 802.15.4.

FIG. 12 illustrates an example of an association request command as defined in IEEE 802.15.4-2011. FIG. 13 illustrates an example of a capability information element that may be included in an association request command as defined in IEEE 802.15.4-2011. For example, an association request command may include a capability information element that may include one or more of the following fields: Device Type (e.g., FFD set to (1) or RFD set to (0)), Power Source (e.g., Alternating current source set to (1) or others set to (0)), Receiver On When Idle (e.g., Power saving/receiver off when Idle set to (0) or not power saving/receiver on when idle set to (1)), Security Capability (e.g., Security enabled set to (1) or security not enabled set to (0)), Allocate Address (e.g., The device requests coordinator to allocate a short address set to (1) or if not set to (0)).

FIG. 14 illustrates an example of an association response command as defined in IEEE 802.15.4-2011. For example, an association response command may include one or more of the following fields: Short Address (e.g., allocated to the device by a coordinator), Association Status (e.g., Association successful set to (00), PAN at capacity set to (01), PAN access denied set to (02), etc.).

In additional to the association mechanisms describe din IEEE 802.15.4-2011, a fast association procedure is defined in IEEE 802.15.4e. FIG. 15 illustrates a signaling diagram for an example process for fast association as specified in IEEE 802.15.4e. In the example illustrated in FIG. 15, a coordinator may directly send an association response to the device without waiting for data request from the device. IEEE 802.15.4e may be defined to support normal association as defined by IEEE 802.15.4-2011 for backward compatibility.

In addition, IEEE 802.15.4e may utilize a Deterministic and Synchronous Multi-channel Extension (DSME)-association request and response command. For example, FIG. 16 illustrates an example DSME-association request command as defined in IEEE 802.15.4e. FIG. 17 illustrates an example DSME-association response command as defined in IEEE 802.15.4e. In contrast to association request in IEEE 802.15.4, a DSME-association request may contain three additional fields: a Hopping Sequence ID, a Channel Offset, and an Association Type. The Hopping Sequence ID field may indicate the ID of channel hopping sequence being utilized. The Channel Offset field may be set to the offset value of the unassociated device attempting to associate with the PAN. The value of the Channel Offset filed may be specified by the next higher layer. The Association Type may be a bit in "Capability Information" filed that indicates whether the association procedure is a normal association procedure or a fast association procedure.

In contrast to association response in IEEE 802.15.4, a DSME-association response may include two additional fields: a Hopping Sequence Length and a Hopping Sequence. The Hopping Sequence Length field may specify the length of the Hopping Sequence used in the PAN if the PAN runs in both beacon-enabled mode and Channel Hopping mode (e.g., a ChannelDiversityMode of one). The Hopping Sequence field may indicate the current value of macHoppingSequenceList variable. The size of the Hopping Sequence field may be defined by the Hopping Sequence Length field. The Hopping Sequence field may be present if the PAN operates in both beacon-enabled mode and Channel Hopping mode (e.g., ChannelDiversityMode of one and the value of Hopping Sequence Length field is non-zero).

Although IEEE 802.15.4 k may not introduce a new association mechanism, IEER 802.15.4 k may change the association request and response format to support Relayed Slot-Link Network (RSLN) functionality. Thus, an RSLN-association request may be essentially the same as association request defined in IEEE 802.15.4e (e.g., the Capability Information field in IEEE 802.15.4 k and the Capability Information field 802.15.4e may be the same).

For example, FIG. 18 illustrates an example RSLN-association request command as defined in IEEE 802.15.4 k. FIG. 19 illustrates an example RSLN-association response command as defined in IEEE 802.15.4 k. For example, an RSLN-association response may introduce a new field called the Beacon Bitmap. The Beacon Bitmap field may include a bitmap indicating the beacon slot of a slotted-superframe reserved for transmitting a beacon from neighboring devices. A corresponding bit in the bitmap may be set to one if the beacon slot of the slotted-superframe is occupied. Bits of the bitmap corresponding to beacon slots of the slotted-superframe that are unoccupied may be set to zero. The length of the beacon bitmap may be expressed as be $2^\wedge$(macBeaconOrder−macSuperframeORder−3) bits and may be limited to 64 octets (e.g., (macBeaconOrder−macSuperFrameOrder)<=9).

After an association is established between a device and a coordinator, either the device or the coordinator may send a disassociation notification command to cancel the current association using direct or indirect transmission. For example, FIG. 20 illustrates a signaling diagram of an example process for disassociation initiated by a device. FIG. 21 illustrates a signaling diagram of an example process for disassociation initiated by a coordinator.

FIG. 22 illustrates an example of a disassociation notification format as defined in IEEE 802.15.4-2011. For example, a disassociation notification may include a Disassociation Reason field. Two dissociation reasons are currently defined in IEEE 802.15.4-2011: the coordinator wants the device to leave the PAN, or the device wishes to leave the PAN.

To support P2P communications, procedures may be utilized to establish an association relationship between communicating peers before user data transmissions are exchanged. Although some association mechanisms are proposed in IEEE 802.15.4 standards, these association mechanisms are mainly concerned with device-based association and device-to-coordinator unidirectional association (e.g., rather than user based association and/or service based association) and may not support P2P proximity communications.

For example, according to IEEE 802.15.8, fast association with distributed coordination may be utilized. If fast association with distributed coordination is utilized, association may be achieved without a centralized coordinator or dedicated server. For example, peers may be coordinated in a distributed scheme to support local P2P and group communications. In addition, a peer may simultaneously maintain multiple associations for different peers and for different services. In some examples, such as one-way communication P2P use cases such as commercial broadcasting and emergency broadcasting, unidirectional communication may be performed without utilizing an association mechanism. In addition, even though 3GPP ProSe targets P2P communication, there is currently no association protocol or mechanism specified for such P2P communications. Like IEEE 802.15, IEEE 802.11 addresses device-based association.

In order to support P2P proximity communication, one or more of the following functions may be utilized to create association(s) between peers that facilitate more meaningful establishment of P2P communication sessions. One or more of the elements described herein may be implemented in an association procedure, an association update procedure, a disassociation procedure, and/or a re-association procedure in order to support P2P communications. For example, association identifier(s) and association context(s) may be established using device-based, service-based, and/or user-based association methods. Unified association-related procedures may be utilized for peer selection, association, association update, disassociation, and/or re-association. Context-aware peer selection may be utilized to select appropriate peers for association from the list of discovered peers based on their context information obtained from peer discovery process. For example, context-aware virtual leader selection may be utilized. Virtual leader, sub virtual leader, and/or super virtual leader functionality may be utilized, for example, for dynamic virtual leader selection, dynamic virtual leader re-selection, and/or dynamic virtual leader notification.

For example, peer devices may be configured to perform context-aware association. Association mechanisms typically exchange limited amounts of device information during association, for example device type, device power source, security indication(s), power saving information, and short address allocation. In an example, other types of context information may be exchanged during association in order to provide a more meaningful association mechanism. For example, service-based association and/or user-based association may be performed. Since P2P communication may support diverse services and applications, providing additional context information during an association procedure may facilitate association that is more indicative of the desired services that a given user wishes to perform during the P2P session.

In contrast to device-based association in IEEE 802.15.4 or other communication protocols, service-based association and/or user-based association may be more appropriate for P2P communications. For example, typically P2P communication session may be user-centric, for instance a P2P session may be utilized as a gaming session and/or for content sharing. Such user-centric applications may benefit from user-based and/or service-based association. For example, in user-based association an association may be established among two or more users in order to trigger corresponding data transmission among the users.

In an example, P2P communication may utilize fast association mechanisms in order to reduce signaling overhead and/or to improve energy-efficiency and time-efficiency. For example, fast user-based and/or fast service-based association may be utilized for P2P association mechanisms.

In many scenarios, P2P association may utilize mutual association. In mutual association procedures, a peer may associate themselves to one or more other peers while substantially simultaneously associating the two or more other peers to themselves. For example, an initiating peer may request association with a recipient peer, and the recipient peer may issue an association request to the initiating peer as well. Upon completion of a mutual association procedure, a initiating peer may have an association for the recipient peer and the recipient peer may have an association for the requesting peer. Such mutual association is typically different from device-to-coordinator association, for example as specified in IEEE 802.15.4, which may establish association in a single direction.

In an example, P2P association mechanisms may support multiple associations being established by a single association procedure. For example, a peer may desire to maintain multiple associations with other peer(s) to support P2P communications. Existing association mechanisms typically utilize one-to-one associations. Multiple associations—for example a one-to-many association, a many-to-one association, and/or a many-to-many association—may be utilized for P2P communication. Mechanisms may be specified for ensuring that each of the established multiple association(s) utilizes an identifier and corresponding association context in a consistent manner.

In an example, P2P association may utilize a prioritized association procedure. For example, some P2P communication sessions may be prioritized over other P2P communication session. For example, P2P association procedures for emergency communications may be given priority over P2P association procedures for other purposes such as gaming sessions. Peers may be configured to process higher priority association requests over lower priority association requests.

In an example, P2P association may utilize multi-hop association. Many conventional association mechanisms typically support one-hop association, but not multi-hop association. Although IEEE 802.15.4 k does support limited forms of multi-hop association, IEEE 802.15.4 k is not designed for P2P use cases and is still a device-based, centralized association mechanism. Methods may be specified to allow a more diverse and flexible P2P multi-hop association procedure, for example to support multi-hop communication in a distributed approach.

In an example, P2P association may utilize channel switching. For example, to order to utilize and/or optimize P2P communication sessions, multiple communication channels and channel switching may used. In order to expedite channel switching during a P2P communication procedure, channel switching may be configured, utilized, and/or embedded during a P2P association procedure. In conventional approaches, channel switching typically is not considered during the association mechanism(s).

In an example, P2P association may utilize interactive discovery and association. For example, in 802.15.4 protocols, channel scan (e.g., discovery) and association are typically separate, distinct procedures (e.g., association is not performed until after channel scanning has been performed). For P2P communications, in order to reduce the latency of the discovery and/or association procedures, an association procedure and a discovery procedure may be interactively interleaved. For example, after a certain number of peers have been discovered, association may begin. If more peers are to be discovered, peer discovery may be re-conducted/re-imitated.

In an example, P2P association procedures may utilize an association update function. For example, after an original association has been established (e.g., P2P communications have commenced), associations may be updated periodically, intermittently, and/or in response to one or more criteria during the P2P communication session. Conventional methods in IEEE 802.15.4 typically support association and disassociation, but not updates to an established association. P2P services may utilize an association update function to update the context and/or properties of an existing association, such as a keep-alive use case.

In an example, association mechanisms may include context-aware distributed association. Context-aware distributed association may involve one or more of mutual association, fast multiple association with or without an association priority (e.g., including convergent multiple association, simultaneous multiple association, and/or sequential multiple association supporting interactive peer discovery and association), multi-hop association (e.g., including many-to-one and/or one-to-many in transparent manners), proxy association mode(s), hybrid association mode(s), and/or association with channel switching.

In an example, association update mechanisms may include context-aware distributed association update(s), fast multiple association update with or without an association priority (e.g., including convergent multiple association updating, simultaneous multiple association updating, and/or sequential multiple association updating), multi-hop association update(s) (e.g., including many-to-one and/or one-to-many in transparent manners), proxy association update mode(s), hybrid association update mode(s), and/or association updating with channel switching.

In an example, disassociation mechanisms may include context-aware distributed disassociation, fast multiple disassociation with or without an association priority (e.g., including convergent multiple disassociation, simultaneous multiple disassociation, and/or sequential multiple disassociation), multi-hop disassociation (e.g., including many-to-one and/or one-to-many in transparent manners), proxy disassociation mode(s), and/or hybrid disassociation mode(s).

In an example, re-association mechanisms may include context-aware distributed re-association that may support mutual association, fast multiple re-association with or without an association priority (e.g., including convergent multiple re-association, simultaneous multiple re-association, and/or sequential multiple re-association supporting interactive peer discovery and association), multi-hop re-association (e.g., including many-to-one and/or one-to-many in transparent manners), proxy re-association mode(s), hybrid re-association mode(s), and/or re-association with channel switching.

In an example, association mechanisms may include the utilization of association history information, the utilization of mobility information, and/or the utilization of association in hierarchical structure (e.g., including sub VL and super VL, association in multiple applications, interaction between association and routing protocols, etc.). In an example, association mechanisms for peer/WTRU association and attachment for proximity-based communications in cellular networks may be utilized. An association identifier and association context are supporting such functionality may be defined.

In contrast to pure device-based association in conventional communication methods, context-aware device-based, service-based, and/or user-based association may be utilized. FIG. 23 illustrates examples of context-aware association. The context-aware association may be device-based, service-based, and/or user-based. For example, as illustrated in FIG. 23, peers may maintain one or more associations with other peers. For example, Peer A 2302 may maintain an association for Peer B 2304, an association for Peer C 2306, and/or an association for Peer D 2308. Each association may have a locally unique association identifier (AID) and corresponding association context information (ACI). Examples of AIDs may include a device-based AID (DAID), a service-based AID (SAID), a user-based AID (UAID), etc. DAIDs may be used for device-based association, SAIDs may be used for service-based association, and UAIDs may be used for user-based association. One or more of a UAID, a DAID, and/or a SAID may be derived for the peer during a unified association procedure based on context information indicated by the CAID for the peer. For example, UAIDs, DAIDs, and/or SAIDs may be association-related identifiers that may be derived and/or utilized as association-specific CAIDs for association-related actions (e.g., UAIDs/CAIDs/DAIDs may be used as a CAID-type identifier for association related action). In addition to device/service/user-based association, peer association may be performed based on different format(s) of peer information (PI) and context-aware identifiers (CAIDs). The peer may be configured to generate a locally unique context-aware association identification (AID) for an association with the peer corresponding to the CAID, for example such that the AID may be maintained after disassociation. The WTRU may be configured to perform fast re-association with the peer corresponding to the CAID after disassociation based on the maintained AID.

Device-based association may be established between two peers, for example using contextual information to perform mutual association. Each device-based association may be identified by a locally unique DAID. There may be one device-based association between a pair of peers, but a given peer may have multiple device-based associations, for example a device-based association for each peer the given peer is communicating with. For example, Peer A 2302 may identify the device-based association with Peer B 2304 as DAID=1, Peer A 2302 may identify the device-based association with Peer C 2306 as DAID=2, and Peer A 2302 may identify the device-based association with Peer D 2308 as DAID=3. After the device-based association has been established, the two peers may transmit service-independent data. In an example, the two peers may maintain identical and locally unique DAID value(s) associated with the device-based association between the peers. For example, Peer B 2304 may associated DAID=1 with its association with Peer A 2308, Peer C 2306 may associated DAID=2 with its association with Peer A 2308, and/or Peer D 2308 may associated DAID=3 with its association with Peer A 2308. Each DAID may be associated with a corresponding association context. The association context may include one or more properties associated with the corresponding DAID (e.g., the established device-based association).

A service-based association may refer to an association or binding relationship of the same service among different peers. For example, each peer may have one or multiple P2P services in operation. Examples of P2P service may include social networking, emergency alarms, gaming sessions, content sharing, etc. Each service instance at a peer may have multiple service-based associations (e.g., each with a different peer). Each service-based association may be associated with a peer via a corresponding DAID (and/or with multiple peers via multiple corresponding DAIDs). If an SAID links to multiple DAIDs, the corresponding service-based association may be considered a group association.

In an example, each peer in the same group may have the same SAID. For example, consider SAID=1 in FIG. 23. Suppose Peer A 2302 utilizes a social networking service, and that, for example, Peer B 2304 and Peer C 2306 are utilizing the social networking service. In an example, Peer A 2302 may perform a service-based association with Peer B 2304 and/or Peer C 2306 in order to establish a service-based association for communicating data related to the social networking service. The service-based association may be established and the service-based association may be assigned SAID=1. Then Peer A 2302 may trigger the corresponding service and start service-dependent transmissions with one or more of Peer B 2304 and/or Peer 2306. The involved peers may maintain the identical and locally unique SAID value for the same service-based association (e.g., Peer B 2304 and/or Peer C 2306 may assign SAID=1 to the service-based association). Each SAID may be associated with a corresponding association context, which may include one or more properties associated with the SAID (e.g., the established service-based association).

A user-based association may refer to an association or binding relationship among users associated with different peers. For example, each established user-based association may have a locally unique identifier (e.g., a UAID). There may be multiple users on a given device and each user-based association may be established with a peer via a corresponding DAID (and/or with multiple peers via multiple corresponding DAIDs). If a UAID linked to multiple DAIDs, the corresponding user-based association may be considered a group association.

In an example, each of the peers in the same group may utilize the same UAID. For example, consider UAID=5 in FIG. 23. Suppose Peer A 2302 communicates with a friend, and the friend is associated or otherwise uses two devices (e.g., Peer C 2306 and Peer D 2308). In an example, Peer A 2302 may perform a user-based association with Peer C 2306 and/or Peer D 2308 in order to establish a user-based association for communicating data intended for the friend. The user-based association may be established and the user-based association may be assigned UAID=5. Peer A 2302 may then trigger the corresponding user-centric application with one or more of Peer B 2304 and/or Peer 2306. The involved peers may maintain the identical and locally unique SAID value for the same service-based association (e.g., Peer B 2304 and/or Peer C 2306 may assign SAID=1 to the service-based association). Each SAID may be associated with a corresponding association context, which may include one or more properties associated with the SAID (e.g., the established service-based association).

AIDs and ACIs may be maintained at the MAC layer (and/or higher layers), but other layers (e.g., PHY) may access AIDs and/or ACIs via one more cross-layer access interfaces. In addition, AIDs and/or ACIs maintained at a peer may be accessed by other peers. AID may be formed as a flat or hierarchical structure. Different methods may be used to generate a unique AID. For example, DAIDs may be generated based on globally unique device addresses of peers involved in the device-based association. In an example, SAIDs may be generated based on globally unique device addresses of peers involved in the service-based association and/or service categories requested during service-based association (e.g., one or more service related items of context information/PI). In an example, SAIDs may be generated based on corresponding DAID(s) and the service category(ies) of the service-based association (e.g., one or more service related items of context information/PI). In an example, UAIDs may be generated based on globally unique device addresses of peers and/or user identifiers involved in the user-based association (e.g., one or more user related items of context information/PI). In an example, UAIDs may be generated based on the corresponding DAID(s) and user identifiers involved in the user-based association (e.g., one or more user related items of context information/PI). CAIDs as described herein may be utilized to generate one or more of a DAID, a SAID, and/or a UAID. In an example, CAIDs may be utilized to generate a SAID and/or UAID, but not a DAID.

An ACI may include properties and related information of an established association. An ACI may be created as a result of an association procedure and may be maintained at the peers involved in the association procedure. Examples of information that may be included in an ACI may include, but is not limited to, an AID (e.g., the assigned association identifier for this established association), an association type (e.g., the type of established association such device-based, service-based, or user-based), a creation time (e.g., the time when the association was established/created), an association duration (e.g., the time length during which the established association is active and/or valid), an association priority (e.g., the priority of the established association), a requestor identifier (e.g., a requestor identifier of the established association), a recipient identifier (e.g., the recipient identifier of the established association), a current status (e.g., the current status of this established association), etc. For example, the current status may be active or inactive. When the established association is created, "Current Status" may be set to "active" and when the "Association Duration" has elapsed and/or when the established association is disassociated, the "Current Status" may be changed to "inactive".

Information included in an ACI may be specific to one or more of a device-based associations, service-based associations, and/or user-based associations. For example, for device-based association, the device-based ACI may include a list of corresponding SAIDs and/or a list of corresponding UAIDs. For service-based associations, the service based ACI may include a list of corresponding DAIDs. For user-based associations, the user-based ACI may include a list of corresponding DAIDs.

Two or more peers that have a device-based association and may have a service-based association and/or a user-based association (e.g., in order to have service-based communication and/or user-based communication, respectively). Service-independent communications may utilize device-based associations to exchange messages between peers. Device-based association may be a prerequisite for supporting service-independent and user-independent communication. To enable user-centric P2P applications, two or more peers may have both a user-based association and a device-based association. To enable served-specific P2P communications, two or more peers may have both a service-based association and a device-based association. Examples are disclosed to carry out device-based association, service-based association, and/or user-based association. Each device, service, and/or user may be associated with its own context, which may be leveraged as input to perform device-based, service-based, and/or user-based association.

FIG. 24 illustrates an example of separate device-based association, service-based association, and user-based association. For example, a peer may first perform device-based association. After a successful device-based association procedure, the peer may perform service-based association and/or user-based association. The service-based association and the user-based association may be performed in any order after device-based association is complete. Performing the associations in series may introduce relatively long latencies since multiple, separate procedures are utilized.

Figure 25:
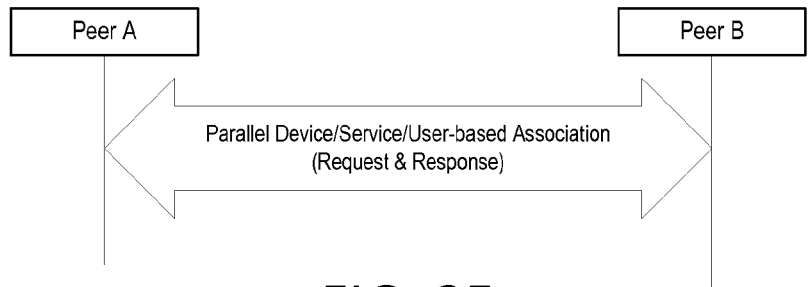
FIG. 25 illustrates an example of a parallel device-based/service-based/user-based association.

FIG. 25 illustrates an example of a parallel device-based/service-based/user-based association. Device-based association, service-based association, and user-based association may be performed in a single procedure (e.g., in parallel, concurrently, substantially simultaneously, etc.) to expedite the overall association procedure and achieve fast association. In an example, if a device-based association has already been established, the device-based association (e.g., the device-based association context) may be leveraged. Based on the established device-based association, a combined service-based and user-based association may be performed and/or separate service-based and user-based associations may be performed. Although examples included herein may described with respect to a parallel/combined device-based/service-based/user-based association procedure, aspects may be equally applicable to separate device-based association procedures, service-based association procedures (e.g., including service-based association procedures that leverage a pre-established device-based association) and/or user-based association procedures (e.g., including user-based association procedures that leverage a pre-established device-based association). After an association has been established between two or more peers (e.g., one or more of a device-based association, a service-based association, and/or a user-based association), the association may be updated, disassociated, and/or re-associated later by one or more of the peers.

Figure 26:
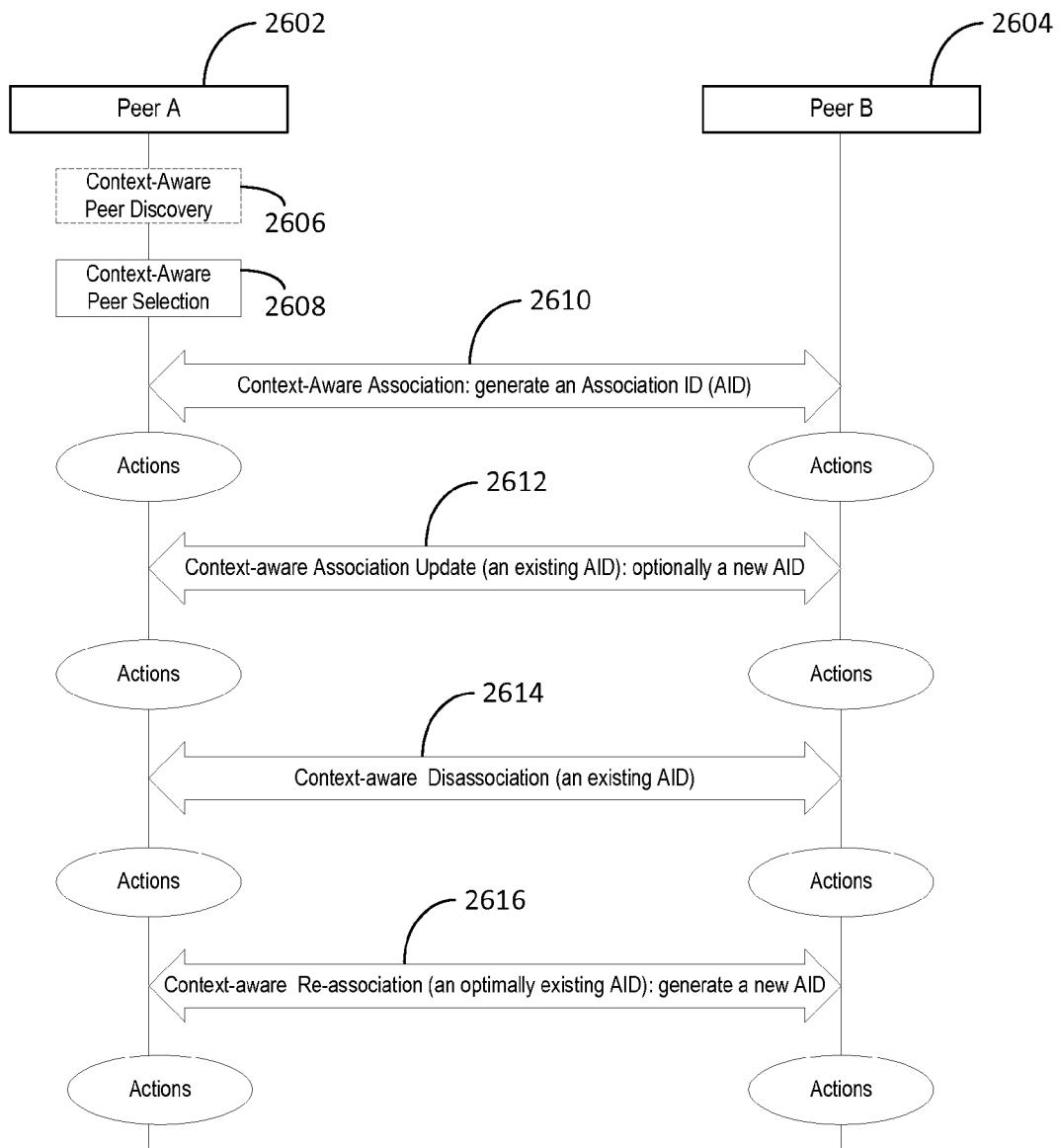
FIG. 26 illustrates an example unified procedure for one or more of context-aware AID-based association, context-aware AID-based association update, context-aware AID-based disassociation, and/or context-aware AID-based re-association.

FIG. 26 illustrates an example procedure for one or more of context-aware AID-based association, context-aware AID-based association update, context-aware AID-based disassociation, and/or context-aware AID-based re-association. For example, Peer A 2602 may send an association request to Peer B 2604. Association updates may be performed before or after disassociations procedures, while re-association procedures typically occur after disassociation has been performed. Each peer may maintain one or more timers. In an example, each peer may maintain two or more timers, for example a first timer for triggering periodic association updates (e.g., the first timer may be set when an association is established, when communications are sent/received for the association, and/or when the association is modified and upon expiration of the first an association update may be performed), and a second timer for triggering disassociation (e.g., the second timer m may be set when an association is established, when communications are sent/received for the association, and/or when the association is modified and upon expiration of the second a dissociation may be performed).

For example, at 2606 Peer A 2602 may perform context-aware peer discovery. For example, before Peer A 2606 establishes an association with other peers (e.g., Peer B 2604), Peer A 2606 may first perform discovery. Context-aware peer discovery procedures are discussed in more detail in several other sections of this disclosure.

As a result of peer discovery, Peer A 2602 may determine a list of peers that may be candidates for association. At 2608, Peer A 2602 may select one or more appropriate peers from the list to perform association with. For example, the selection may be based on context-specific information determined during the context-aware discovery procedure. Such selection may be referred to as context-aware peer selection. For example, Peer A 2602 may select Peer B 2604.

At 2610, Peer A 2602 and Peer B 2604 may perform context-aware association. For example, the two peers (e.g., Peer A 2602 and Peer B 2604) may establish a context-aware association in a distributed manner. For example, an AID may be assigned to the association. For example, if the association is a device-based association a DAID may be assigned, if the association is a service-based association a SAID may be assigned, and/or if the association is a user-based association a UAID may be assigned. For example, two or more of a device-based association, a service-based association, and/or a user-based association may be performed substantially concurrently. Each peer may maintain context information for the established association(s) (e.g., ACI). In order to reduce interference with other peers, promote potential concurrent association-related operations between other peers, and/or save power consumption, the requestor peer may select the appropriate transmission power level based on the link quality to the recipient peer(s). The link quality may be obtained from peer discovery process.

After the association procedure is complete, one or more of the peers (e.g., Peer A 2602 and/or Peer B 2604) may perform one or more actions such as triggering peer discovery to find other peers, optimizing the peer discovery scheme/behavior (e.g., changing the discovery channel sequence and/or period), performing channel switching for data transmission, performing context-aware peer selection, triggering association with other peers, triggering an association update to existing association relationship(s) with other peers, triggering disassociation for existing association relationship with other peers, changing the P2P operation mode (e.g., OF, OA, and/or OM), changing a unique code (e.g., orthogonal code and/or pseudo-random noise/number (PN) sequence) for data transmission, changing a duty-cycle schedule, changing service delivery behavior (e.g., service data rate), changing communication parameters (e.g., slot allocation and/or optimal channel access), and/or the like. In order to trigger one or more of these actions, parameters related to the respective actions may be include in one or more of the association request and/or association response.

At 2612, Peer A 2602 and Peer B 2604 may perform a context-aware association update. For example, one or more existing associations (e.g., device-based, service-based or user-based) may be updated by either peer (e.g., Peer A 2602 and Peer B 2604). For example, the ACI of the association may be changed periodically and/or may be changed based on the occurrence of one or more triggers, conditions, and/or events. In order to reduce interference with other peers, promote potential concurrent association-related operations between other peers, and/or save power consumption, the requestor peer may select the appropriate transmission power level based on the link quality to recipient peer(s). An association update may be triggered periodically by a pre-configured timer and/or based on the occurrence of an event or condition change.

After the association update procedure is complete, one or more of the peers (e.g., Peer A 2602 and/or Peer B 2604) may perform one or more actions such as triggering peer discovery to find other peers, optimizing the peer discovery scheme/behavior (e.g., changing the discovery channel sequence and/or period), performing channel switching for data transmission, performing context-aware peer selection triggering association with other peers, triggering an association update to existing association relationship(s) with other peers, triggering disassociation for existing association relationship with other peers, changing the P2P operation mode (e.g., OF, OA, and/or OM), changing a unique code (e.g., orthogonal code and/or pseudo-random noise/number (PN) sequence) for data transmission, changing a duty-cycle schedule, changing service delivery behavior (e.g., service data rate), changing communication parameters (e.g., slot allocation and/or optimal channel access), and/or the like. In order to trigger one or more of these actions, parameters related to the respective actions may be include in one or more of the association update request and/or association update response.

At 2614, Peer A 2602 and Peer B 2604 may perform a context-aware disassociation. For example, one or more existing associations (e.g., device-based, service-based or user-based) may dissociated by either peer (e.g., Peer A 2602 and Peer B 2604). For example, dissociation may be triggered based on the expiration of a dissociation timer for the association. In order to reduce interference with other peers, promote potential concurrent association-related operations between other peers, and/or save power consumption, the requestor peer may select the appropriate transmission power level based on the link quality to recipient peer(s). An dissociation may be triggered periodically by a pre-configured timer and/or based on the occurrence of an event or condition change.

In an example, if a DAID is disassociated, each of the corresponding SAIDs and UAIDs for that DAID may be disassociated as well. However, the ACI of disassociated associations may be maintained at peers for a period of time (e.g., with an association status marked as inactive) so that the information included in the ACI may be leveraged by future re-association requests.

In an example, if a DAID is disassociated, the corresponding SAIDs and UAIDs (e.g., and their corresponding ACI) may not be cancelled, but instead may be maintained as active. When re-association for the DAID is conducted later, device-based re-association may be performed and fast re-association may be achieved since it may be unnecessary to perform service-based and/or user-based association since these associations may remain active.

In an example, if an SAID is disassociated, there may be no change to the corresponding device-based association (e.g., DAID). The service-based association for the SAID (e.g., service-based ACI) may be cancelled or maintained for a period of time (e.g., with an association status marked as inactive).

In an example, if an UAID is disassociated, there may be no change to the corresponding device-based association (e.g., DAID). The service-based association for the UAID (e.g., user-based ACI) may be cancelled or maintained for a period of time (e.g., with an association status marked as inactive).

After the dissociation procedure is complete, one or more of the peers (e.g., Peer A 2602 and/or Peer B 2604) may perform one or more actions such as triggering peer discovery to find other peers, optimizing the peer discovery scheme/behavior (e.g., changing the discovery channel sequence and/or period), performing channel switching for data transmission, performing context-aware peer selection, triggering association with other peers, triggering an association update to existing association relationship(s) with other peers, triggering disassociation for existing association relationship with other peers, changing the P2P operation mode (e.g., OF, OA, and/or OM), changing a unique code (e.g., orthogonal code and/or pseudo-random noise/number (PN) sequence) for data transmission, changing a duty-cycle schedule, changing service delivery behavior (e.g., service data rate), changing communication parameters (e.g., slot allocation and/or optimal channel access), and/or the like. In order to trigger one or more of these actions, parameters related to the respective actions may be include in one or more of the disassociation request and/or disassociation response.

At 2614, Peer A 2602 and Peer B 2604 may perform a context-aware re-association. For example, after one or more existing associations (e.g., device-based, service-based or user-based) have been dissociated, either peer (e.g., Peer A 2602 and Peer B 2604) may request the re-associate the disassociated association. For example, a different/new AID (e.g., DAID, SAID, and/or UAID) may be generated or a previous and/or inactive AID (e.g., DAID, SAID, and/or UAID) may be used. The previous and/or inactive AID (e.g., DAID, SAID, and/or UAID) may have been disassociated but still maintained at both peers. In order to reduce interference with other peers, promote potential concurrent association-related operations between other peers, and/or save power consumption, the requestor peer may select the appropriate transmission power level based on the link quality to recipient peer(s).

If a service-based and/or user-based association is to be re-associated, a device-based association may be established first using a separate approach and/or may be established in parallel (e.g., as illustrated in FIG. 25). If there is an existing device-association, service-based and/or user-based re-association may be performed directly.

After the re-association procedure is complete, one or more of the peers (e.g., Peer A 2602 and/or Peer B 2604) may perform one or more actions such as triggering peer discovery to find other peers, optimizing the peer discovery scheme/behavior (e.g., changing the discovery channel sequence and/or period), performing channel switching for data transmission, performing context-aware peer selection, triggering association with other peers, triggering an association update to existing association relationship(s) with other peers, triggering disassociation for existing association relationship with other peers, changing the P2P operation mode (e.g., OF, OA, and/or OM), changing a unique code (e.g., orthogonal code and/or pseudo-random noise/number (PN) sequence) for data transmission, changing a duty-cycle schedule, changing service delivery behavior (e.g., service data rate), changing communication parameters (e.g., slot allocation and/or optimal channel access), and/or the like. In order to trigger one or more of these actions, parameters related to the respective actions may be include in one or more of the re-association request and/or re-association response.

In an example, one or more peers may perform context-aware peer selection. For example, a peer may be configured to select other peers for association based on a list of discovered peers. Each discovered peer may be associated with corresponding context information (e.g., PI), which may have been obtained from the peer discovery process. Different criteria may be used to select appropriate peers, for example the selection may be based on one or more metrics in various combinations. Examples of metrics that may be used to select one or more peers may include link quality (e.g., select peer(s) with better link quality), residual energy (e.g., select peer(s) with maximum residual energy), number of associated peers for a service (e.g., select peer(s) with the maximum number of associated peers for a service), traffic load (e.g., select peer(s) with the least traffic load), reputation (e.g., select peer(s) with high reputation as commented from other peers), amount of online time (e.g., select peer(s) with the longer average online times), mobility information (e.g., select peer(s) with the lower probability of mobility and/or a more static mobility history), distance (e.g., select peer(s) with the shortest physical distances from the user), and/or a weighted combination of these or other factors.

The best potential peers may be selected based on some or all of the above identified metrics (e.g., potentially other metrics as well) in different orders and/or applying different weights. For example, the metrics may be placed in an order, and the peers may be evaluated based on the metrics in that order. The order of metrics may be dynamically changeable. For example, a plurality of potential peers may be first selected based on a first metric (e.g., the plurality may be the highest rated peers according to the first metric), then the selected peers may be filtered based on second metric. One or more of the selected peers that rank highly on the second metric may then be filtered based on a third metric. Similarly, those peers that remain may then be filtered based on a fourth metric, and so on until a desired number of peers have been selected. The number of metrics utilized may depend on the particular association and/or the desired implementation. The order of the metrics may be random and/or may be selected based on the particular association or the desired implementation. For example, peers may first be ranked based on traffic load, and then filtered based on link quality. The order may be application specific and may depend on application QoS requirements.

In an example, one or more peers may be configured to select a context-aware virtual leader. For example, a virtual leader may be determined and/or changed during one or more of association, association update, disassociation, and/or re-association. Thus, a new virtual leader may be selected after one or more of these association procedures. Different criteria may be used to select appropriate virtual leader, for example the selection may be based on one or more metrics in various combinations. Examples of metrics that may be used to select one or more virtual leaders may include link quality (e.g., select VL with better link quality), residual energy (e.g., select VL with maximum residual energy), number of associated peers for a service (e.g., select VL with the maximum number of associated peers for a service), traffic load (e.g., select VL with the least traffic load), reputation (e.g., select VL with high reputation as commented from other peers), amount of online time (e.g., select VL with the longer average online times), mobility information (e.g., select VL with the lower probability of mobility and/or a more static mobility history), distance (e.g., select VL with the shorter physical distances from the user), weighted average physical distance (e.g., select VL with the shortest average physical distances from peers), number of hops to other peers (e.g., select VL with the least number of hops on average to peers), total capacity (e.g., select VL with the largest total capacity to potential peers), capacity to individual peers (e.g., select VL with the maximum and/or minimum capacity to one or more (or all) potential peers), amount of resources (e.g., select the virtual leader with the most resources such as one or more of storage, computation capability, etc.), and/or a weighted combination of these or other factors.

The best potential VL may be selected based on some or all of the above identified metrics (e.g., potentially other metrics as well) in different orders and/or applying different weights. For example, the metrics may be placed in an order, and the potential VLs may be evaluated based on the metrics in that order. The order of metrics may be dynamically changeable. For example, a plurality of potential VLs may be first selected based on a first metric (e.g., the plurality may be the highest rated potential VLs according to the first metric), then the selected potential VLs may be filtered based on a second metric. One or more of the selected potential VLs that rank highly on the second metric may then be filtered based on a third metric. Similarly, those potential VLs that remain may then be filtered based on a fourth metric, and so on until a VL has been selected. The number of metrics utilized may depend on the particular association and/or the desired implementation. The order of the metrics may be random and/or may be selected based on the particular association or the desired implementation. For example, potential VLs may first be ranked based on traffic load, and then filtered based on link quality. The order may be application specific and may depend on application QoS requirements.

There may be one or more scenarios in which a new VL is selected. For example, a new VL may be selected at the beginning of a session for an application. For example, a peer may select itself as the VL at the beginning of a session for a specific application if there is no other VL for the same application in the proximity.

Figure 27:
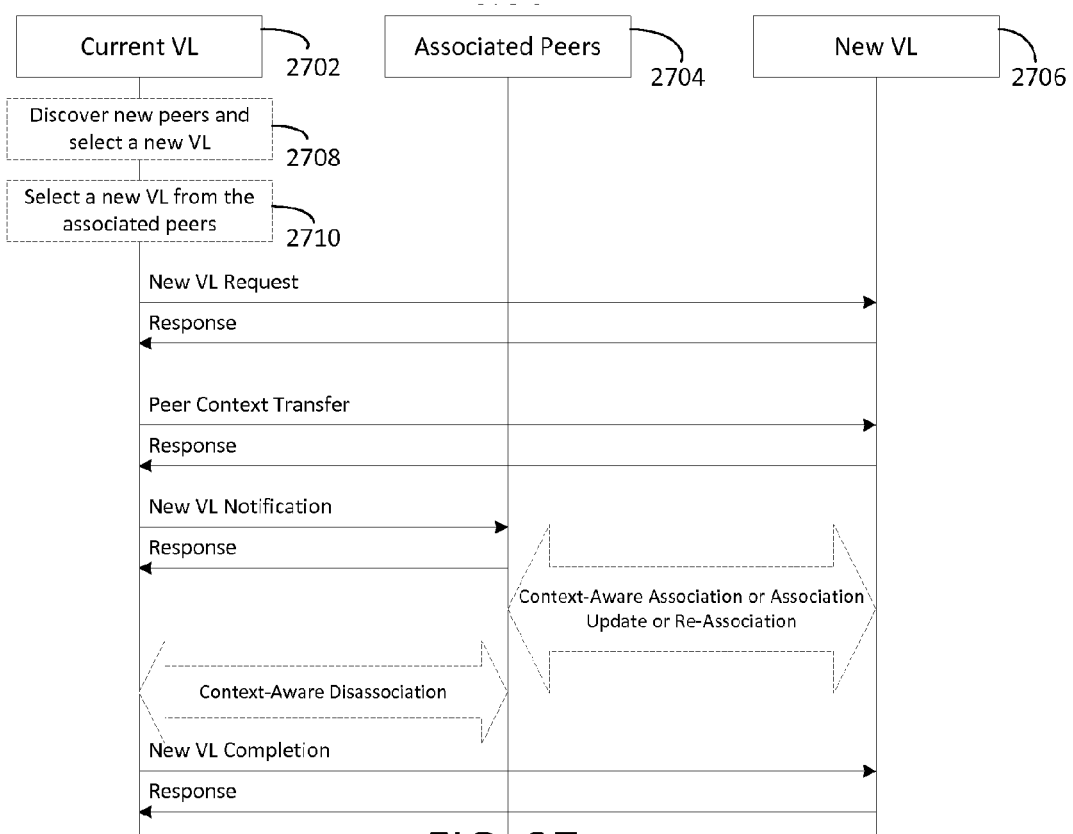
FIG. 27 illustrates an example procedure for VL selection and notification in an example where the current VL selects a new VL.

In an example, a new VL may be selected by an existing or current VL. For example, a current VL may select a new VL candidate from existing peer(s) and/or newly discovered peer(s). The current VL may notify the other peers of the new VL candidate. The other peer(s) may perform association (e.g., association, association update, etc.) with the new VL candidate. In an example, the new VL candidate may inherit one or more existing associations with the peer(s) from the current VL. For example, FIG. 27 illustrates an example procedure for VL selection and notification in example where the current VL selects a new VL. If the new VL candidate rejects being the VL and/or is rejected by other peers, the current VL may select another new VL candidate and may repeat a similar procedure.

For example, at 2708 Current VL 2702 may discover new peers and may select a newly discovered peer as a new VL candidate (e.g., New VL 2706), and/or at 2710 Current VL 2702 may select an associated peer from Associated Peers 2704 as the new VL candidate (e.g., New VL 2706). Current VL 2702 may send a New VL Request message to the new VL candidate (e.g., New VL 2706). Information such as the number of associated peers and context information about associated peers may be contained in this message.

The new VL candidate (e.g., New VL 2706) may decide to accept or reject the request and send may send a response to Current VL 2702. The new VL candidate (e.g., New VL 2706) may include its context information in the response message. Current VL 2702 may send a Peer Context Transfer message to the new VL candidate (e.g., New VL 2706). Context information about one or more of Associated Peers 2704 may be included in the Peer Context transfer message. The new VL candidate (e.g., New VL 2706) may inherit one or more association relationships with Associated Peers 2704 from Current VL 2702 based on the received association/context information. As a result, a subsequent or new association may not be established.

The new VL candidate (e.g., New VL 2706) may send back a peer context transfer response to Current VL 2702. Current VL 2702 may send a New VL Notification message to one or more (and/or all) other Associated Peers 2704. For example, an individual New VL Notification message may be sent to each of Associated Peers 2704 individually or a combined message may be multicast to two or more of Associated Peers 2704. The new notification message may trigger the disassociation of Current VL 2702 and one or more of Associated Peers 2704 at the same time. One or more (and/or all) of Associated Peers 2704 may send a response for the New VL Notification message to the current VL. Associated Peers 2704 may perform context-aware association, context-aware association update, context-aware re-association, and/or context-aware re-establish association with the new VL candidate (e.g., New VL 2706). Context-aware disassociation may be performed between Current VL 2702 and one or more of Associated Peers 2704. Current VL 2702 may send a New VL Completion message to the new VL candidate (e.g., New VL 2706). The new VL candidate (e.g., New VL 2706) send a New VL Completion response to Current VL 2702.

In an example, a peer may nominate itself as a new VL candidate, for example upon approval from the current VL. Then, other peers may perform association procedures with this peer (e.g., the new VL) and/or the new VL candidate may inherit one or more existing associations from the current VL for other peers.

Figure 28:
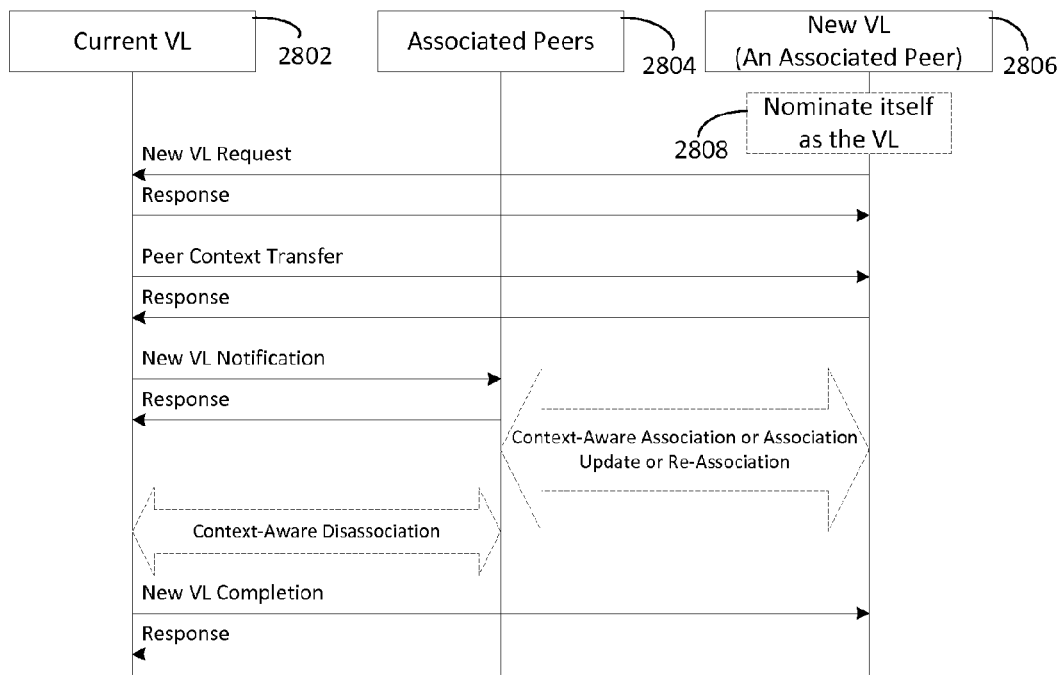
FIG. 28 illustrates an example procedure for VL selection and notification in an example where a peer nominates itself to be the new VL.

FIG. 28 illustrates an example procedure for VL selection and notification in example where peer nominates itself to be the new VL. For example, at 2808 New VL 2706 may nominate itself as a new VL candidate. New VL 2806 may currently been one of Associated Peers 2804 when it makes the nomination. New VL 2806 may currently have one or more existing associations with some or all of Associated Peers 2804 when it makes the nomination. New VL 2706 may send a New VL Request message to Current VL 2802. Information such as the number of associated peers, association information, and context information for New VL 2806 may be included in this message.

Current VL 2802 may decide to accept or reject the request and send may send a response to New VL 2702. Current VL 2802 may include its context information in the response message. Current VL 2702 may send a Peer Context Transfer message to New VL 2806. Context information about one or more of Associated Peers 2804 may be included in the Peer Context transfer message. New VL 2806 may inherit one or more association relationships with Associated Peers 2804 from Current VL 2802 based on the received association/context information. As a result, a subsequent or new association may not be established.

New VL 2708 may send back a peer context transfer response to Current VL 2802. Current VL 2802 may send a New VL Notification message to one or more (and/or all) other Associated Peers 2804. For example, an individual New VL Notification message may be sent to each of Associated Peers 2804 individually or a combined message may be multicast to two or more of Associated Peers 2804. The new notification message may trigger the disassociation of Current VL 2802 and one or more of Associated Peers 2804. One or more (and/or all) of Associated Peers 2804 may send a response for the New VL Notification message to Current VL 2802. Associated Peers 2804 may perform context-aware association, context-aware association update, context-aware re-association, and/or context-aware re-establish association with New VL 2806. Context-aware disassociation may be performed between Current VL 2802 and one or more of Associated Peers 2804. Current VL 2802 may send a New VL Completion message to New VL 2806. New VL 2806 send a New VL Completion response to Current VL 2802.

In an example, a peer may actively nominate itself as a new VL candidate, but the current VL may become unavailable. The new VL candidate may notify other peers of the nomination, and the other peers may then perform context-aware association, context-aware association update, and/or context-aware re-association with the new VL candidate.

Figure 29:
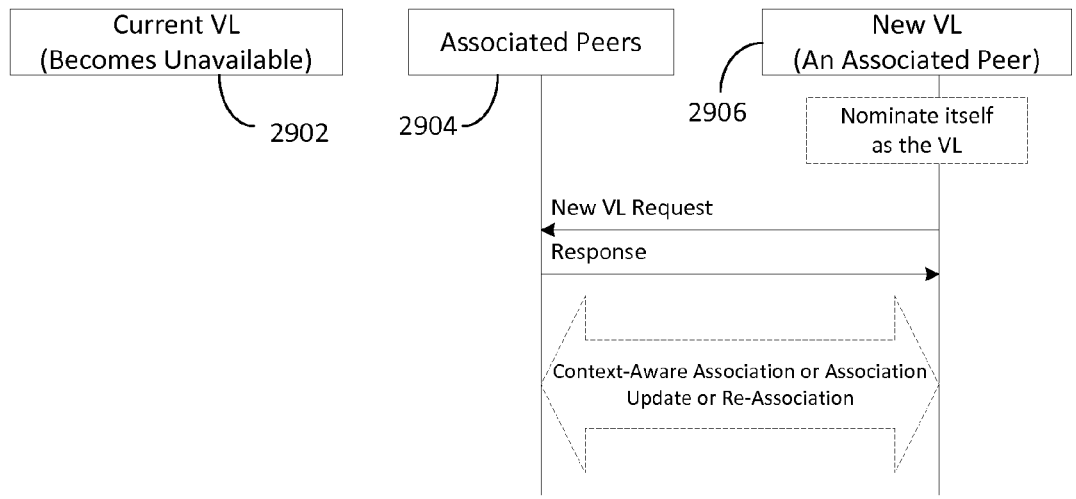
FIG. 29 illustrates an example procedure for VL selection and notification in an example where a peer nominates itself to be the new VL and the current VL becomes unavailable.

For example, FIG. 29 illustrates an example procedure for VL selection and notification in an example where a peer nominates itself to be the new VL and the current VL becomes unavailable. For example, New VL 2906 may determine to nominate itself as a new VL. Since Current VL 2902 may be unavailable to negotiate/facilitate a change in VL, New VL 2906 may send a New VL Request message to other peers (e.g., one or more of Associated Peers 2904). Context information for New VL 2906 may be included in the New VL Request message. For example, an individual New VL Request message may be sent to each of Associated Peers 2904 individually or a combined message may be multicast to two or more of Associated Peers 2904. Associated Peers 2904 may decide may determine to accept or reject the request and may send back a response to the New VL 2906. Associated Peers 2904 may include their respective context information in the response message. Associated Peers 2904 may perform a context-aware association, context-aware association update, and/or context-aware re-association with the new VL candidate (e.g., New VL 2906).

Typically, conventional association mechanisms are related to device-based association and do not consider situational context. For both infrastructure-based and infrastructure-less P2P communications, context-aware association may allow peers to establish more efficient mechanisms for service-based and user-based association. The context-aware association may be based on the exchange of an association request and an association response between peers (e.g., one peer may be the requestor and the other peer may be the recipient). However, for one or more of service-based association and/or user-based association, context information for one or more peers may be included in the association-related message (e.g., association request and/or association response). As a result, more meaningful association requests and/or more meaningful association responses may be utilized to enable service-based association and/or user-based association.

For example, examples may leverage context-aware association to adjust and optimize succeeding data transmissions, for example, to configure optimal parameters/behaviors for competing/selecting channel(s) in the MAC layer. In an example, context-aware association may be leveraged to facilitate service negotiation. For instance, in a streaming video example, peers with different device types may be configured to receive content streaming with different properties such as data rate, etc. The such context information may be utilized in the association process. In an example, context-aware association may be leveraged to improve future peer discovery, to improve disassociation, to improver re-association, to fulfill peer service binding, to perform channel switching in parallel, etc.

Existing association mechanisms in IEEE 802.15.4 are essentially unidirectional device-to-coordinator association. The association for P2P use cases may be unidirectional and/or bi-directional mutual association between peers. As a result, an association response message may serve not only as response to the originated request from another peer, but to request association in the reverse direction so that mutual association can be established.

In the context-aware association, each association may be assigned a locally unique identifier (e.g., AID). Example AIDs may include a DAID, a SAID, and/or a UAID. The AIDs may be created using context information for the peer(s) (e.g., may include a CAID and/or may be a form of CAID). Once an association has been established, the peer(s) (e.g., requestor and/or recipient) may create and maintain context information for the established association (e.g., ACI). The ACI may be updated later via association updates. The ACI may be leveraged for service adaption.

Figure 30:
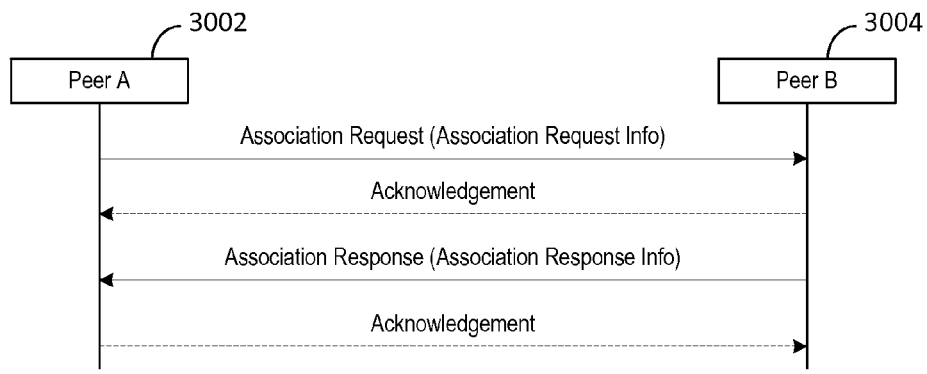
FIG. 30 illustrates an example procedure for a context-aware distributed association.

For example, FIG. 30 illustrates an example procedure for a context-aware distributed association. In the example shown in FIG. 30, Peer A 3002 may act as the association requestor and may associate with Peer B 3004 (e.g., association recipient). For example, Peer A 3002 may send an association request to Peer B 3004. In addition to information typical association information (e.g., as contained in existing association request in IEEE 802.15.4), additional association request information (AREQI) may be included in the association request message. For instance, Peer A 3002 may indicate an association type (e.g., the association request may be for one or more of user-based association, service-based association, and/or device-based association). Peer A 3002 may request one or more service-based association requests and/or one or more user-based associations to Peer B 3004 in a single association request message. Examples of AREQI are discussed in other sections. In addition, the association request may contain a response flag to instruct Peer B 3004 how to send back an ACK and/or other response. For example, the response flag may indicate whether Peer B 3004 should send an ACK and association response separately, send an ACK and an association response in one merged message, and/or that an ACK does not have to be sent. Peer B 3004 may send an ACK to Peer A 3002 to acknowledge the reception of the association request message (e.g., as instructed by the response flag contained in the association request).

Peer B 3004 may send association response to Peer A 3002. In addition to typical association response information (e.g., information as contained in existing association response in IEEE 802.15.4), response context information (ARESI) may be included in the association response message. The association response may serve two purposes. First, the association response may serve as a response to the association request sent from peer A 3002. Second, the association response may serve as a request for association from Peer B 3004 to Peer A 3002 (e.g., mutual association). If Peer B 3004 rejects the association request from Peer A 3002, the association response may not contain the request for association from Peer B 3004 to Peer A 3002. One or more items of information contained in the association response (e.g., ARESI) may be the assigned AIDs, which could be DAIDs, SAIDs, and/or UAIDs. Examples of ARESI are discussed in other sections.

Peer A 3002 may send an ACK to Peer B 3004 to acknowledge the reception of an association response message, to approve the implicit association request from Peer B contained in association response, and/or to agree on the parameters (if any) piggybacked in the association response message such as assigned AIDs.

Figure 31:
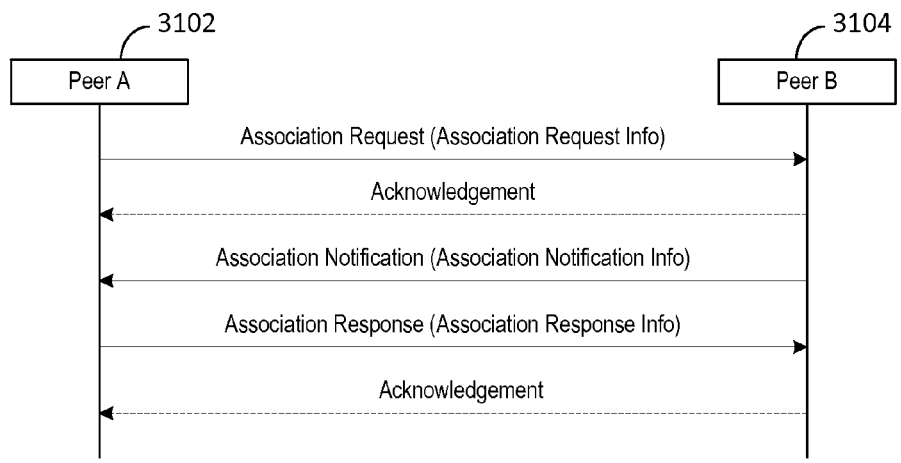
FIG. 31 illustrates another example procedure for a context-aware distributed association.

FIG. 31 illustrates another example procedure for a context-aware distributed association. In the example shown in FIG. 31, Peer A 3102 may act as the association requestor and may associate with Peer B 3104 (e.g., association recipient). For example, Peer A 3102 may send an association request to Peer B 3104. In addition to information typical association information (e.g., as contained in existing association request in IEEE 802.15.4), additional AREQI may be included in the association request message. For instance, Peer A 3102 may indicate an association type (e.g., the association request may be for one or more of user-based association, service-based association, and/or device-based association). Peer A 3102 may request one or more service-based association requests and/or one or more user-based associations to Peer B 3104 in a single association request message. In addition, the association request may contain a response flag to instruct Peer B 3104 how to send back an ACK and/or other response. For example, the response flag may indicate whether Peer B 3104 should send an ACK and association response separately, send an ACK and an association response in one merged message, and/or that an ACK does not have to be sent. Peer B 3104 may send an ACK to Peer A 3102 to acknowledge the reception of the association request message (e.g., as instructed by the response flag contained in the association request).

Peer B 3104 may send an association notification to Peer A 3102. For example, in addition to typical information include in an existing association response (e.g., as specified in IEEE 802.15.4), association notification information (ANI) may be included in the association notification message. The association notification may serve two purposes. First, the association response may serve as a response to the association request sent from Peer A 3102. Second, the association notification may serve as a request for association from Peer B 3104 to Peer A 3102 (e.g., mutual association). If Peer B 3104 rejects the association request from Peer A 3102, the association response may not contain the request for association from Peer B 3104 to Peer A 3102. One or more items of information contained in the association response (e.g., ARESI) may be the assigned AIDs, which could be DAIDs, SAIDs, and/or UAIDs.

Peer A 3102 may send an association response to Peer B 3104 as a response to the association notification message. The association response may include the assigned AIDs and/or may include additional context information (e.g., ARESI). Peer B 3104 may send an ACK to Peer A 3102 to acknowledge the reception of an association response message. Information contained in association request (e.g., AREQI) may include various contextual information about the sender of association request and/or requirements regarding the association to be established. The information included in the association request may be association-specific information and/or one or more items of peer information (PI).

For example, the AREQI may include a device profile of the association requestor. The device profile may include a device type (e.g., smart phone, tablet, media player, etc.) For example, the device classes defined by Open Mobile Alliance (OMA) may be utilized. Static and/or dynamic device properties may be included in the device profile. For example, static properties may include operating system, memory, CPU, screen size, radio interfaces, etc. Dynamic properties may include residual energy, location, mobility, number of associated neighbors, duty-cycle schedule, power saving mode selection, etc.

In an example, the AREQI may include a user profile of the association requestor. For example, the user profile may include a user ID, a group ID, privacy level, security level, etc.

In an example, the AREQI may include a service profile of the association requestor. For example, the service profile may include a list of supported services. The list may include one or more properties of services identified by the list. Example service properties may include a service type, a service priority flag, a status, a number of required partners, a number of waiting partners, a keep-alive timer, a forwarding capability indication, etc. In an example, the service profile may include a list of requested services and/or one or more properties of the requested services. Example service properties may include a service type, a service priority flag, a status, a number of required partners, a number of waiting partners, a keep-alive timer, a forwarding capability indication, etc. In an example, the service profile may include one or more of a virtual leader indication, a channel quality (e.g., Received signal strength indication (RSSI)), a timestamp for synchronization (e.g., the local time when association request was sent), an indication of associations with peers behind the other peer, a new channel ID to be requested, the reputation of requestor peer, and/or the like.

In an example, the AREQI may include one or more association requirements. For example, the association requirements may establish one or more of an association type (e.g., device-based, service-based, and/or user-based), an association duration (e.g., the requested lifetime of the association to be established), an association priority (e.g., the priority of the association to be established), a random number (e.g., to make the association itself secure), a security key (e.g., used for authentication purpose—may be a public key as provisioned), and/or the like. In an example, the AREQI may include association history information of the association requestor.

Information to facilitate context-based association may be included in an association response (e.g., ARESI) and/or an association notification (e.g., ANI). For example, the ARESI and/or ANI may include one or more items of context information. The ARESI and/or ANI may include a combination of association-specific information and/or a portion of peer information (PI).

For example, the ARESI and/or ANI may include a device profile of the association recipient: device type: smart phone, tablet, media player, etc. The device profile may include a device type (e.g., smart phone, tablet, media player, etc.) For example, the device classes defined by Open Mobile Alliance (OMA) may be utilized. Static and/or dynamic device properties may be included in the device profile. For example, static properties may include operating system, memory, CPU, screen size, radio interfaces, etc. Dynamic properties may include residual energy, location, mobility, number of associated neighbors, duty-cycle schedule, power saving mode selection, etc.

In an example, the ARESI and/or ANI may include a user profile of the association recipient. For example, the user profile may include a user ID, a group ID, privacy level, security level, etc.

In an example, the ARESI and/or ANI may include a service profile of the association recipient. For example, the service profile may include a list of supported services. The list may include one or more properties of services identified by the list. Example service properties may include a service type, a service priority flag, a status, a number of required partners, a number of waiting partners, a keep-alive timer, a forwarding capability indication, etc. The service profile may include association related information. Examples of association related information may include one or more of an assigned association duration, an association priority, an assigned security key, an assigned new channel ID, a keep-alive indication, a multi-hop and/or forwarding indication, an association identifier (e.g., one or more AIDs such as DA/Ds, SAIDs, and/or UAIDs—the one or more AIDs may be used for performing an association update, disassociation, and/or re-association), a random number (e.g., to establish an association itself secure), a security key (e.g., an assigned security key for future data transmission may be included—the security key may be a public key and/or a new key as determined based on the security key and/or random number included in the association request), and/or the like. The service profile may include service negotiation information, such as a service and/or content adaptation based on device type information (e.g., screen size and mobility) and/or a player sequence assignment (e.g., such as in multiplayer gaming). The service profile may include discovery behavior such as one or more of a discovery period, a channel sequence to be scanned for discovery, association feedback for discovery (e.g., broadcast or not), and/or the like.

In an example, the ARESI and/or ANI may include information related to the communication behavior for the requestor. Examples of information related to the communication behavior for the requestor may include one or more of a channel access scheme (e.g., contention-free or contention-based), an assigned value for a keep-alive timer, an assigned new orthogonal code for future communications, a backoff timer, an ACK mechanism, a new orthogonal code, an assigned duty-cycle schedule, a time slot schedule, and/or the like.

In an example, the ARESI and/or ANI may include information related to a P2P operation configuration. Examples of information related to a P2P operation configuration may include one or more of configuration parameters for the recently established P2P path (e.g., one or more DAID(s), SAID(s), and/or UAID(s)), which may be dependent on P2P operation modes such as OF P2P, OA P2P, and/or OM P2P. In an example, the ARESI and/or ANI may include association history information of the association recipient.

The context-aware distributed associations approaches disclosed herein, may be applied between two peers for one or more of multiple association, multi-hop association, and/or association with channel switching. The information may include in one or more of the AREQI, ARESI, and ANI may be similar in these procedures. Although examples, may be described with respect to a first association procedure, the exchanged messages and/or the information included in the exchanged messages may be equally applicable to other types of association procedures.

As aforementioned, context-aware distributed association may be leveraged to achieve many beneficial purposes and improve system performance of P2P proximity communications through contextual information included in one or more of the association request, the association response, and/or the association notification. As a result, the context information may be utilized to perform one or more association functions such as association with channel switching, prioritized association, enhanced peer discovery, enhanced data transmission, service negotiation and adaptation, enhanced association update, enhanced disassociation, and/or enhanced re-association.

In an example, peers may be configured to perform fast multiple peer association. For example, in a many-to-one multiple association, multiple peers may establish an association to a single other peer, for example for utilizing the same or different services. Multiple peers establishing an association with another peer may be referred to as a convergent multiple association (and/or convergent group association). In an example, in a one-to-many association a single peer (e.g., such as a virtual leader of a group of peers) may establish an association to a plurality of other peers, for example for utilizing the same or different services. In an one-to-many association, the association requestor may send association requests to other peers sequentially and/or simultaneously (e.g., multicast), and such request may be referred to as sequential multiple association and/or simultaneous multiple association, respectively.

Figure 32:
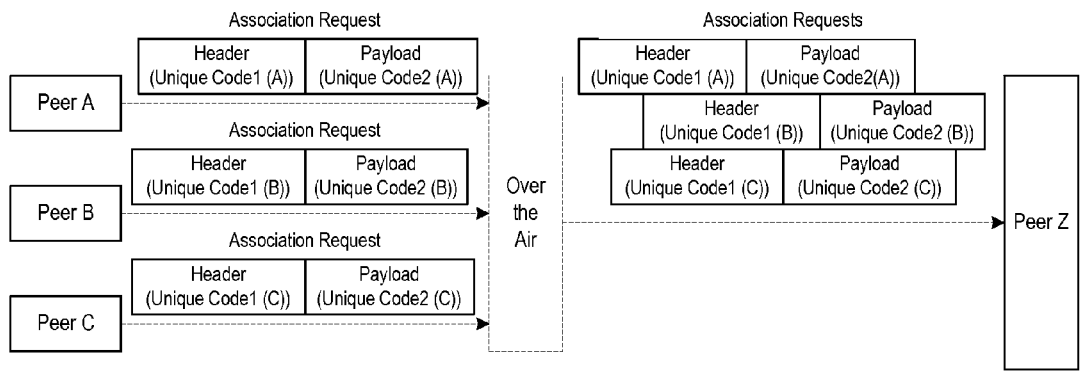
FIG. 32 illustrates an example association request for convergent multiple association.

For example, FIG. 32 illustrates an example association request for convergent multiple association. As shown in FIG. 32, an association request message may include two parts (e.g., a header and a payload), and one or more of the header and/or the payload may include AREQI information (e.g., context information). Each of the header and/or the payload of the association request may be encoded using a unique code. The unique code may utilize properties such as orthogonality to provide service differentiation, user differentiation, channelization, and/or the like in order to achieve context-aware concurrent transmission between peers. For example, the unique codes may be generated based on the context information/PI of one or more (and/or all) of the peers requesting the association. For example, Code 1 (e.g., header) and Code 2 (e.g., payload) may be generated based on context information/PI and/or AREQI information of Peer A, Peer B, and Peer C. In an example, Unique Code 1(A) may be orthogonal to Unique Code 1(B), which may be orthogonal to Unique Code 1(C) (e.g., and/or Unique Code 2(A) may be orthogonal to Unique Code 2(B), which may be orthogonal to Unique Code 2(C)). In an example, Code 1 and Code 2 may be the same. Each peer (e.g., Peer A, Peer B, and Peer C) may independently generate Code 1 and Code 2. Each peer (e.g., Peer A, Peer B, and Peer C) may transmit an association request message to Peer Z. The multiple association request messages, when arriving at Peer Z, may overlap in time. However, Peer Z may still be able to decode each message correctly due to the orthogonality of Code 1 and Code 2. In addition, Peer Z may quickly decode the message header, for example just using Code 1, to achieve fast context-aware association.

Figure 33:
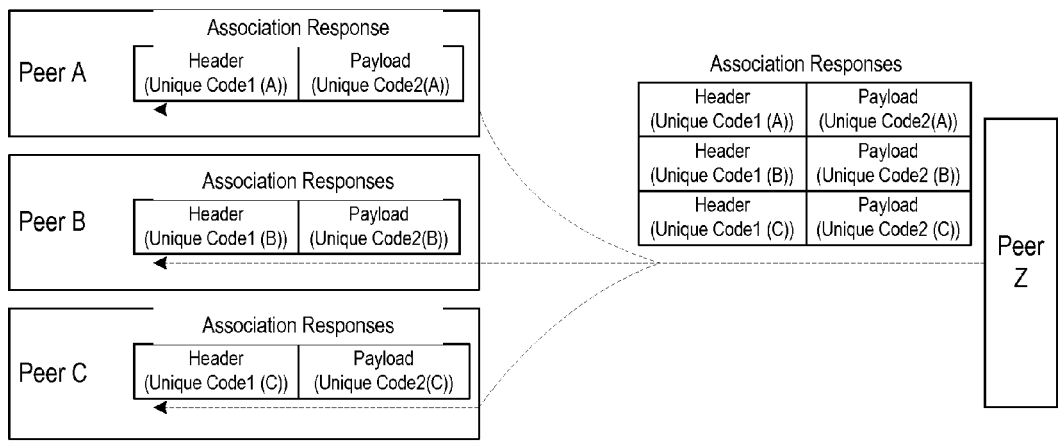
FIG. 33 illustrates and example of a unicast association response message for convergent multiple association.

FIG. 33 illustrates and example of a unicast association response message for convergent multiple association. For example, Peer Z may send separate association response messages to the requestors (e.g., Peer A, Peer B, and Peer C) in a unicast manner. Sending individual association response messages may be utilized where Peers A, Peer B, and Peer C request association for different services and/or users. The association response message(s) may have two parts (e.g., a header and a payload). Each part may be encoded using a unique code. The unique code may utilize properties such as orthogonality to provide service differentiation, user differentiation, channelization, and/or the like in order to achieve context-aware concurrent transmission between peers. In an example, Unique Code 1(A) may be orthogonal to Unique Code 1(B), which may be orthogonal to Unique Code 1(C) (e.g., and/or Unique Code 2(A) may be orthogonal to Unique Code 2(B), which may be orthogonal to Unique Code 2(C)). Code 1 and Code 2 may be generated based on context information/PI of all peers (e.g., Peer A, Peer B. Peer C, and perhaps Peer Z) and/or AREQI information. In an example, Code 1 and Code 2 may be the same.

Figure 34:
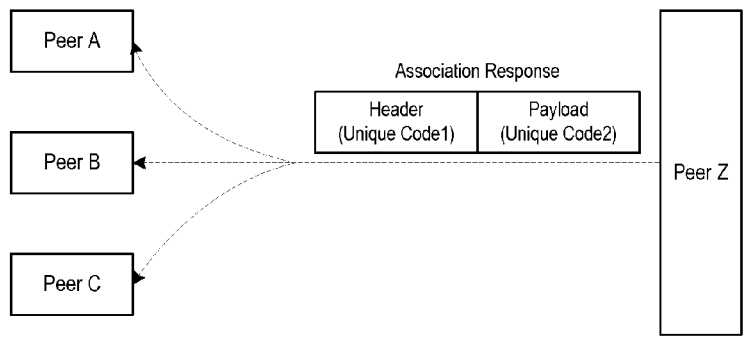
FIG. 34 illustrates an example broadcast and/or multicast association response for convergent multiple association.

FIG. 34 illustrates an example broadcast and/or multicast association response for convergent multiple association. For example, Peer Z may send a single association response message as broadcast and/or multicast message to each of Peer A, Peer B, and Peer C. Using a multicast response may be suitable for scenarios where each of the requestor peers request the same service-based and/or user-based association(s). For such an approach, the unique code may or may not be utilized.

When Peer Z sends association response messages back to requestor peers (e.g., Peer A, Peer B, and/or Peer C), Peer Z may handle the association requests and/or responses in different ways to support prioritized association. For example, Peer Z may process the association request from highest priority to lowest priority based on an Association Priority indication included in the association request messages. Thus, the association request with higher Association Priority may be processed first, and the corresponding association response may be transmitted in a more reliable and/or faster/quick manner. For example, Peer Z may send a unicast association response with prioritized quick channel access to peer(s) association with association requests with higher priority, but may buffer and broadcast association response(s) for association requests of lower priority.

In addition, although two unique codes are illustrated in FIGS. 32-34, each association request and/or association response message may be divided into multiple parts and multiple unique codes may be applied (e.g., each part uses a unique code that may be different than the unique code for other parts of the message). By doing so, the receiver quickly decode certain part(s) of the message without having to decoded other parts in order to make quick decisions regarding whether to discard the message, accept the message, decode other parts of the message, and/or refrain from decoding other parts of the message.

Figure 35:
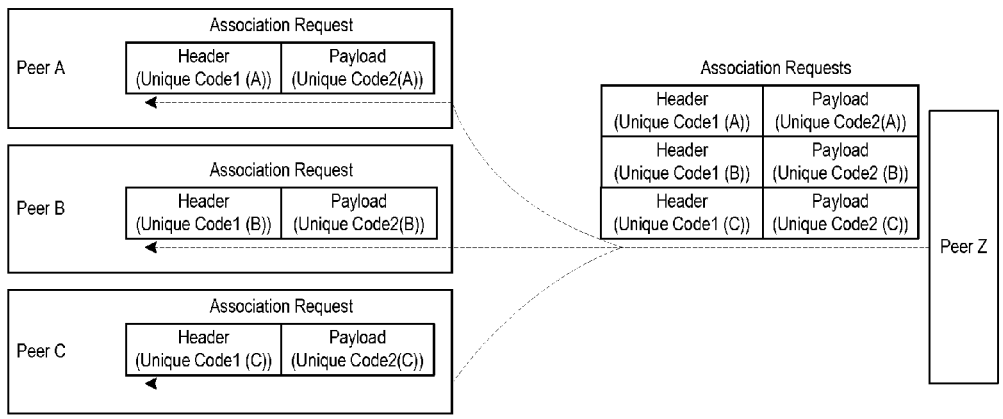
FIG. 35 illustrates an example of a unicast approach for sending an association request for simultaneous multiple association.

For simultaneous multiple association, a Peer Z may send association requests to multiple peers (e.g., Peer A, Peer B, and Peer C) substantially simultaneously. For example, FIG. 35 illustrates an example of a unicast approach for sending an association request for simultaneous multiple association. For example, Peer Z may use one or more unique codes (e.g., orthogonal code, PN sequence, etc.) to substantially simultaneously send three association requests to, for example one to Peer A, one to Peer B, and one to Peer C without causing a collision between the requests. For example, Unique Code 1(A) may be orthogonal to Unique Code 1(B), which may be orthogonal to Unique Code 1(C) (e.g., and/or Unique Code 2(A) may be orthogonal to Unique Code 2(B), which may be orthogonal to Unique Code 2(C)). Since three requests may be transmitted concurrently, the latency may be reduced. In this case, each association request may contain different information (AREQI) such as a different service type.

Figure 36:
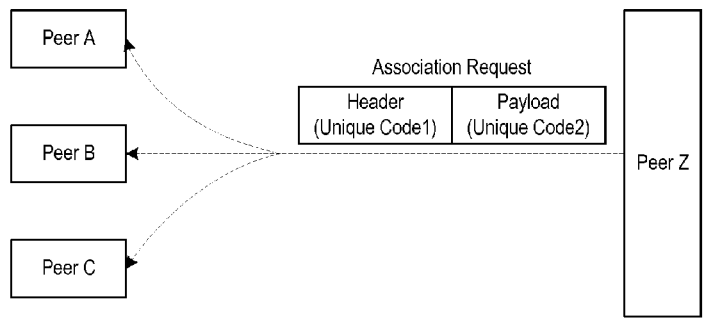
FIG. 36 illustrates an example of a broadcast and/or multicast approach for sending an association request for simultaneous multiple association.

FIG. 36 illustrates an example of a broadcast and/or multicast approach for sending an association request for simultaneous multiple association. For example, Peer Z may send a single association request that may be received by each of the three peers (e.g., Peer A, Peer B, Peer C). In an example, one or more unique codes may or may not be used. In an example, if a group ID is discovered during a peer discovery process, Peer Z may use the group ID to perform group communication for transmitting the association request to Peer A, Peer B, and/or Peer C.

When Peer Z sends association requests other peers (e.g., Peer A, Peer B, and/or Peer C), Peer Z may handle the requests in different ways in order to support prioritized association. For example, Peer Z may send association requests from highest priority to lowest priority based on the corresponding Association Priority. Thus, association requests with higher Association Priority may be sent first, for example using a more reliable and/or faster transmission method. For example, Peer Z may send a unicast association request with higher priority using a prioritized quick channel access, but may broadcast association requests with lower priority.

Figure 37:
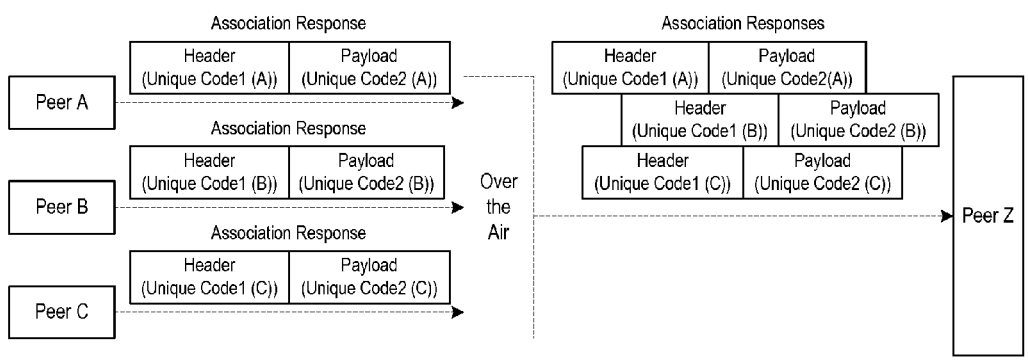
FIG. 37 illustrates an example of an association response for simultaneous multiple association.

FIG. 37 illustrates an example of an association response for simultaneous multiple association. For example, after Peer A, Peer B, and/or Peer C receive an association request from Peer Z, each of the peers may independently generate separate association responses to Peer Z. Unique codes may be used to enable concurrent transmission of three association responses to reduce overall association latency. For example, Unique Code 1(A) may be orthogonal to Unique Code 1(B), which may be orthogonal to Unique Code 1(C) (e.g., and/or Unique Code 2(A) may be orthogonal to Unique Code 2(B), which may be orthogonal to Unique Code 2(C)).

In addition, although two unique codes are illustrated in FIGS. 35-37, each association request and/or association response message may be divided into multiple parts and multiple unique codes may be applied (e.g., each part uses a unique code that may be different than the unique code for other parts of the message). By doing so, the receiver quickly decode certain part(s) of the message without having to decoded other parts in order to make quick decisions regarding whether to discard the message, accept the message, decode other parts of the message, and/or refrain from decoding other parts of the message.

For sequential multiple association, Peer Z may establish association to multiple other peers in a sequential fashion. For example, rather than or in addition to transmitting multiple association requests concurrently (e.g., as in simultaneous multiple association), Peer Z may sequentially send multiple association requests to each of Peer A, Peer B, and/or Peer C.

Figure 38:
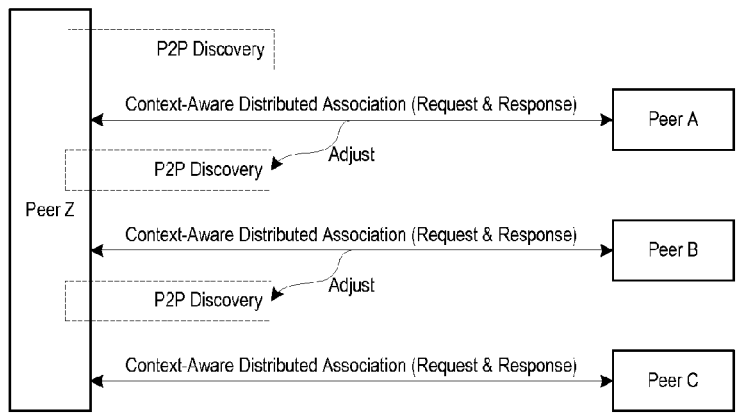
FIG. 38 illustrates an example of a pure sequential multiple association procedure.

For example, FIG. 38 illustrates an example of a pure sequential multiple association procedure. For example, after discovering one or more peers, Peer Z may send different association requests to each individual peer. The association response received back from other peer(s) may be leveraged to adjust one or more subsequent discovery procedures, for example a discovery scheme, a discovery period, a discovery channel, etc. For instance, Peer A may discover Peer B and/or Peer C and may inform Peer Z of some information (e.g., context information/PI) about Peer B and/or Peer C in the association response. Peer Z may leverage such information from Peer A to adjust one or more subsequent discovery procedures, for example by choosing an appropriate discovery scheme and/or behaviors such as one or more of utilizing passive listening to broadcasts, performing active querying, selecting a suitable discovery channel sequence and/or period, etc. In addition, Peer Z may selected which peer to select and/or associate with first, for example based on information from discovery. Peer Z may select the peer with best link quality and/or maximum residual energy to be associated with first. Unique codes may or may not be used.

When peer Z sends association requests to other peers (e.g., Peer A, Peer B, and/or Peer C), Peer Z may handle the requests in different ways in order to support prioritized association. For example, Peer Z may send association requests from highest priority to lowest priority based on the corresponding Association Priority. Thus, association requests with higher Association Priority may be sent first, for example using a more reliable and/or faster transmission method. For example, Peer Z may send a unicast association request with higher priority using a prioritized quick channel access, but may broadcast association requests with lower priority.

Figure 39:
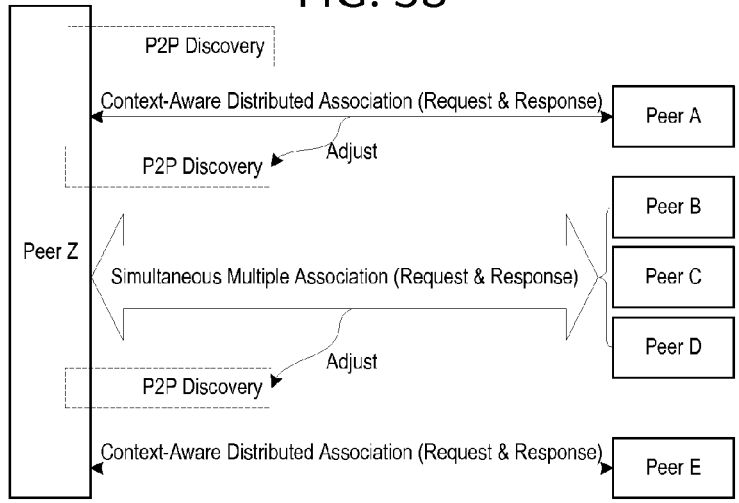
FIG. 39 illustrates an example of a hybrid sequential multiple association procedure.

FIG. 39 illustrates an example of a hybrid sequential multiple association procedure. For example, Peer Z may use a combination of sequential multiple association (e.g., for associating with Peer A and or Peer E) and simultaneous multiple association (e.g., for associating with Peer B, Peer C, and Peer D).

In addition, each association request and/or association response message may be divided into multiple parts and multiple unique codes may be applied (e.g., each part uses a unique code that may be different than the unique code for other parts of the message). By doing so, the receiver quickly decode certain part(s) of the message without having to decoded other parts in order to make quick decisions regarding whether to discard the message, accept the message, decode other parts of the message, and/or refrain from decoding other parts of the message.

In an example. multi-hop association may be utilized. For example, multi-hop association may refer to relayed associations in transparent mode and/or proxy mode. For example, Peer A may establish an association on behalf of a group of other peers to another peer (e.g., Peer B). For example, in multi-hop single association, a peer (e.g., Peer A) may establish an association and/or send an association request to another peer (e.g., Peer Z) via an intermediary or relay peer (e.g., Peer R). In multi-hop multiple association without established associations, a peer (e.g., Peer Z) may establish multiple associations with other peers (e.g., Peer A, Peer B, Peer C and/or Peer D) via an intermediary peer (e.g., Peer R) and/or a group of peers (e.g., Peer A, Peer B, Peer C and/or Peer D) may establish multiple associations with another peer (e.g., Peer Z) via the intermediary peer (e.g., Peer R). Prior to multi-hop multiple association without established associations, there may be no established associations between peer R and one or more of Peer A, Peer B, Peer C, and/or Peer D. In an example, for multi-hop multiple association with established associations a peer (e.g., Peer Z) may establish multiple associations with other peers (e.g., Peer A, Peer B, Peer C and/or Peer D) via an intermediary peer (e.g., Peer R), and/or a group of peers (e.g., Peer A, Peer B, Peer C and/or Peer D) may establish multiple associations with another peer (e.g., Peer Z) via the intermediary peer (e.g., Peer R). Prior to multi-hop multiple association without established associations, there may be established associations between the intermediary peer (e.g., Peer R) and the group of peers (e.g., Peer A, Peer B, Peer C and/or Peer D).

Figure 40:
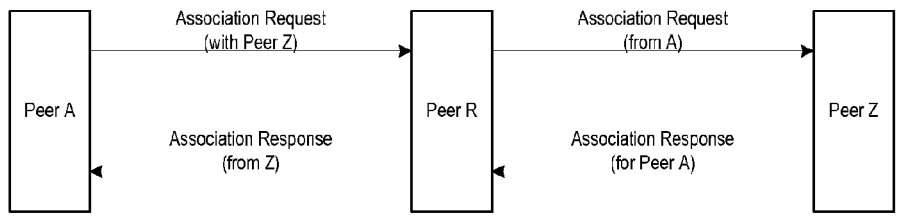
FIG. 40 illustrates an example of transparent mode multi-hop single association.

In multi-hop single association, context-aware distributed association may be used for each hop. For example, FIG. 40 illustrates an example of transparent mode multi-hop single association. For example, in transparent mode, Peer R (e.g., the intermediary or relay peer) may transparently forward one or more of an association request and/or an association response, and Peer R may not perform any other association-related process(es) or action(s). Since association request and association response may be MAC-layer messages, Peer R (and/or Peer A and/or Peer Z) may support MAC-layer message relaying and forwarding.

Figure 41:
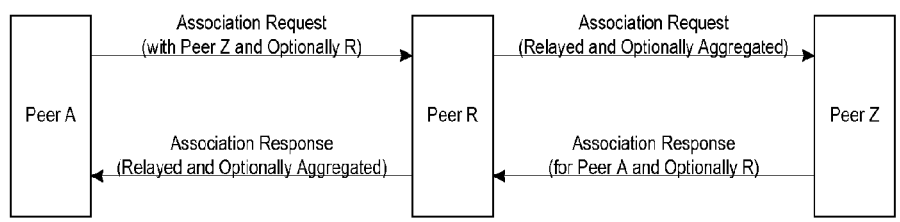
FIG. 41 illustrates an example of proxy mode multi-hop single association.

FIG. 41 illustrates an example of proxy mode multi-hop single association. In proxy mode, Peer R may intercept and/or process association requests and/or association responses. For example, if Peer A establishes an association to Peer R in addition to with Peer Z, Peer R may perform aggregation of association requests (e.g., may add a Peer R to Peer Z association request to the Peer A to Peer Z association request) and/or association responses (e.g., may add a Peer R to Peer A association response to the Peer Z to Peer A association response). Peer R may or may not hide information of Peer A from Peer Z. In other words, Peer R may perform association on behalf of peer A. In this case, Peer R may maintain two sets of AID and ACI (e.g., one set for Peer A and another set for Peer Z). Peer R may perform translation and mapping between those two sets of AID and ACI.

Figure 42:
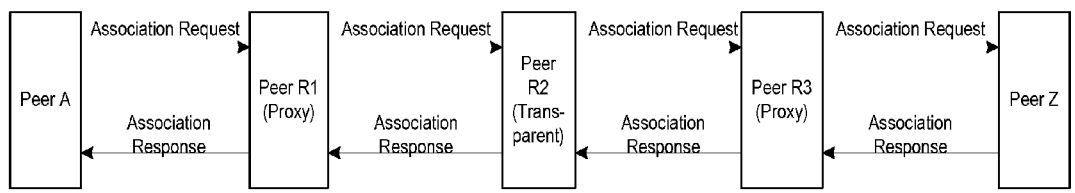
FIG. 42 illustrates an example of hybrid multi-hop single association.

Hybrid multi-hop mode may be considered a combination of transparent and proxy modes and may be extended to more than two hops. For example, there may be multiple relaying peers (e.g., Peer R1, Peer R2, Peer R3) between Peer A and Peer Z. Hybrid multi-hop may be considered a cascade of proxy and/or transparent modes. For example, FIG. 42 illustrates an example of a hybrid multi-hop single association. As shown in FIG. 42, Peer R1 and Peer R3 may perform proxy mode multi-hop associations and Peer R2 may perform transparent mode multi-hop associations.

Figure 43:
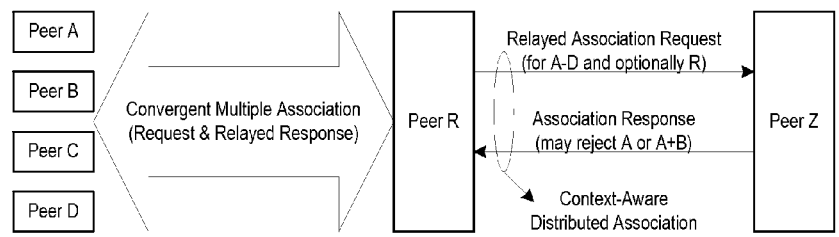
FIG. 43 illustrates an example many-to-one multi-hop multiple association without an established association between the intermediary peer and other peers.

FIG. 43 illustrates an example many-to-one multi-hop multiple association without an established association between the intermediary peer and other peers. For example, prior to the association procedure, there may be no existing association between Peer R and one or more of Peer A, Peer B, Peer C, and/or Peer D.

In a many-to-one multi-hop, one or more of Peer A, Peer B, Peer C, and/or Peer D may utilize Convergent Multiple Association procedure(s) to send association request(s) to Peer R and/or to receive association response(s) back from Peer R. Additionally, context-aware distributed association may be utilized for establishing an association between Peer R and Peer Z. Peer R may perform association aggregation. Peer Z may accept once or more requests (e.g., Peer A, Peer B, Peer C, and/or Peer D) and/or may reject one or more of the request (e.g., for Example Peer A).

Figure 44:
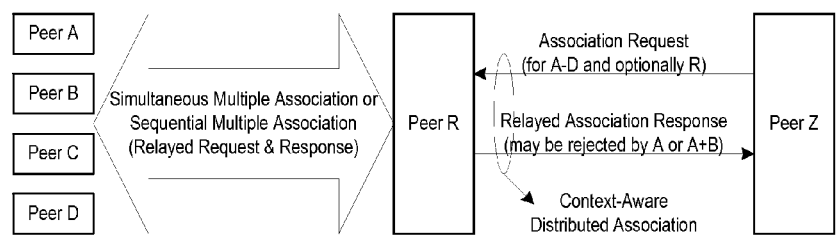
FIG. 44 illustrates an example one-to-many multi-hop multiple association without an established association between the intermediary peer and other peers.

FIG. 44 illustrates an example one-to-many multi-hop multiple association without an established association between the intermediary peer and other peers. For example, in a one-to-many multi-hop, one or more of Peer A, Peer B, Peer C, and/or Peer D may utilize Simultaneous Multiple Association and/or Sequential Multiple Association to send an association request to Peer R and/or to receive an association response back from Peer R. Context-aware distributed association may be utilized to establish an association between Peer R and Peer Z. Peer R may perform association aggregation. Peer Z may accept once or more requests (e.g., Peer A, Peer B, Peer C, and/or Peer D) and/or may reject one or more of the request (e.g., for Example Peer A).

Figure 45:
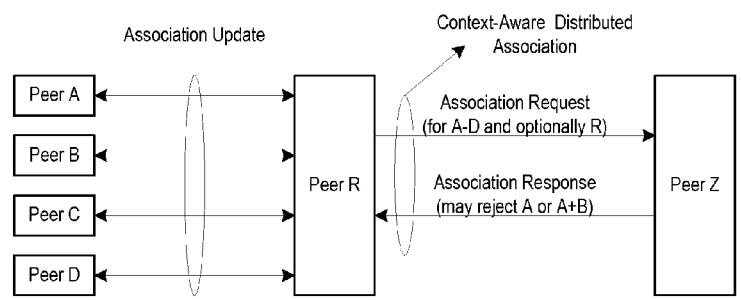
FIG. 45 illustrates an example many-to-one multi-hop multiple association with an established association between the intermediary peer and other peers.

FIG. 45 illustrates an example many-to-one multi-hop multiple association with an established association between the intermediary peer and other peers. For example, there may be an existing association between Peer R and one or more of Peer A, Peer B, Peer C, and/or Peer D. In many-to-one multi-hop, context-aware distributed association may be utilized to establish an association between Peer R and Peer Z. An association update may be utilized to update the existing association between Peer R and one or more of Peer A, Peer B, Peer C, and/or Peer D. Peer R may perform association aggregation. Peer Z may accept once or more requests (e.g., Peer A, Peer B, Peer C, and/or Peer D) and/or may reject one or more of the request (e.g., for Example Peer A). If the request(s) from Peer A, Peer B, Peer C, and/or Peer D to Peer Z is deterministic or pre-scheduled, Peer R may perform proxy-based association to Peer Z on behalf of Peer A, Peer B, Peer C, and/or Peer D.

Figure 46:
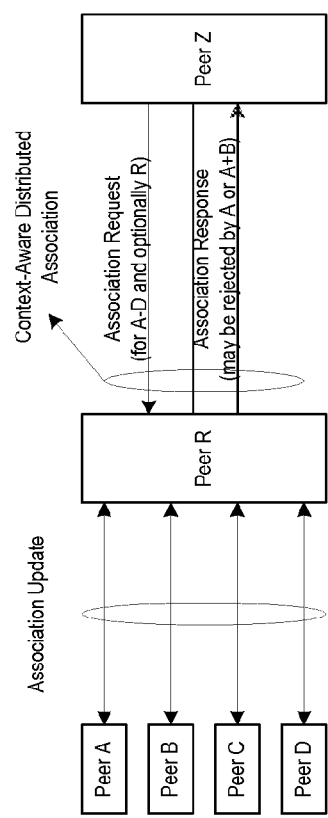
FIG. 46 illustrates an example one-to-many multi-hop multiple association with an established association between the intermediary peer and other peers.

FIG. 46 illustrates an example one-to-many multi-hop multiple association with an established association between the intermediary peer and other peers. In one-to-many multi-hop, context-aware distributed association may be utilized for establishing an association between Peer R and Peer Z. An association update may be utilized to update the existing association between Peer R and one or more of Peer A, Peer B, Peer C, and/or Peer D. Peer R may perform association aggregation. Peer Z may accept once or more requests (e.g., Peer A, Peer B, Peer C, and/or Peer D) and/or may reject one or more of the request (e.g., for Example Peer A).

Figure 48:
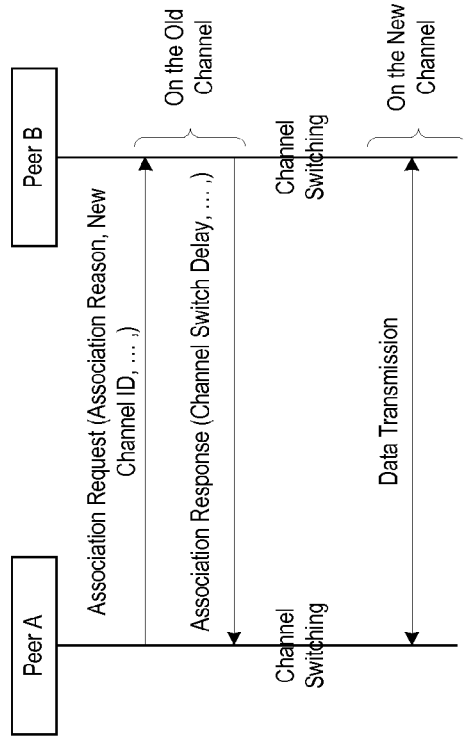
FIG. 48 illustrates an example of peers on various channels after performing channel switching.
Figure 47:
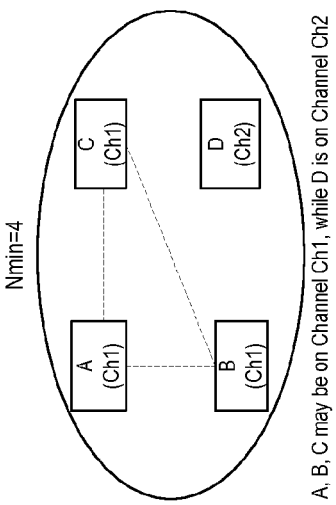
FIG. 47 illustrates an example of peers on various channels before performing channel switching.

In an example, association with channel switching may be utilized. For example, a P2P service (e.g., such as multi-player gaming) may require a certain minimum number of number of participants (e.g., Nmin participants). In a given physical area/vicinity, peers that provide/request the same service may reside on different channels since the peers may lack a centralized coordinator. As a result, even though the number of active peers with the same service may exceed Nmin, the number of peers with the same service and on the same channel may be below Nmim. As a result, the service may not be triggered due to lack participants on the same channel. FIG. 47 illustrates an example of peers on various channels before performing channel switching, and FIG. 48 illustrates an example of peers on various channels after performing channel switching. For example, as shown on FIG. 47, Nmin for a given application may be four, and three peers (e.g., Peer A, Peer B, and Peer C) may be on a first channel (e.g., Ch1) and a fourth peer may be on a different channel (e.g., Ch2). Since there may be less than Nmin=4 peers on any given channel, the service may not be activated.

In order to ensure there are enough participants on a given channel to enable the service, a participant (e.g., Peer A) may request channel switching when it performs association with another participant (e.g., Peer B). Such an association procedure may be referred to as joint association and channel switching. Thus, Peer A may somehow associate with Peer D and request that Peer switch to Ch1 as shown in FIG. 48. Various schemes for joint association and channel switching are disclosed.

Figure 49:
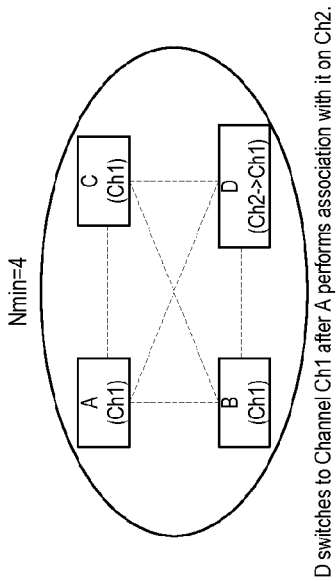
FIG. 49 illustrates an example of joint association and channel switching.

For example, FIG. 49 illustrates an example of joint association and channel switching. For example, Peer A may send an association request message to Peer B over the old channel (e.g., the channel on which User B currently operates). The association request message may include one or more of an association reason (e.g., indicating that the request is for joint association and channel switching), and/or a new channel ID (e.g., the new channel to which Peer B should switch to after association). Peer B may respond to Peer A with an association response message over the old channel. The association response message may include a channel switching delay indication (e.g., an indication of the amount of time or delay after which User A and B are going to switch the other channel). Data transmission may then be performed on the new channel (e.g., after the delay, if applicable).

Figure 50:
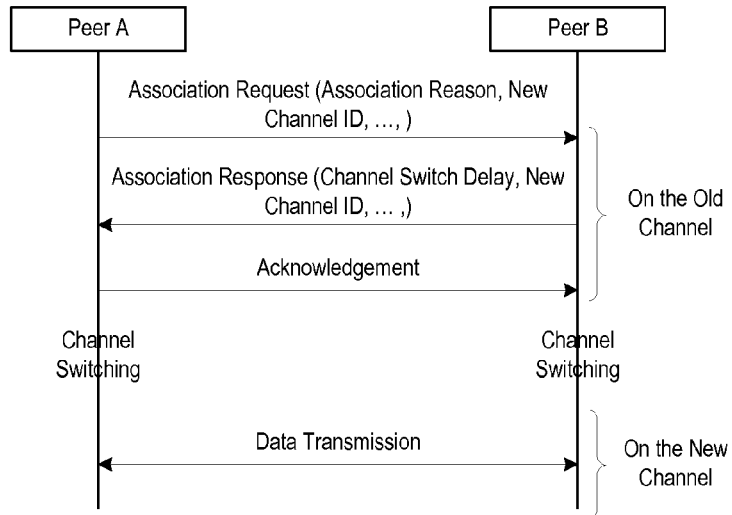
FIG. 50 illustrates another example of joint association and channel switching.

FIG. 50 illustrates another example of joint association and channel switching. For example, Peer A may send an association request message to Peer B over the old channel (e.g., the channel on which User B currently operates). The association request message may include one or more of an association reason (e.g., indicating that the request is for joint association and channel switching), and/or a new channel ID (e.g., the new channel to which Peer B should switch to after association). Peer B may respond to Peer A with an association response message over the old channel. The association response message may include one or more of a channel switching delay indication (e.g., an indication of the amount of time or delay after which User A and B are going to switch the other channel) and/or a new channel ID. For example, Peer B may choose a different channel ID than was selected by Peer A and may notify Peer A of this new channel via association response. Peer A may send an Acknowledgement to Peer B to indicate that Peer A accepts and will switch to the new channel as contained in association response. Data transmission may then be performed on the new channel (e.g., after the delay, if applicable).

In an example, context-aware peer association updates may be performed. As aforementioned, each established association may have corresponding context information (ACI) maintained in one or both end peers. Examples of ACI may include one or more of an association identifier, an association duration, an association priority, an assigned address, an assigned orthogonal address, a P2P operation configuration parameters, etc. ACI may be updated under certain conditions. For example, association context updates may be triggered by one or more (e.g., any) end peer periodically (e.g., timer-based) and/or based one the occurrence of certain events or conditions (e.g., event-based). Periodic association updates may act as a keep-alive service. In terms of procedures, the association update procedure may be very similar to those for association establishment. Therefore, unless otherwise specified herein, one or more (or any) of the examples disclosed herein for an association procedure may be utilized for performing an association update procedure.

Timer-based periodic association updating may be used to maintain valid association relationship(s) among the peers in the same group. The virtual leader of the group may send the periodic update to the other peer(s), and/or one or more of the other peers may send a periodic update to the virtual leader. Event-based association updating may be used to notify other active peers in the group of the occurrence of the event so that the virtual leader and/or other peer(s) may together update the group association if necessary in order to resolve a potential problem. In an example, proactive self-healing-driven association updating may be performed. For example, prior to an association relationships being broken due to reasons such as, but not limited to, link quality and/or peer movement, the virtual leader and/or one or more other peers may actively send out an association update to detect potential issues and/or perform pre-configured policy-based actions such as discovering and associating with new peer(s).

Association updating may be performed to change the virtual leader of a group of peers which are associated with one another. For example, the virtual leader may be changed for purposes such as one or more load-balancing, improved discovery performance (e.g., based on peer dynamics such as one or more of the number of neighbors, residual energy, link quality, traffic load, etc.), and/or the like. For example, after an association update to change the virtual leader, the new virtual leader may be responsible for broadcasting group information so that other peers may quickly discover the group with any corresponding information updated.

Association updating may be performed to change or reclaim the previously assigned address. Association updating may be performed to change the P2P operation mode, for example from among OF, OA, and/or OM, for example to achieve better service quality and/or support offloading. Association updating may be performed for service switching. For example, Peer A may already have a device-based association with another peer (e.g., Peer B). Peer A may want to switch to a new service with Peer B. Peer A may perform an association update to enable the corresponding new service (e.g., update the service-based association linked to the existing device-based association).

Association updating may be performed for duty-cycle configuration. For example, Peer A may change its own duty-cycle schedule (e.g., one or more of the sleeping interval, the sleeping frequency, the sleeping duration, etc.) and may inform other associated peers of the new duty cycle via a peer association update procedure. In an example, Peer A may actively change or configures a duty-cycle schedule for other associated peers via an association update procedure. Examples of association update may include a context-aware association update, a fast multiple association update, and/or a multi-hop association update.

Figure 51:
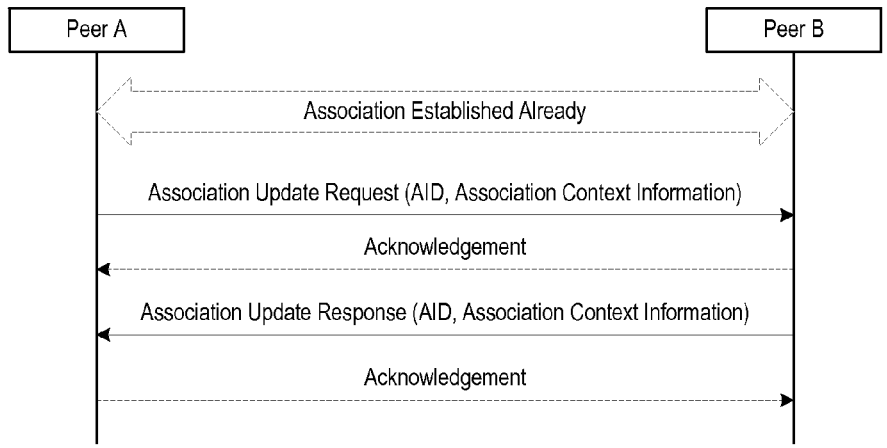
FIG. 51 illustrates an example of a context-aware association update.

FIG. 51 illustrates an example of a context-aware association update. For example, an association update request may include an AID and one or more other ACI information to be updated such as an association duration, an operation channel, a new AID, P2P operation parameter(s), etc. In the association update response, the AID and/or the values of updated ACI may be included as the feedback to the requestor (e.g., Peer A). In addition, the association update request may include a response flag to instruct Peer B how to send back the ACK and/or the association update response. For example, the response flag may indicate that Peer B should send an ACK and an association update response separately, send an ACK and an association update response in one merged message, and/or that the ACK may be omitted.

The association update procedure may update a short address previously assigned to a peer, for example by embedding the new short address in association update request. Such short address may be utilized for short address reclaiming and/or reallocation in IEEE 802.15.4 networks. If a short address was not previously assigned, an association update may be used to request a short address.

In an example, fast multiple association updating may be performed. For example, fast multiple association updating may be similar to fast multiple association procedures. For example, in a many-to-one fast multiple association update procedure, multiple peers may perform an association update to the same peer for the same or different services. Multiple peers performing an association update to the same peer for the same or different services may be referred to as Convergent Multiple Association Update. In an example, in a one-to-many fast multiple association update procedure, a single peer (e.g., such as a virtual leader of a group of peers) may perform an association update procedure with multiple peers for the same or different services. For example, the association requestor may send association update request(s) to multiple peers sequentially and/or simultaneously. Sending association update request(s) to multiple peers sequentially may be referred to as Sequential Multiple Association Update, and sending association update request(s) to multiple peers simultaneously may be referred to as Simultaneous Multiple Association Update.

As an example of association updating, the peer acting as the virtual leader may adjust discovery behaviors of other peers, for example such as rotating the role of virtual leader, adjusting which peer to broadcast the group information, adjusting when to broadcast group information, etc. Similar procedures as those for a convergent multiple association procedure (e.g., described with respect to FIGS. 32-34) may be used for a convergent multiple association update procedure. For example, the Association Request messages and the Association Response messages of FIGS. 32-34 may be changed to Association Update Request messages and the Association Update Response messages, respectively. However, rather than or in addition to providing the information described with respect to FIGS. 32-34, the Association Update messages may update previously provided/negotiated association information.

Similar procedures as those for a simultaneous multiple association procedure (e.g., described with respect to FIGS. 35-37) may be used for a simultaneous multiple association update procedure. For example, the Association Request messages and the Association Response messages of FIGS. 35-37 may be changed to Association Update Request messages and the Association Update Response messages, respectively. However, rather than or in addition to providing the information described with respect to FIGS. 35-37, the Association Update messages may update previously provided/negotiated association information.

Similar procedures as those for a sequential multiple association procedure (e.g., described with respect to FIGS. 38 & 39) may be used for a sequential multiple association update procedure. For example, the Association Request messages and the Association Response messages of FIGS. 38 & 39 may be changed to Association Update Request messages and the Association Update Response messages, respectively. However, rather than or in addition to providing the information described with respect to FIGS. 38 & 39, the Association Update messages may update previously provided/negotiated association information.

Similar procedures as those for a multi-hop association procedure (e.g., described with respect to FIGS. 40-42) may be used for a multi-hop association update procedure. For example, the Association Request messages and the Association Response messages of FIGS. 40-42 may be changed to Association Update Request messages and the Association Update Response messages, respectively. However, rather than or in addition to providing the information described with respect to FIGS. 40-42, the Association Update messages may update previously provided/negotiated association information.

In an example, one or more existing associations may be disassociated or cancelled by one or more of the associated peers, for example when the assigned association duration has ended and/or when triggered by the occurrence of certain event (e.g., such as one or more of poor link quality, loss of synchronization, etc.). In some circumstances, disassociation may achieved without interactive procedures, for example if a peer becomes unreachable when disassociation is to be performed. After an existing association is disassociated, peers may still store one or more pieces of ACI for the association (e.g., the static part of ACI) for a period of time, for example to improve future re-association. A successful disassociation may trigger involved peers to conduct peer discovery to find other new peers. In terms of procedure, disassociation may have similar signaling procedures as those for association. Thus, one or more of the examples described above for association and/or association updates may be utilized for disassociation. A peer may perform one or more of a device-based, a service-based, and/or a user-based disassociation to another peer. For example, a peer may request service-based disassociation, but keep device-based association with another peer. Later the peer may request a new service-based association for a new service using the device-based association (e.g., service switching). Such service switching may be realized through device-based and/or service-based association updates.

Figure 52:
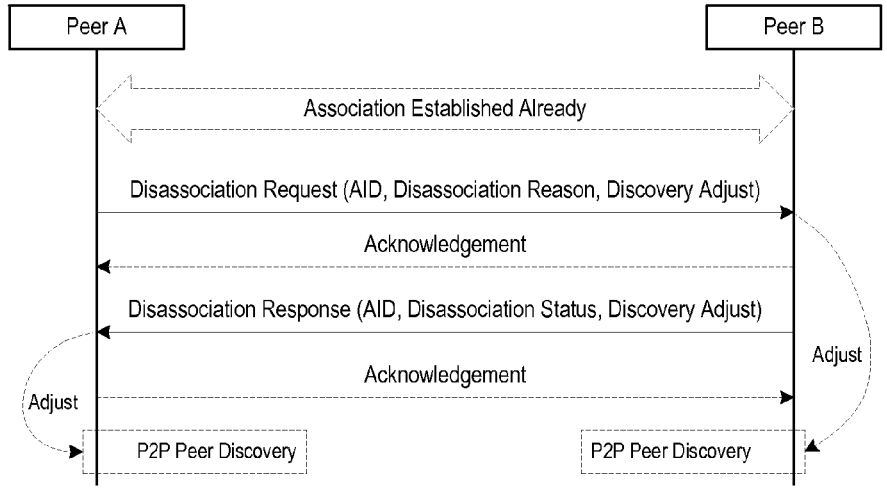
FIG. 52 illustrates an example of a context-aware disassociation.

FIG. 52 illustrates an example context-aware disassociation procedure. For example, a disassociation request may include one or more of an AID, a disassociation reason, and/or discovery adjust indication. A disassociation response may include one or more of an AID, a disassociation status, and/or a discovery adjust indication, for example as feedback to the requestor (e.g., Peer A). In an example, the disassociation request may contain a response flag to instruct Peer B how to send back ACK and/or disassociation response such as: send ACK and disassociation response separately, send ACK and disassociation response in one merged message, or send a response but not an ACK.

The Disassociation Reason may be that the requestor peer (e.g., Peer A) has bad link quality to another peer (e.g., B), that the requestor peer is overloaded, that the requestor peer has low residual energy and wants to reduce the number of active associations to save energy, that the requestor peer wants to stop the current associated service, that the requestor peer wants to vacate space for an incoming association request with higher priority, etc.

The Discovery Adjust indication may be used by a peer to help the other peer improve peer discovery, for example, to inform other peer of a desired/proper discovery scheme/behaviors (e.g., such as passive listening to broadcast vs. active query, suitable discovery channel sequence, and/or discovery period).

One or more peers may perform fast multiple disassociation. Similar to fast multiple association, fast multiple disassociation may be performed in a many-to-one manner and or a one-to-many manner. For example, multiple peers performing disassociation to the same peer (e.g., many-to-one) for the same and/or different services may be referred to as Convergent Multiple Disassociation. A single peer (e.g., such as a virtual leader of a group of peers) performing disassociation to multiple peers (e.g., one-to-many) for the same and/or different services may be referred to Sequential Multiple Disassociation or Simultaneous Multiple Disassociation depending on the messaging sequence utilized to perform the disassociation. For example, if the disassociation requestor sends disassociation requests to other peers sequentially the disassociation may be referred to as Sequential Multiple Disassociation, and and if the disassociation requestor sends disassociation requests to other peers substantially simultaneously the disassociation may be referred to as Simultaneous Multiple Disassociation. Triggered and/or assisted by the disassociation, the peer acting as the virtual leader may adjust discovery behaviors of other peers based on the disassociation procedure (e.g., such as rotating the role of virtual leader, adjusting which peer to broadcast the group information, adjusting when to broadcast group information, etc.).

Similar procedures as those for a convergent multiple association procedure (e.g., described with respect to FIGS. 32-34) may be used for a convergent multiple disassociation procedure. For example, the Association Request messages and the Association Response messages of FIGS. 32-34 may be changed to Disassociation Request messages and the Disassociation Response messages, respectively.

Similar procedures as those for a simultaneous multiple association procedure (e.g., described with respect to FIGS. 35-37) may be used for a simultaneous multiple disassociation procedure. For example, the Association Request messages and the Association Response messages of FIGS. 35-37 may be changed to Disassociation Update Request messages and the Disassociation Update Response messages, respectively.

Similar procedures as those for a sequential multiple association procedure (e.g., described with respect to FIGS. 38 & 39) may be used for a sequential multiple disassociation procedure. For example, the Association Request messages and the Association Response messages of FIGS. 38 & 39 may be changed to Disassociation Request messages and the Disassociation Response messages, respectively.

Similar procedures as those for a multi-hop association procedure (e.g., described with respect to FIGS. 40-42) may be used for a multi-hop disassociation procedure. For example, the Association Request messages and the Association Response messages of FIGS. 40-42 may be changed to Disassociation Request messages and the Disassociation Response messages, respectively.

Figure 53:
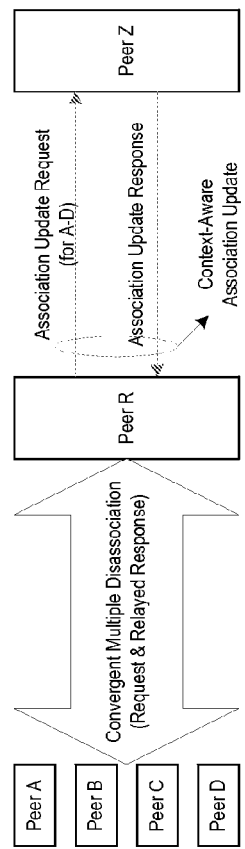
FIG. 53 illustrates an example many-to-one multi-hop disassociation based on association update messages.

FIG. 53 illustrates an example many-to-one multi-hop disassociation based on association update messages. For example, rather than or in addition to relaying one or more disassociation messages, association update messages may be used to inform a peer (e.g., Peer Z) of the dissociation of a group of peers. For example, one or more of Peer A, Peer B, Peer C, and/or Peer D may want to disassociate with Peer Z and with Peer R. Peer A, Peer B, Peer C, and/or Peer D may use Convergent Multiple Disassociation to communicate the disassociation request to Peer R (e.g., sending disassociating requests to Peer R and receiving disassociation response from Peer R). Peer R may use a Context-Aware Association Update to notify Peer Z of the disassociation requests from one or more of Peer A, Peer B, Peer C, and/or Peer D (e.g., sending association update request to Peer Z and receiving association update response from Peer Z). Peer R may perform one or more message translations, for example translating the disassociation request from one or more of Peer A, Peer B, Peer C, and/or Peer D to an association update request to Peer Z, and/or translating the association update response from Peer Z to one or more disassociation responses for one or more of Peer A, Peer B, Peer C, and/or Peer D. Peer Z may maintain its association with Peer R (e.g., if one exists).

Figure 54:
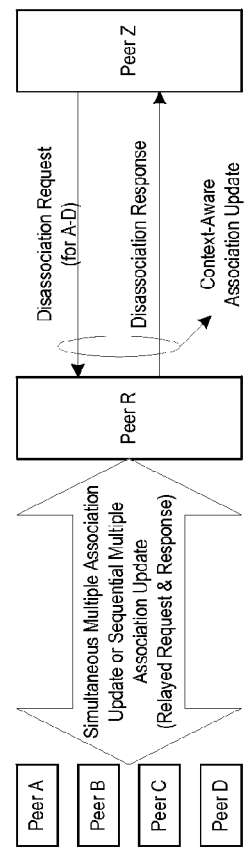
FIG. 54 illustrates an example one-to-many multi-hop disassociation based on association update messages.

FIG. 54 illustrates an example one-to-many multi-hop disassociation based on association update messages. For example, Peer Z may perform disassociation with one or more of Peer A, Peer B, Peer C, and/or Peer D and with Peer R. Peer Z may uses a context-aware disassociation messages to communicate with Peer R (e.g., sending Disassociating Request(s) to Peer R and receiving disassociation response(s) from Peer R). Peer R may use Context-Aware Association Update messages to inform one or more of Peer A, Peer B, Peer C, and/or Peer D of the disassociation request from Peer Z (e.g., sending association update request(s) to one or more of Peer A, Peer B, Peer C, and/or Peer D and receiving association update response(s) from one or more of Peer A, Peer B, Peer C, and/or Peer D). Peer R may perform one or more message translations, for example translating the disassociation request from Peer Z to one or more association update requests to one or more of Peer A, Peer B, Peer C, and/or Peer D, and/or translating the association update response(s) from one or more of Peer A, Peer B, Peer C, and/or Peer D to a disassociation response to Peer Z.

In an example, one or more peers may perform peer re-association. For example, after an existing association has been disassociated or cancelled, one or more peers may trigger re-association. In terms of signaling procedures, re-association signaling may be very similar to the signaling procedures used for association. Therefore, one or more of the examples described herein for signaling or otherwise indicating association may be used for signaling or otherwise indicating re-association. However, there may be one or more differences between association and re-association. For example, a re-association request may include or indicate the AID to be re-associated. In an example, the association request may not include or indicate the AID (e.g., the AID may not yet have been created), but the association response may include or otherwise indicate an assigned AID. In an example, the re-association request may contain less information than association request, for example since the re-association request may omit one or more parts of the ACI that may have been stored after the disassociation, such as the static part of ACI.

In an example, association history information may be used to enhance context-aware peer selection and/or peer association, for example by using the association history information as a type of context information. Association history information may include any information about previous associations performed by a peer (e.g., either successful or failed associations). For example, the association history information may include, but is not limited to, one or more of user behavior pattern and profiling (e.g., such as shopping history patterns, etc.), device profiles (e.g., such as movement trajectories, service installing/deleting history, etc.), service profiles (e.g., such as how long a service or application has been installed in the device), ratio successful associations to the total number of peer requested associations, ratio of successful associations a total number of peer accepted associations, average time for a peer to request associations, average time for a peer to accept associations, the last time when a peer requested an association, the last time when a peer accepted an association, the last time when a peer requested an disassociation, the last time when a peer accepted an disassociation, average time that a peer stays online, average number of concurrent associations that a peer maintains in recent time cycle, etc.

In an example, the peer association history information may include some provisioned configuration information (e.g., either temporary and/or permanent), for example when the peer lacks sufficient peer association history information (e.g., device just powered on and/or previous peer association information has been deleted). Examples of provisioned configuration information may include one or more of a public key, application registration information (e.g., user name, password, etc.), service registration information (e.g., user name, password, etc.), and/or the like. Such provisioned information may be used by the peer when the peer first starts or powers on.

Peer A may be configured to maintain association history information for one or more other peers (e.g., Peer B) when peer B requests an association with Peer A. In an example, each peer may maintain its own association history information and may report such information in a discovery response message and/or an association request/response message to other peers. A peer may estimate its own history information based on the latest sample of information (e.g., the most up to date information) and/or based on multiple samples using algorithms such as a weighted moving window average, for example with an adaptive window size.

Association history information may be leveraged to improve context-aware peer selection. For example, a peer may receive a list of other peers from discovery. The peer may select proper candidates to request association based on their association history information. The association history information may be leveraged to improve context-aware peer association. For example, Peer A may request association with peer B. Peer A may report its association history information in an association request message and/or peer B may maintain association history information for Peer A. Peer B may make an association decision (e.g., accept or reject) based on the association history information for Peer A.

In an example, mobility information may be used to enhance context-aware peer association. For example, in a P2P communication environment, a peer may be mobile. As a result, each peer may maintain (and/or be able to determine) mobility information, for example including one or more of an absolute moving speed, a moving direction, a relative moving speed to a neighboring peer, and/or the like. Such mobility information may be an absolute value or a coarse grade value (e.g., low moving speed, medium moving speed, high moving speed, etc.).

There may be different mechanisms to exchange and/or otherwise obtain mobility information. For example, a peer may measure its mobility information through measurements and/or via the use of one or more sensor (e.g., GPS). In an example, a peer may determine its mobility information by analyzing received radio signal(s) with the assumption that the sender of the radio signal is stationary.

A peer may report its mobility information during the discovery process (e.g., broadcasting its mobility information to other peers). A peer may report its mobility information during one or more of an association process (e.g., in a request or response message), an association update process (e.g., in a request or response message), a disassociation process (e.g., in request or response message), and/or a re-association process (e.g., in a request or response message). A peer may report its mobility information to other peers using MAC layer or higher layer commands. The peer may piggyback the mobility information during data transmission.

The mobility information may be used to improve context-aware peer selection. For example, Peer A may obtain a list of other peers from discovery. Peer A may select proper candidates to request association based on their mobility information (e.g., the mobility information may reflect the channel quality). For example, peers relatively low speeds may be selected as candidates over peers with relatively high speeds. In an example, direction of movement may be used to select appropriate peers. For example, Peer A may select peers moving toward it and may not refrain from selecting peers moving away from it.

The mobility information may be used to improve context-aware peer association. For example, Peer A may request an association with peer B. Peer A may report its mobility information in an association request message and/or peer B may determine mobility information for Peer A during peer discovery. Peer B may determine whether to establish an association with Peer A based on the mobility information for Peer A. For example, the association request from Peer A may be accepted if the speed of Peer A is relatively small (e.g., Peer A is relatively stationary or moving relatively little) and rejected otherwise.

The mobility information may be used to improve multi-hop communication. Mobility information may be leveraged for designing improved routing protocols for multi-hop communications. If an intermediate peer (and/or the sender peer or the receiver peer) is in motion, adaptive re-routing may be triggered to actively choose another path. If there is no spare path, peer discovery followed by peer association may be triggered to find more potential peers and establish other potential messaging paths. In an example, multi-hop paths may be established for communicating with a peer for which previously single-hop communications were utilized based on the mobility information for the peer. For example, if a first peer is communicating with a second peer via single-hop, but the mobility information indicates that the peers are moving away from each other, a third peer may be discovered and/or associated in order to begin multi-hop communications between the first and second peer.

Figure 55:
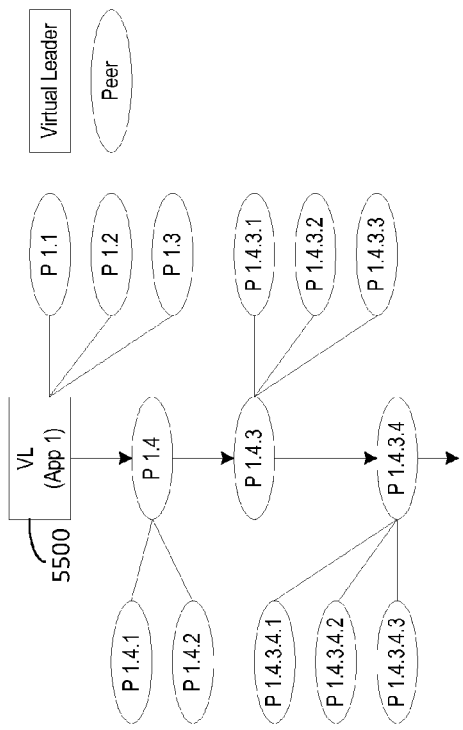
FIG. 55 illustrates an example of hierarchical structure with a single VL.

In an example, association may be achieved using a hierarchical structure with a single VL. For example, a peer may establish an association with the VL on behalf of other peers supporting the same applications. As an example, FIG. 55 illustrates an example of hierarchical structure with a single VL. In an example, VL 5500 and the other associated peers may be configured to support the same application (e.g., App 1). For example Peers 1.1, 1.2, 1.3, and/or 1.4 may have a direct association with the VL 5500 (e.g., single-hop without a relay peer). Peers 1.4.1, 1.4.2, and/or 1.4.3 may have a direct association with the peer 1.4, and accordingly an indirect association with the VL 5500. It may be assumed that the peer 1.4 already established the association with the VL 5500. The peers 1.4.1, 1.4.2, and 1.4.3 may establish an association with peer 1.4 and may then establish an association with the VL 5500 via the peer 1.4. An association via an intermediary or relay peer (e.g., Peer 1.4) may be referred as an indirect association and/or an indirect transitional association, where rather than or in addition to sending an association request message from the Peers 1.4.1, 1.4.2, and/or 1.4.3 to VL 5500, the Peers 1.4.1, 1.4.2, and/or 1.4.3 send the association request to the peer 1.4. Peers 1.4.1, 1.4.2, and/or 1.4.3 may indicate that VL 5500 is the target of the association request in their association request message sent to the peer 1.4. In an example, multi-hop association may be established as disclosed herein.

The indirect transitional association may help to reduce association message transmissions and make it more efficient to handle massive number of peers such as M2M devices. If the peer 1.4 does not have association with the VL 5500, the peer 1.4 may perform an association with the VL 5500 and may piggyback information about its associations with the one or more of peers 1.4.1, 1.4.2, and/or 1.4.3 in an association request message (e.g., and/or in an association update request message). When transmitting data, the VL 5500 may send data to the peers 1.4.1, 1.4.2, and/or 1.4.3 relayed through the peer 1.4. The Peer 1.4 may relay data to/from one or more of peers 1.4.1, 1.4.2 and/or 1.4.3 from/to the VL 5500.

Using a similar indirect transitional association mechanism, one or more of the peers 1.4.3.1, 1.4.3.2, 1.4.3.3, and/or 1.4.3.4 may establish a direct association with the peer 1.4.3, and may then establish an indirect association with the peer 1.4 and/or the VL 5500. In an example, establishing the indirect transitional association may be automatically performed based on establishing the association with peer 1.4.3 for the service (e.g., App 1). Similarly, indirect transitional associations may be established between the peers 1.4.3.4.1, 1.4.3.4.2, and/or 1.4.3.4.3 and peer 1.4.3, peer 1.4, and/or the VL 5500 when the peers 1.4.3.4.1, 1.4.3.4.2, and/or 1.4.3.4.3 establish a direct association with the peer 1.4.3.4.

Figure 56:
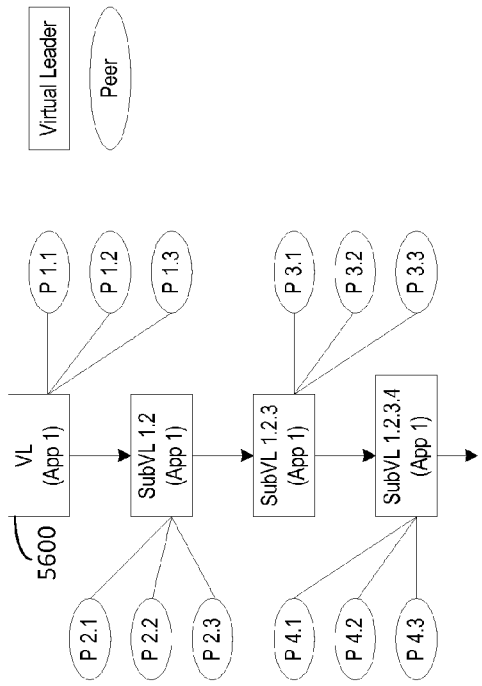
FIG. 56 illustrates an example hierarchical virtual leader structure that includes a subVL.

In an example, association in hierarchical structure may be achieved with the use of a VL and SubVL. For example, FIG. 56 illustrates an example hierarchical virtual leader structure that includes a subVL. As illustrated in FIG. 56, a VL (e.g., VL 5600) and one or more SubVLs may form a hierarchical association structure. For example, the association may be established so that VL 5600, the SubVLs (e.g., SubVL 1.2, SubVL 1.2.3, and/or SubVL 1.2.3.4), and/or one or more other peers (e.g., one or more of peers 1.1, 1.2, 1.3, 2.1, 2.2, 2.3, 3.1, 3.2, 3.3, 4.1, 4.2, 4.3, etc.) may utilize the same application (e.g., App 1). For example, SubVL 1.2 may associate with VL 5600, SubVL 1.2.3 may associate with SubVL 1.2, and SubVL 1.2.3.4 may associate with SubVL 1.2.3. Peers 1.1, 1.2, and/or 1.3 may associate with VL 5600. Peers 2.1, 2.2, and/or 2.3 may associate with SubVL 1.2. Peers 3.1, 3.2, and/or 3.3 may associate with SubVL 1.2.3. Peers 4.1, 4.2, and/or 4.3 may associate with SubVL 1.2.3.4. SubVL 1.2 may perform an association update with VL 5600 to report peers 2.1, 2.2, and/or 2.3. SubVL 1.2.3 may perform an association update with SubVL 1.2 to report peers 3.1, 3.2, and/or 3.3. SubVL 1.2.3.4 may perform an association update with SubVL 1.2.3 to report peers 4.1, 4.2, and/or 4.3.

Figure 57:
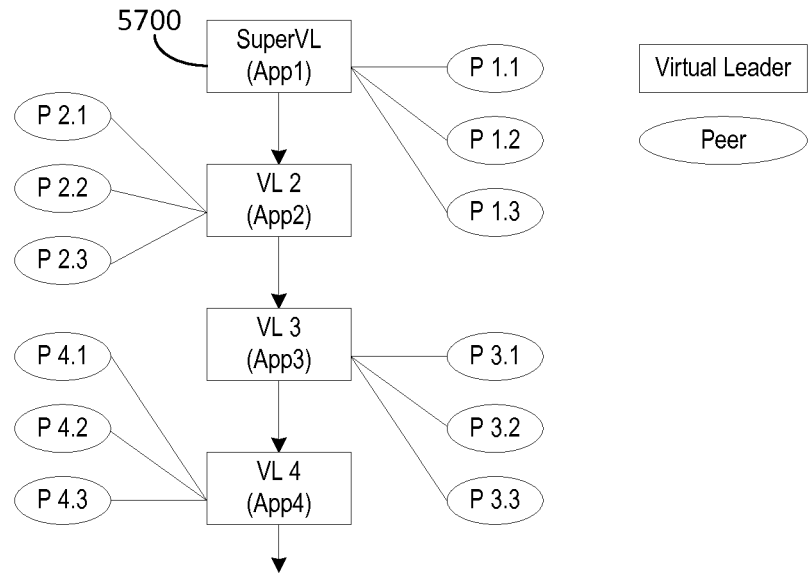
FIG. 57 illustrates an example hierarchical virtual leader structure that includes a SuperVL.

In an example, association in hierarchical structure may be achieved with the use of a VL and a SuperVL. For example, FIG. 57 illustrates an example hierarchical virtual leader structure that includes a SuperVL. In the example illustrated in FIG. 57, a SuperVL (e.g., SuperVL 5700) and one or more VLs (e.g., VL 2, VL 3, and/or VL 4) may establish associations in a hierarchical structure. For example, SuperVL 5700 and each of the VLs may be using different applications. For example, SuperVL 5700 may run App 1, VL 2 may run App 2, VL 3 may run App 3, and/or VL 4 may run App 4. SuperVL 5700 may manage other VLs, for example performing one or more of power control, interference management, synchronization, channel access and scheduling, routing, etc. In an example, each VL may independently manage channel access, scheduling, and/or routing within the group it manages (e.g., peers under it in the hierarchal structure).

For example, VL 2 may associate with SuperVL 5700, VL 3 may associate with VL 2, and/or VL 4 may associate with VL 3. Peers 1.1, 1.2, and/or 1.3 may associate with SuperVL 5700 (e.g., for App 1). Peers 2.1, 2.2, and/or 2.3 may associate with VL 2 (e.g., for App 2). Peers 3.1, 3.2, and/or 3.3 may associate with VL 3 (e.g., for App 3). Peers 4.1, 4.2, and/or 4.3 may associate with VL 4 (e.g., for App 4). VL 2 may perform an association update with VL 5700 to report peers 2.1, 2.2, and/or 2.3 (and/or other VLs and/or peers further down the hierarchal structure below VL 2). VL 3 may perform an association update with VL 2 to report peers 3.1, 3.2, and/or 3.3 (and/or other VLs and/or peers further down the hierarchal structure below VL 3). VL 4 may perform an association update with VL 3 to report peers 4.1, 4.2, and/or 4.3 (and/or other VLs and/or peers further down the hierarchal structure below VL 4).

Figure 58:
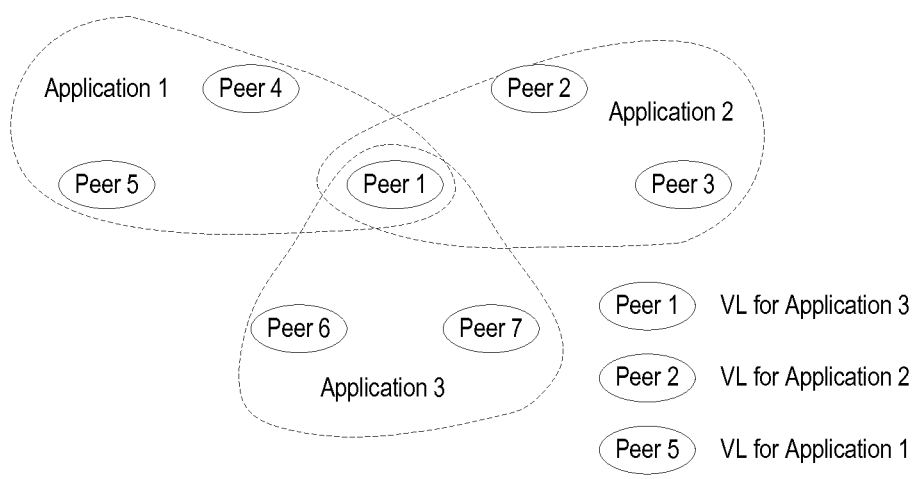
FIG. 58 illustrates an example scenario where associations may be established for a plurality of applications.

Associations may be performed for multiple applications. For example, FIG. 58 illustrates an example scenario where associations may be established for a plurality of applications. For example, a peer (e.g., Peer 1) may support multiple applications. Each application may utilize a different peer as the virtual leader. Thus, for the example shown in FIG. 58, a peer may be a virtual leader for one application, although in other scenarios a peer may be a VL for multiple applications.

As shown in FIG. 58, Peer 1 may support three applications (e.g., Application 1, Application 2, Application 3) and may be the virtual leader for Application 3. In this example, each peer may perform an association with the virtual leader for its selected application. If a peer supports multiple applications (e.g., Peer 1), the peer may perform multiple associations, for example with different VLs. For example, Peer 1 may perform an association with Peer 5 for Application 1, an association with Peer 2 for Application 2, and/or an association with Peer 6 and/or Peer 7 for Application 3. Peer 1 may report information about Peer 6 and/or Peer 7 to its virtual leaders (e.g., Peer 5 and/or Peer 2).

In an example, one or more associations may be leveraged for determining and implement routing protocols and methods. For example, two or more peers within a given proximity may be neighbors. The neighbors may perform associations with each other in order to exchange operative communications with each other. Associations may help to establish neighbor relationships, which may be leveraged for routing protocols, for example to select the appropriate end-to-end path(s) between the two or more peers. For example, in infrastructure-less peer communications, routing protocols may be used for supporting multi-hop communications. MAC address may be leveraged for routing since IP address allocation may become highly challenging without a centralized controller.

Association history information, information contained in association messages, and/or association context information/PI may be leveraged by routing protocols to select and adjust communication paths between two or more peers. For example, initiation of procedures such as an association update, a disassociation, and/or a re-association may trigger one or more peers to update routing paths in order to ensure an appropriate routing path between peers is being utilized. In an example, a routing update procedure and/or a routing change may trigger a new association to be established, for example to find better links due to link failure and/or establish multiple paths. Routing update procedures and/or a routing changes may trigger disassociation, for example, to remove one or more bad paths and/or cancel related associations accordingly. A routing table may be built using association information. Multi-hop association may be leveraged for multi-hop routing. An association reason indication (e.g., indicating a routing update) may be included in one or more association messages may be used to obtain a new neighbor for routing purposes.

For example, association updates may be leveraged to perform one or more routing-related activities such as updating a routing table, testing neighbor reachability, piggybacking a routing control message, etc. Application parameters regarding P2P topology may be leveraged to select one or more appropriate peers and/or to establish an association with the selected peers. For example, if the application utilizes a linear multi-hop topology, a new peer that lacks associations with previously associated peers may be selected as an association candidate in order to facilitate the multi-hop messaging. In an example, if an application utilizes a one-hop star topology, a new peer that is one-hop away and lacks a previous association with other peers may be selected as an association candidate.

The examples disclosed above for parallel device-based, user-based, and/or service-based association, fast multiple association, multi-hop association, fast multiple association update, multi-hop association update, fast multiple disassociation, multi-hop disassociation, re-association, hierarchical association (e.g., indirect transitional association) may be examples of use cases where there may be a massive number of peers such as for M2M communications.

In an example of infrastructure-based P2P communication, examples may be described for peer association, attachment, peering, and/or pairing in a 3GPP/LTE network. Although examples may be described in terms of an LTE network, other 3GPP or other infrastructure-based networks may be utilized. For example, two or more peers (e.g., UEs and/or WTRUs) in a 3GPP LTE network may implement peer communications to communicate with peers that are within their proximity as well as peers not in the proximity. For proximity communication, prior to data transmission, the peers may establish an association (e.g., attachment, peering, pairing, etc.) relationship. One or more aspects of the association establishment may be optimized or otherwise leverage information from 3GPP/LTE network(s). For example, two or more WTRUs that may or may not be in proximity may perform peer association via a 3GPP LTE core network.

Figure 59:
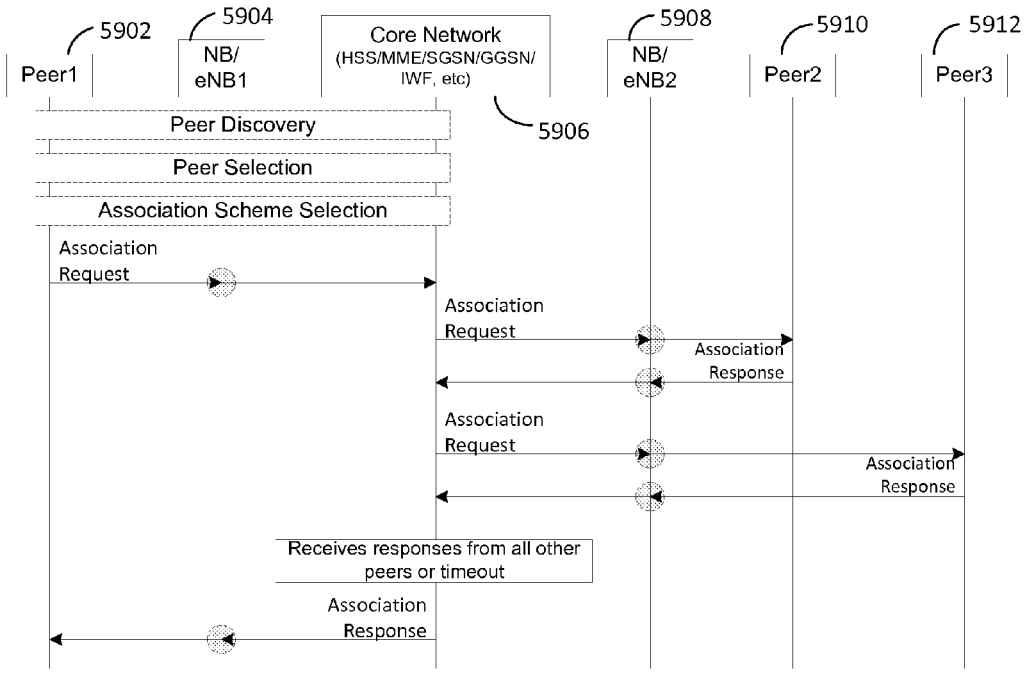
FIG. 59 illustrates an example procedure for peers to perform peer association via a 3GPP core network.

FIG. 59 illustrates an example procedure for peers to perform peer association via a 3GPP core network. For example, Peer1 5902 may perform peer discovery though NB/eNB1 5904 and/or one or more core network entities of Core Network 5906. Peer1 5902 may perform peer selection based on one or more factors as described herein. NB/eNB1 5904 and/or core network entities of Core Network 5906 may help Peer1 5902 to select appropriate peers (e.g., Peer2 5910 and/or Peer3 5912).

Peer1 5902 may select an association scheme, for example, based on information provided by NB/eNB1 5904 and/or core network entities of Core Network 5906. NB/eNB1 5904 and/or core network entities of Core Network 5906 may evaluate the association scheme selected by Peer1 5902 and may accept the scheme and/or suggest a different association scheme. For example, NB/eNB1 5904 and/or core network entities of Core Network 5906 may instruct Peer1 5902 to perform association with one or more peers (e.g., Peer2 5910 and/or Peer3 5912) via core network entities of Core Network 5906.

Peer1 5902 may send an association request to one or more core network entities of Core Network 5906. The NB/eNB1 5904 may intercept and interpret the association request and may create/store some status information for Peer1 5902. The association request message may include association context information/PI. In an example, the association request message may be a combination of al 3GPP/LTE attachment message and association context information. The association request message may indicate one or more other peers that Peer1 5902 wants to associate with. The association request message may serve multiple purposes including normal 3GPP/LTE network attachment and/or association with targeted peers (e.g., device-based/user-based/service-based association(s)). The association request message may be sent via the control plane (e.g., using non-access stratum (NAS) signaling) and/or via the data plane.

Core network entities of Core Network 5906 may forward the association request to the targeted peers, for example sequentially using unicast and/or concurrently using multicast. NB/eNB2 5908 may intercept and interpret for forwarded association request message and create/store some status information for one or more of the involved peers. The association request message may be forwarded to one or more targeted peers, and the one or more targeted peers may be in a sleep or idle state. Core network entities of Core Network 5906 may perform a device triggering or peer triggering procedure and piggyback an association request in the device triggering message. Core network entities of Core Network 5906 may set up an association timer or multiple timers for waiting for responses from the targeted peers.

The targeted peers (e.g., Peer2 5910 and/or Peer2 5912) may respond with an association response message back to the core network entities of Core Network 5906. The association response message may include contain association context information for the targeted peers. After receiving a response from one or more (and/or all) of the targeted peers (and/or the association timer expires), core network entities of Core Network 5906 may combine the received responses and forward the combined responses back to the Peer1 5902.

Figure 60:
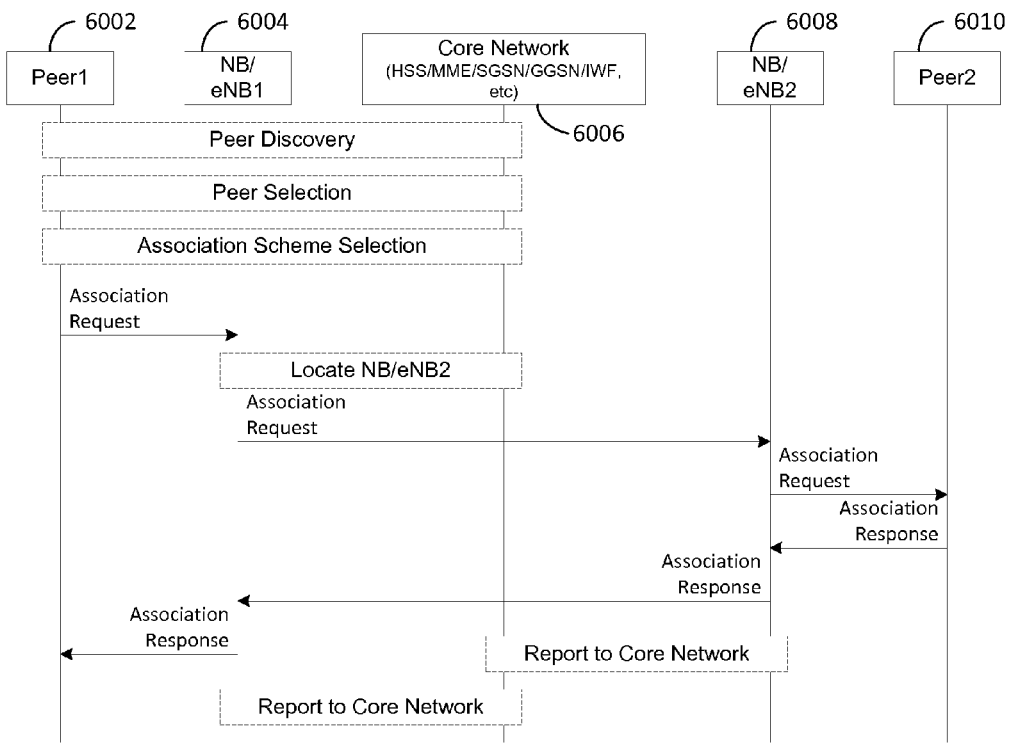
FIG. 60 illustrates an example procedure for performing peer association via one or more RAN entities when the potential peers are associated with the same provider but reside in different cells.

FIG. 60 illustrates an example procedure for performing peer association via one or more RAN entities when the potential peers are associated with the same provider but reside in different cells (e.g., two cells served by different RAN nodes). For example, Peer1 6002 may perform peer discovery based on one or more factors as described herein. NB/eNB1 6004 and/or core network entities of Core Network1 6006 may help Peer1 6002 to discover appropriate peers (e.g., Peer2 6010). For example, Peer1 6002 may perform peer selection based on one or more factors as described herein. NB/eNB1 6004 and/or core network entities of Core Network 6006 may help Peer1 6002 to select appropriate peers (e.g., Peer2 6010).

Peer1 6002 may select an association scheme, for example, based on information provided by NB/eNB1 6004 and/or core network entities of Core Network 6006. NB/eNB1 6004 and/or core network entities of Core Network 6006 may evaluate the association scheme selected by Peer1 6002 and may accept the scheme and/or suggest a different association scheme. For example, NB/eNB1 6004 and/or core network entities of Core Network 6006 may instruct Peer1 6002 to perform association with one or more peers (e.g., Peer2 6010) via one or more RAN entities such as one or more of NB/eNB1 6004 and/or NB/eNB2 6008.

Peer1 6002 may send an association request to NB/eNB1 6004. The association request message may include association context information/PI. In an example, the association request message may be a combination of al 3GPP/LTE attachment message and association context information. The association request message may indicate one or more other peers that Peer1 6002 wants to associate with. The association request message may serve multiple purposes including normal 3GPP/LTE network attachment and/or association with targeted peers (e.g., device-based/user-based/service-based association(s)). The association request message may be sent via the control plane (e.g., using radio resource control (RRC) signaling) and/or via the data plane.

NB/eNB1 6004 may locate NB/eNB2 6008, for example, based on information provided by one or more core network entities of Core Network 6006. NB/eNB1 6004 may forward the association request to the targeted NB/eNB (e.g., NB/eNB2 6008) over an 3GPP/LTE X2 interface and/or an enhanced 3GPP/LTE X2 interface. NB/eNB2 6008 may forward the association request to the targeted peer(s) (e.g., Peer2 6010) sequentially using unicast and/or concurrently using multicast. The association request message may be forward using the control plane (e.g., using RRC control signaling) or the data plane.

The targeted peers (e.g., Peer2 6010) may be in a sleep/idle state. NB/eNB2 6008 may conduct device triggering and/or peer triggering procedure(s) or perform device/peer triggering procedure and/or otherwise piggyback the association request in a device triggering message. NB/eNB2 6008 may set up an association timer or multiple timers for waiting for responses from targeted peers. The targeted peers (e.g., Peer2 6010) may send back an association response message to NB/eNB2 6008. This association response message may contain association context information/PI for Peer2 6010.

After receiving a response from the targeted peers and/or the association timer expiring, NB/eNB2 6008 may combine the received responses and forward the combined responses back to the NB/eNB1 6004, for example over the X2 interface and/or enhanced 3GPP/LTE X2 interface. NB/eNB2 6008 may report association results to one or more core network entities of Core Network 6006.

NB/eNB1 6004 may forward the association response message to Peer1 6002. NB/eNB1 6004 may change information and/or add new information (e.g., such as radio resource allocation) to the association response message before forwarding. NB/eNB1 6004 may report association results to one or more core network entities of Core Network 6006.

Figure 61:
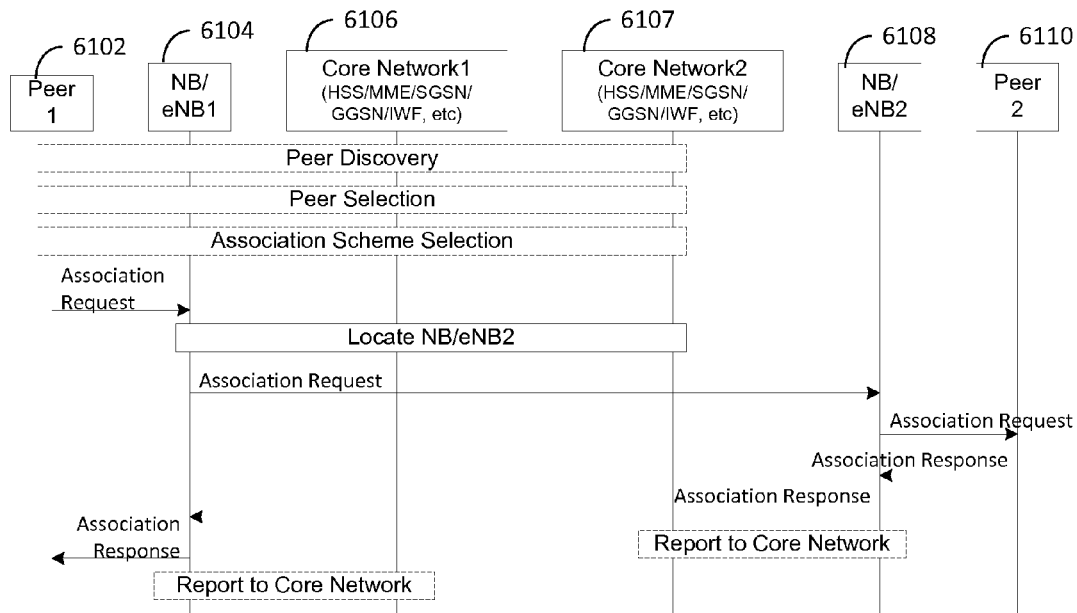
FIG. 61 illustrates an example procedure for performing peer association via one or more RAN nodes when the peers belong to different providers and reside in different cells.

FIG. 61 illustrates an example procedure for performing peer association via one or more RAN nodes when the peers belong to different providers and reside in different cells. For example, Peer1 6102 may perform peer discovery based on one or more factors as described herein. NB/eNB1 6104 and/or core network entities of Core Network1 6106 and/or Core Newtork2 6107 may help Peer1 6102 to discover appropriate peers (e.g., Peer2 6110). For example, Peer1 6102 may perform peer selection based on one or more factors as described herein. NB/eNB1 6104 and/or core network entities of Core Network1 6106 and/or Core Newtork2 6107 may help Peer1 6102 to select appropriate peers (e.g., Peer2 6110).

Peer1 6102 may select an association scheme, for example, based on information provided by NB/eNB1 6104 and/or core network entities of Core Network1 6106 and/or Core Network2 6106. NB/eNB1 6104 and/or core network entities of Core Network1 6106 and/or Core Network2 6106 may evaluate the association scheme selected by Peer1 6102 and may accept the scheme and/or suggest a different association scheme. For example, NB/eNB1 6104 and/or core network entities of Core Network1 6106 and/or Core Network2 6106 may instruct Peer1 6102 to perform association with one or more peers (e.g., Peer2 6110) via one or more RAN entities such as one or more of NB/eNB1 6104 and/or NB/eNB2 6108.

Peer1 6102 may send an association request to NB/eNB1 6104. The association request message may include association context information/PI. In an example, the association request message may be a combination of al 3GPP/LTE attachment message and association context information. The association request message may indicate one or more other peers that Peer1 6102 wants to associate with. The association request message may serve multiple purposes including normal 3GPP/LTE network attachment and/or association with targeted peers (e.g., device-based/user-based/service-based association(s)). The association request message may be sent via the control plane (e.g., using radio resource control (RRC) signaling) and/or via the data plane.

NB/eNB1 6104 may locate NB/eNB2 6108, for example, based on information provided by one or more core network entities of Core Network1 6106 and/or Core Network2 6106. NB/eNB1 6104 may forward the association request to the targeted NB/eNB (e.g., NB/eNB2 6108) over an 3GPP/LTE X2 interface and/or an enhanced 3GPP/LTE X2 interface. NB/eNB2 6108 may forward the association request to the targeted peer(s) (e.g., Peer2 6110) sequentially using unicast and/or concurrently using multicast. The association request message may be forward using the control plane (e.g., using RRC control signaling) or the data plane.

The targeted peers (e.g., Peer2 6110) may be in a sleep/idle state. NB/eNB2 6108 may conduct device triggering and/or peer triggering procedure(s) or perform device/peer triggering procedure and/or otherwise piggyback the association request in a device triggering message. NB/eNB2 6108 may set up an association timer or multiple timers for waiting for responses from targeted peers. The targeted peers (e.g., Peer2 6110) may send back an association response message to NB/eNB2 6108. This association response message may contain association context information/PI for Peer2 6110.

After receiving a response from the targeted peers and/or the association timer expiring, NB/eNB2 6108 may combine the received responses and forward the combined responses back to the NB/eNB1 6104, for example over the X2 interface and/or enhanced 3GPP/LTE X2 interface. NB/eNB2 6108 may report association results to one or more core network entities of Core Network2 6107.

NB/eNB1 6104 may forward the association response message to Peer1 6102. NB/eNB1 6104 may change information and/or add new information (e.g., such as radio resource allocation) to the association response message before forwarding. NB/eNB1 6104 may report association results to one or more core network entities of Core Network1 6106.

Figure 62:
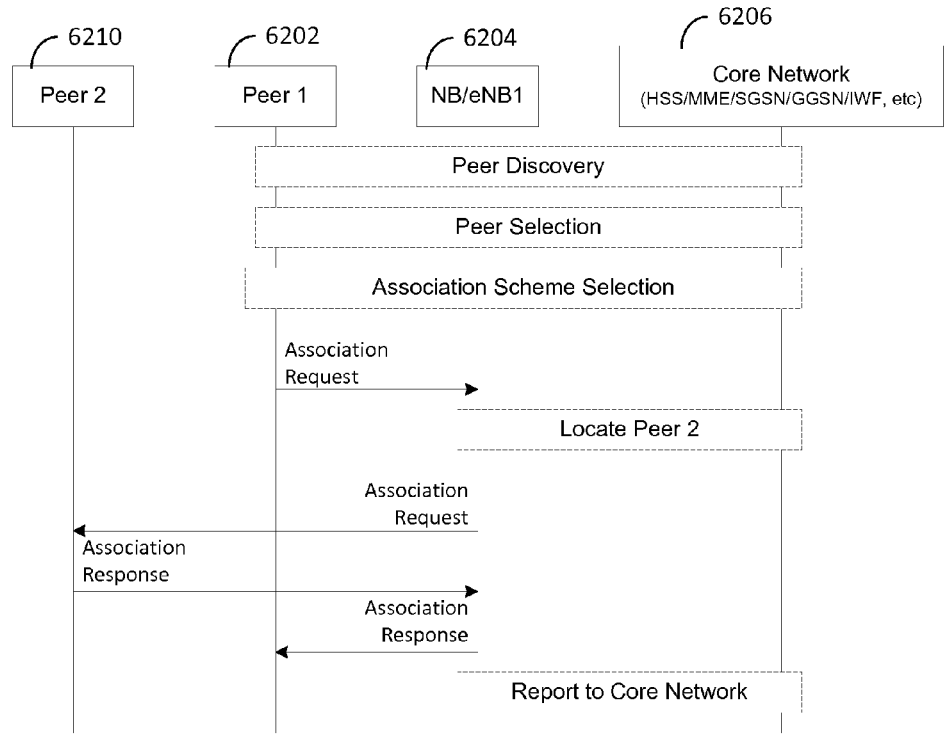
FIG. 62 illustrates an example procedure for performing peer association via RAN node when peers belong to the same provider and reside in the same cell.

FIG. 62 illustrates an example procedure for performing peer association via RAN node when peers belong to the same provider and reside in the same cell. For example, Peer1 6202 may perform peer discovery based on one or more factors as described herein. NB/eNB1 6204 and/or core network entities of Core Network 6206 may help Peer1 6202 to discover appropriate peers (e.g., Peer2 6210). For example, Peer1 6202 may perform peer selection based on one or more factors as described herein. NB/eNB1 6204 and/or core network entities of Core Network 6206 may help Peer1 6202 to select appropriate peers (e.g., Peer2 6010).

Peer1 6202 may select an association scheme, for example, based on information provided by NB/eNB1 6204 and/or core network entities of Core Network 6206. NB/eNB1 6204 and/or core network entities of Core Network 6206 may evaluate the association scheme selected by Peer1 6202 and may accept the scheme and/or suggest a different association scheme. For example, NB/eNB1 6204 and/or core network entities of Core Network 6206 may instruct Peer1 6202 to perform association with one or more peers (e.g., Peer2 6210) via one or more RAN entities such as NB/eNB1 6204. In an example, NB/eNB1 6204 may recognize that both potential peers (e.g., Peer1 6202 and Peer2 6210) are being served by NB/eNB1 6204, for example with or without assistance from one or more core network entities of Core Network 6206.

Peer1 6102 may send an association request to NB/eNB1 6104. The association request message may include association context information/PI. In an example, the association request message may be a combination of al 3GPP/LTE attachment message and association context information. The association request message may indicate one or more other peers that Peer1 6102 wants to associate with. The association request message may serve multiple purposes including normal 3GPP/LTE network attachment and/or association with targeted peers (e.g., device-based/user-based/service-based association(s)). The association request message may be sent via the control plane (e.g., using radio resource control (RRC) signaling) and/or via the data plane.

NB/eNB1 6104 may locate Peer2 6210 without involving core network entities of Core Network 6206, since Peer2 6210 may be served by NB/eNB 6008. In another example, NB/eNB1 6104 may locate Peer2 6210 based on information provided by one or more core network entities of Core Network 6106. NB/eNB2 6104 may forward the association request to the targeted peer(s) (e.g., Peer2 6110) sequentially using unicast and/or concurrently using multicast. The association request message may be forward using the control plane (e.g., using RRC control signaling) or the data plane.

The targeted peers (e.g., Peer2 6210) may be in a sleep/idle state. NB/eNB1 6204 may conduct device triggering and/or peer triggering procedure(s) or perform device/peer triggering procedure and/or otherwise piggyback the association request in a device triggering message. NB/eNB1 6204 may set up an association timer or multiple timers for waiting for responses from targeted peers. The targeted peers (e.g., Peer2 6210) may send back an association response message to NB/eNB1 6204. This association response message may contain association context information/PI for Peer2 6210.

After receiving a response from the targeted peers and/or the association timer expiring, NB/eNB1 6204 may combine the received responses and forward the combined responses back to Peer1 6202. NB/eNB1 6204 may change information and/or add new information (e.g., such as radio resource allocation) to the association response message before forwarding. NB/eNB1 6204 may report association results to one or more core network entities of Core Network 6206.

Figure 63:
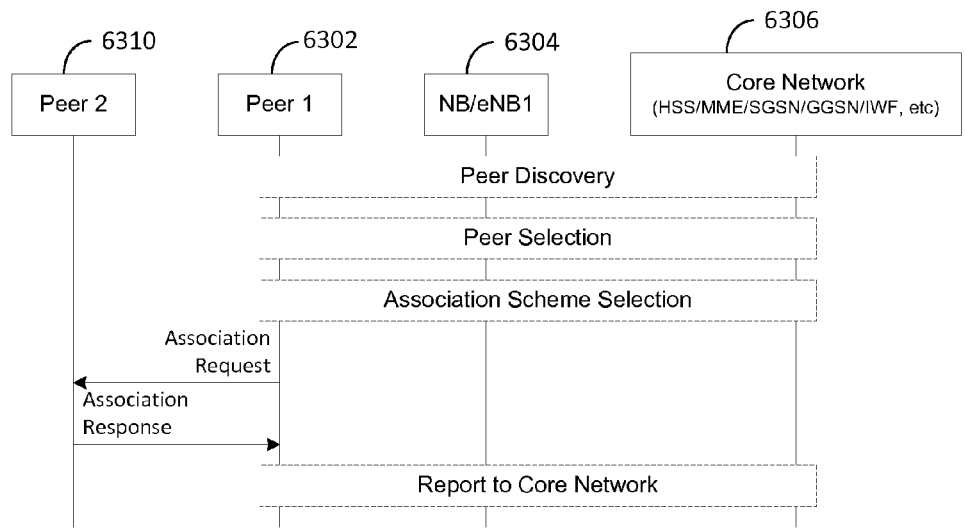
FIG. 63 illustrates an example procedure to perform peer association via a direct D2D link when peers belong to the same provider.

FIG. 63 illustrates an example procedure to perform peer association via a direct D2D link when peers belong to the same provider. For example, Peer1 6302 may perform peer discovery based on one or more factors as described herein. NB/eNB1 6304 and/or core network entities of Core Network 6306 may help Peer1 6302 to discover appropriate peers (e.g., Peer2 6310). For example, Peer1 6302 may perform peer selection based on one or more factors as described herein. NB/eNB1 6304 and/or core network entities of Core Network 6306 may help Peer1 6302 to select appropriate peers (e.g., Peer2 6310).

Peer1 6302 may select an association scheme, for example, based on information provided by NB/eNB1 6304 and/or core network entities of Core Network 6306. NB/eNB1 6304 and/or core network entities of Core Network 6306 may evaluate the association scheme selected by Peer1 6302 and may accept the scheme and/or suggest a different association scheme. For example, NB/eNB1 6304 and/or core network entities of Core Network 6306 may instruct Peer1 6302 to perform association with one or more peers (e.g., Peer2 6310) via a direct D2D link between the peers. In an example, NB/eNB1 04 may recognize that both potential peers (e.g., Peer1 6302 and Peer2 6310) are being served by NB/eNB1 6304, for example with or without assistance from one or more core network entities of Core Network 6206. NB/eNB1 6304 may recognize the peers are in proximity and/or may communicate via the D2D link.

Peer1 6302 may send an association request to Peer2 6310 over a direct D2D link. This association request message may include association context information/PI. In an example, the association request message may be a combination of al 3GPP/LTE attachment message and association context information. The association request message may indicate one or more other peers that Peer1 6302 wants to associate with. The association request message may serve multiple purposes including normal 3GPP/LTE network attachment and/or association with targeted peers (e.g., device-based/user-based/service-based association(s)). The association request message may be sent via the control plane (e.g., using radio resource control (RRC) signaling) and/or via the data plane.

Peer2 6310 may respond directly to Peer1 6302 to complete the attachment. Peer1 6302 may report association results to one or more of NB/eNB1 6304 and/or one or more core network entities of Core Network 6306.

Figure 64:
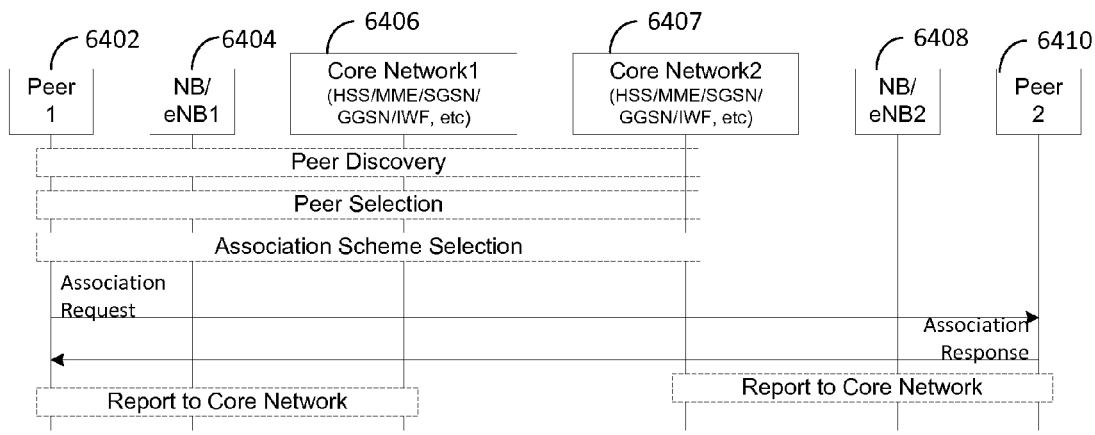
FIG. 64 illustrates an example procedure to perform peer association via a direct D2D link when peers belong to different providers.

FIG. 64 illustrates an example procedure to perform peer association via a direct D2D link when peers belong to different providers. For example, Peer1 6402 may perform peer discovery based on one or more factors as described herein. NB/eNB1 6404 and/or core network entities of Core Network1 6406 and/or Core Newtork2 6407 may help Peer1 6402 to discover appropriate peers (e.g., Peer2 6410). For example, Peer1 6402 may perform peer selection based on one or more factors as described herein. NB/eNB1 6404 and/or core network entities of Core Network1 6406 and/or Core Newtork2 6407 may help Peer1 6402 to select appropriate peers (e.g., Peer2 6410).

Peer1 6402 may select an association scheme, for example, based on information provided by NB/eNB1 6404 and/or core network entities of Core Network1 6406 and/or Core Network2 6406. NB/eNB1 6404 and/or core network entities of Core Network1 6406 and/or Core Network2 6406 may evaluate the association scheme selected by Peer1 6402 and may accept the scheme and/or suggest a different association scheme. For example, NB/eNB1 6404 and/or core network entities of Core Network1 6406 and/or Core Network2 6406 may instruct Peer1 6402 to perform association with one or more peers (e.g., Peer2 6410) via a direct D2D link between the peers. In an example, NB/eNB1 6404 and/or one or more entities of Core Network1 6406 and/or Core Network2 6407 may recognize that both potential peers (e.g., Peer1 6402 and Peer2 6410) are in proximity to each other, and instruct the peers to associate using the direct D2D connection.

Peer1 6402 may send an association request to Peer2 6410 over a direct D2D link. This association request message may include association context information/PI. In an example, the association request message may be a combination of al 3GPP/LTE attachment message and association context information. The association request message may indicate one or more other peers that Peer1 6342 wants to associate with. The association request message may serve multiple purposes including normal 3GPP/LTE network attachment and/or association with targeted peers (e.g., device-based/user-based/service-based association(s)). The association request message may be sent via the control plane (e.g., using radio resource control (RRC) signaling) and/or via the data plane.

Peer2 6410 may respond directly to Peer1 6402 to complete the attachment. Peer1 6402 may report association results to one or more of NB/eNB1 6404 and/or one or more core network entities of Core Network1 6406. Peer2 6410 may report association results to one or more of NB/eNB2 6408 and/or one or more core network entities of Core Network2 6407.

Figure 65:
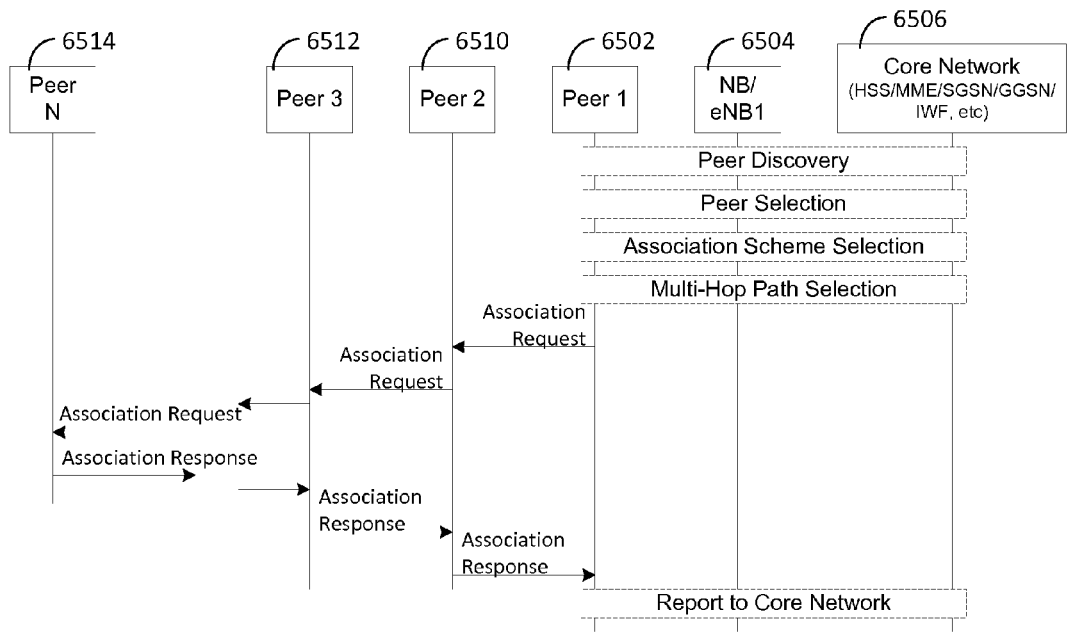
FIG. 65 illustrates an example procedure to perform multi-hop peer association via RAN node when peers belong to the same provider.

FIG. 65 illustrates an example procedure to perform multi-hop peer association via RAN node when peers belong to the same provider. For example, Peer1 6502 may perform peer discovery based on one or more factors as described herein. NB/eNB1 6504 and/or core network entities of Core Network 6506 may help Peer1 6502 to discover appropriate peers (e.g., Peer2 6510, Peer3 6512, . . . , PeerN 6514). For example, Peer1 6502 may perform peer selection based on one or more factors as described herein. NB/eNB1 6504 and/or core network entities of Core Network 6506 may help Peer1 6502 to select appropriate peers (e.g., Peer2 6510, Peer3 6512, . . . , PeerN 6514).

Peer1 6502 may select an association scheme, for example, based on information provided by NB/eNB1 6504 and/or core network entities of Core Network 6506. NB/eNB1 6504 and/or core network entities of Core Network 6506 may evaluate the association scheme selected by Peer1 6502 and may accept the scheme and/or suggest a different association scheme. For example, NB/eNB1 6504 and/or core network entities of Core Network 6506 may instruct Peer1 6502 to perform association with one or more peers (e.g., Peer2 6510, Peer3 6512, . . . , PeerN 6514) via a direct D2D link between the peers. NB/eNB1 6504 and/or core network entities of Core Network 6506 may instruct Peer1 6502 to perform association with one or more peers using multi-hop (e.g., Peer3 6512, . . . , Peer6 6514) from other peers that it communicate with using a direct D2D link (e.g., Peer2 6510). In an example, NB/eNB1 6504 may recognize that potential peers (e.g., Peer2 6510, Peer3 6512, . . . , PeerN 6514) are being served by NB/eNB1 6504, for example with or without assistance from one or more core network entities of Core Network 6506. NB/eNB1 6504 may recognize the peers are in proximity and/or may communicate via the D2D link using single hops and/or multi-hops.

Peer1 6502 may perform a multi-hop path selection, for example with or without the assistance of one or more of NB/eNB1 6504 and/or one or more entities of Core Network 6506. The multi-hop path selection may indicate the appropriate multi-hop path from Peer1 6502 to one or more of Peer2 6510, Peer3 6512, . . . , PeerN 6514. The NB/eNB1 6504 and/or one or more entities of Core Network 6506 may determine and select the proper multi-hop path for Peer1 6502 to one or more of Peer2 6510, Peer3 6512, . . . , PeerN 6514 (and/or may otherwise approve the multi-hop path selected by Peer1 6502). In an example, Peer1 6502 may determine and select the multi-hop path itself and may use a direct D2D link to perform association. In this example, one or more of NB/eNB1 6504 and/or one or more entities of Core Network 6506 may be bypassed.

Peer1 6502 may send an association request to the target Peer2 6510 over a direct D2D link. The association request message may include association context information/PI. The association request may be the combination of normal 3GPP/LTE attachment message and the association context information/PI. This message may indicate one or more other peers (e.g., Peer 3 6512 . . . , PeerN 6514) that Peer1 6502 wants to associate with (e.g., in addition to Peer2 6510). The association request message may be sent via control plane (e.g., RRC control signaling) and/or data plane. One or more intermediary peers (e.g., Peer 2 6510 and/or Peer3 6512) may forward the association request to the next peer (e.g., Peer3 6512 and/or PeerN 6514, respectively). Each other intermediary peer (e.g., Peer 2 6510 and/or Peer3 6512) and/or end peer (e.g., PeerN 6514) may decide to accept or reject the association request.

The targeted peers (e.g., one or more of Peer2 6510, Peer3 6512, . . . , PeerN 6514) may send back an association response message to Peer1 6502. The association response message may contain association context information/PI for the associating peers. The intermediary peer(s) peers (e.g., Peer 2 6510 and/or Peer3 6512) may forward the association response to the next peer until it arrives at Peer1 6502. Peer1 6502 may report association results to the NB/eNB1 6504 and/or one or more entities of Core Network 6506.

Figure 66:
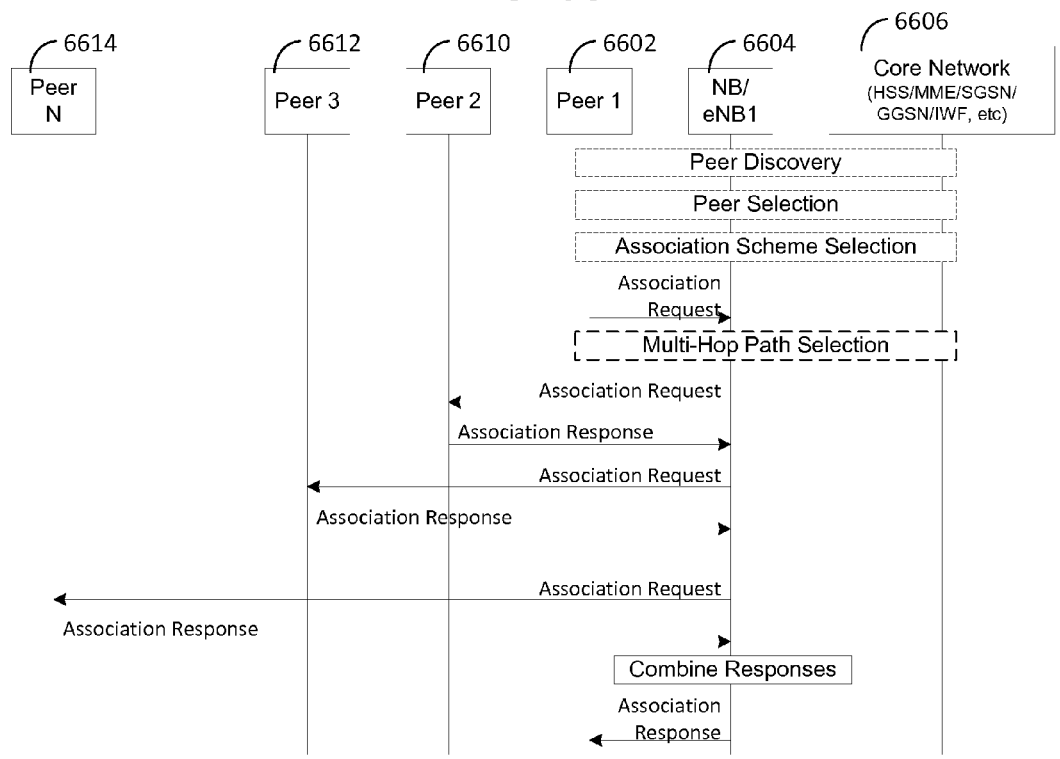
FIG. 66 illustrates an example for multi-hop association where an RAN node may act as an intermediary node between peers.

FIG. 66 illustrates an example for multi-hop association where an RAN node may act as an intermediary node between peers. For example, Peer1 6602 may perform peer discovery based on one or more factors as described herein. NB/eNB1 6604 and/or core network entities of Core Network 6606 may help Peer1 6602 to discover appropriate peers (e.g., Peer2 6610, Peer3 6612, . . . , PeerN 6614). For example, Peer1 6602 may perform peer selection based on one or more factors as described herein. NB/eNB1 6604 and/or core network entities of Core Network 6606 may help Peer1 6602 to select appropriate peers (e.g., Peer2 6610, Peer3 6612, . . . , PeerN 6614).

Peer1 6602 may select an association scheme, for example, based on information provided by NB/eNB1 6604 and/or core network entities of Core Network 6606. NB/eNB1 6604 and/or core network entities of Core Network 6606 may evaluate the association scheme selected by Peer1 6602 and may accept the scheme and/or suggest a different association scheme. For example, NB/eNB1 6604 and/or core network entities of Core Network 6606 may instruct Peer1 6602 to perform association with one or more peers (e.g., Peer2 6610, Peer3 6612, . . . , PeerN 6614) using a RAN node (e.g., NB/eNB1 6604) as an intermediary. For example, NB/eNB1 6604 may recognize that potential peers (e.g., Peer2 6610, Peer3 6612, . . . , PeerN 6614) are being served by NB/eNB1 6604, for example with or without assistance from one or more core network entities of Core Network 6606. NB/eNB1 6604 may recognize that it may forward messages between the peers.

Peer1 6602 may perform a multi-hop path selection, for example with or without the assistance of one or more of NB/eNB1 6504 and/or one or more entities of Core Network 6506. The multi-hop path selection may indicate the appropriate multi-hop path from Peer1 6602 to one or more of Peer2 6610, Peer3 6612, . . . , PeerN 6614. The NB/eNB1 6604 and/or one or more entities of Core Network 6606 may determine and select the proper multi-hop path for Peer1 6602 to one or more of Peer2 6610, Peer3 6612, . . . , PeerN 6614 (and/or may otherwise approve the multi-hop path selected by Peer1 6602). In an example, NB/eNB1 6604 and/or one or more entities of Core Network 6606 may be indicate that NB/eNB1 6604 should act as an intermediary between the pees during the multi-hop path selection.

Peer1 6602 may send an association request to NB/eNB1 6604. The association request message may include association context information/PI. The association request may be the combination of normal 3GPP/LTE attachment message and the association context information/PI. This message may indicate one or more other peers (e.g., Peer2 6610, Peer 3 6512 . . . , PeerN 6514) that Peer1 6502 wants to associate with. The association request message may be sent via control plane (e.g., RRC control signaling) and/or data plane. NB/eNB1 6604 may act as an intermediary peer may forward the association request to one or more potential peers (e.g., Peer2 6610, Peer 3 6512 . . . , PeerN 6514). The associate request may forwarded sequentially and/or concurrently using multicast. Each of the potential peers peer (e.g., Peer2 6610, Peer 3 6512 . . . , PeerN 6514) may decide to accept or reject the association request. The potential peers (e.g., Peer2 6610, Peer 3 6512 . . . , PeerN 6514) may send association responses to NB/eNB1 6604. The association response message may contain association context information/PI for the associating peers.

The NB/eNB1 6604 may receive each response and combine them. NB/eNB 6604 may send an aggregated response back to the Peer1 6602. The association response message may contain association context information/PI. NB/eNB1 6604 may send radio resource allocation notification(s) and/or relevant control information to one or more intermediary and/or target peers to configure direct D2D links between two or more of the peers. Example control information for the D2D link that may be sent to the peers may include transmit power, coding scheme, etc.

Group peer association may be performed via one or more RAN nodes. In an example, a peer may communicate with multiple other peers in the same cell using direct D2D links. For example, the RAN node (e.g., NB and/or eNB) may help to manage the group membership, for example including selecting the virtual leader, adjusting the virtual leader, and/or notifying other peers of the new virtual leader, etc.

Peers may perform associations sequentially with each other peer(s) and/or concurrently. Peers may request that RAN nodes and/or peers determine and/or implement multi-hop path(s) and/or topology for connecting peers in the same group.

RAN nodes may be charged with controlling or otherwise assisting group membership management. For example, if there is a new peer to join a group, a RAN node (e.g., NB/eNB) may help the new member to perform association with the virtual leader and other group member peers, for example using the methods described herein. If an existing peer leaves the group or otherwise goes offline, the RAN node (e.g., NB/eNB) may help to re-select multi-hop paths and/or topology and/or re-perform the association for the affected peer.

Figure 67:
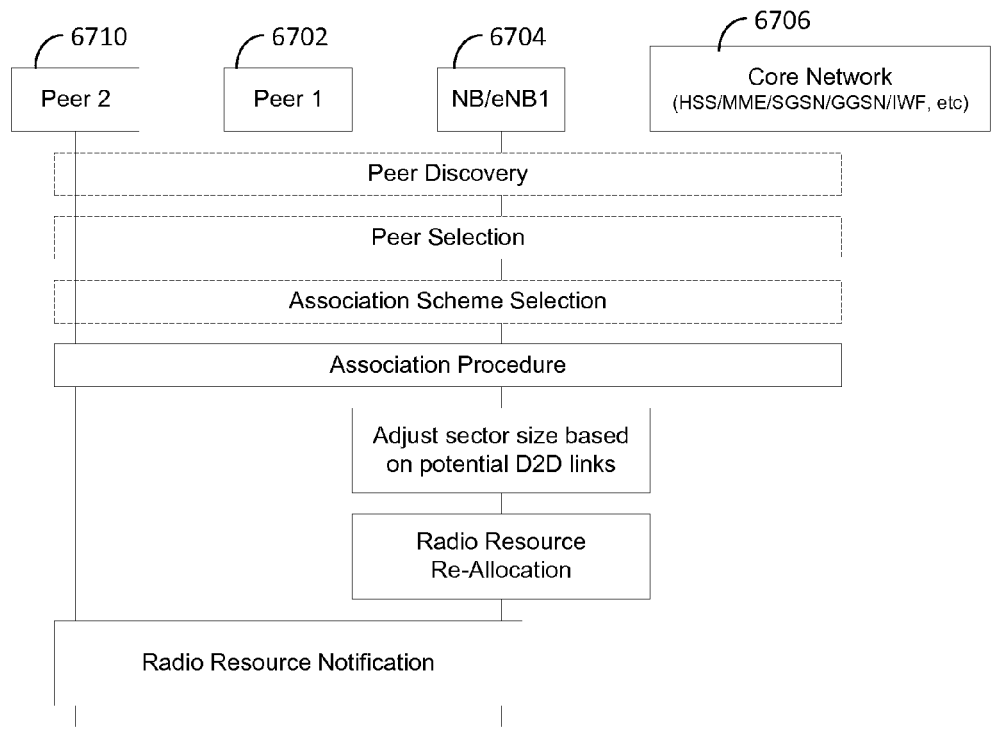
FIG. 67 illustrates an example procedure for performing joint peer association and RAN sectorization.
Figure 68:
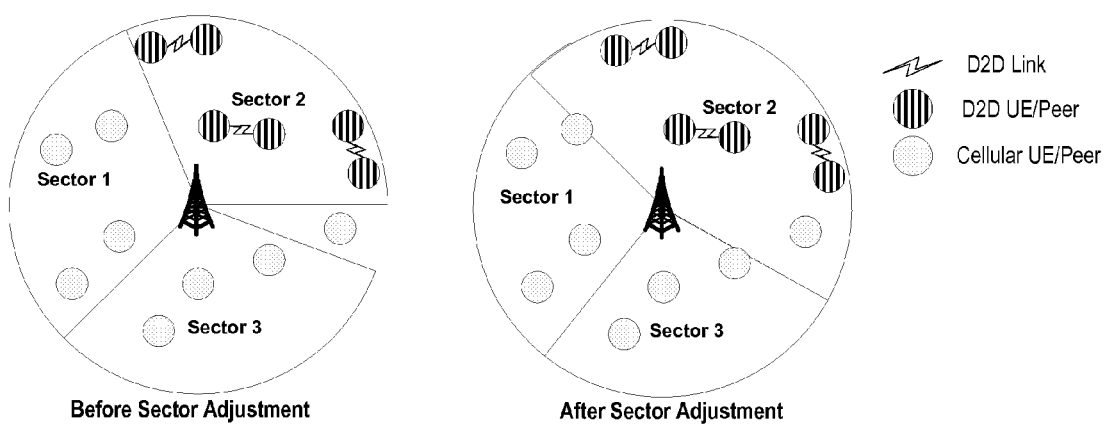
FIG. 68 illustrates how a sector may be expanded and/or adjusted (e.g., Sector 2) if a large number of devices are communicating using a D2D link.

FIG. 67 illustrates an example procedure for performing joint peer association and RAN sectorization, for example where peers belong to the same provider. For example, one or more of Peer1 6702, Peer2 6710, NB/eNB1 6704, and/or entities of Core Network 6706 may perform one or more of peer discovery, peer selection, association scheme selection, and/or an association procedure as described herein. In an example, NB/eNB1 6704, for example based on the dynamically established association relationship, may adaptively adjust its sectorization (e.g., enlarge or reduce a sector size). For example, traffic load may be balanced in each sector based on leveraging and/or offloading traffic to potential direct D2D links. For example, if a sector has a large number direct D2D links and/or a large amount of traffic being exchanged on D2 lengths, the sector size may be enlarged to cover more WTRUs using infrastructure-based communications. NB/eNB1 6704 may perform radio resource re-allocation for peers (e.g., Peer1 6702 and/or Peer2 6710) based on the knowledge of the D2D link usage. NB/eNB1 6704 may notify peers of radio resource re-allocation results. FIG. 68 illustrates how a sector may be expanded (e.g., Sector 2) if a large number of devices are communicating using a D2D link.

Examples are disclosed for utilizing context information, for example context information included in CAID in a peer discovery procedure. For example, Peer Discovery (PD) may be include a peer discovering, identifying, and/or otherwise locating one or more P2P networks (P2PNWs)

and/or the peer discovering, identifying, and/or otherwise locating one or more peers that are capable of a and/or desire to communicate using P2P communications. For example, the discovered peers may be in the proximity of the searching peer and context information/PI may be used to facilitate more meaningful discovery (e.g., locating peers with a desired context in the proximity, for example for a specific application, user, and/or service).

A PD process may be initiated by and/or triggered by one or more of a P2P application (e.g., via higher layers), a central controller of an infrastructure-based system (e.g., a coordinator of 802.15.4 WPAN, an S-GW/MME/eNB of 3GPP cellular system core network and/or RAN etc.), a peer of an infrastructure-based system (e.g., a FFD and/or RFD of 802.15.4 WPAN, an MS/UE/WTRU of 3GPP cellular system, etc.), a peer of an infrastructure-less system (e.g., a device of 802.15.8 PAC), and/or nodes or functional entities interacting with PD. PD may be implemented with one or more aspects of Peer Association (PA), Peer Re-Association, Peer Dis-association, Peer Association Update, etc.

A peer/WTRU may be configured to perform PD based on various criteria or inputs, such as one or more of a context-aware ID (CAID), peer information (PI), PD criteria (PDC), PD parameters (PDPa), a PD candidate list (PDCL), PD candidate parameters (PDCPs), and/or the like.

For example a CAID may be a locally unique ID that includes one or more items of context information, such as indications of services or applications, indication of a user, indication of a device, indication of proximity, etc. Examples of CAIDs that may be created and/or used after a successful peer discovery may include one or more of a DAID, a SAID, and/or a UAID. A CAID may be, for example, provisioned by device manufacture, provided by the service subscriber, assigned at the device registration, assigned at the application registration, mapped by the central controller (e.g., such as coordinator of 802.11WiFi or 802.15.4 WPAN; eNB/MME/S-GW or other logic functions of the core network/RAN in 3GPP cellular system, etc.), determined by the peer, and/or the like.

Context information/PI used to construct a CAID may be based on different applications and may include information that describes one or more of P2P services (e.g., such as context category, applications, etc.), user(s) and/or group(s) (e.g., such as user profile, affiliation, group, etc.), device (e.g., such as device type, group, capability, etc.), P2P communication requirements (e.g., such as proximity, preferences, priority, privacy, security, etc.), and/or other information that indicates the types of P2P communication session that the peer is interested in utilizing.

PDC may include one or more criteria used for qualifying and/or otherwise evaluating a peer candidate that is detected. Examples of PDC may include one or more of proximity information, device/application/service/user preferences, priority information, privacy information, security information, device capability information, charging or billing policies, radio channel quality, and/or the like.

PDPa may include one or more parameters used during the PD process. Examples of PDPa may include one or more of a Frequency Channel List (FCL), a Slot Number (SNum), a code sequence, a PD Scan time window, a Max PD Scan time, a PD threshold, etc.

PDCL may include one more PD candidates in the proximity, for example as provided by a central controller by high layer and/or determined based on previous PD processes. For example, the central controller may be a coordinator of 802.11WiFi or 802.15.4 WPAN, a eNB/MME/S-GW and/or other logic functions of the core network/RAN in 3GPP cellular system, etc.

PDCPs may include one or more parameters associated with the PDCL. Examples of PDCPs may include one or more of proximity information, preferences, priority information, privacy information, security information, device capability information, charging or billing policies, radio channel quality information, etc.

One or more of the CAID, the PDC, the PDPa, the PDCL, the PDCPs, and/or other PD inputs may be provisioned by device manufacture, may be provided by the service subscriber, may be assigned at the device registration, may be assigned at the application registration, may be mapped by a central controller (e.g., such as coordinator of 802.11WiFi or 802.15.4 WPAN; eNB/MME/S-GW or other logic functions of the core network/RAN in 3GPP cellular system), and/or may otherwise be determined by the peer prior to discovery.

As a result of a PD procedure, a peer me determine one or more of a peer discovered list (PDL) and/or peer discovered parameters (PDPs). A PDL may indicate one or more qualified peers that meet the identified discovery requirements as identified in the PD process. PDPs may include one or more parameters associated with the peer(s) that were discovered, such as one or more of proximity information, preferences, priority information, privacy information, security information, device capability information, charging or billing policies, radio channel quality information, etc. On or more of the PDL and/or the PDPs may be used for one or more of the Peer Association (PA) process for establishing P2P logic connections, upper layer processing, and/or subsequent PD processes.

Figure 69:
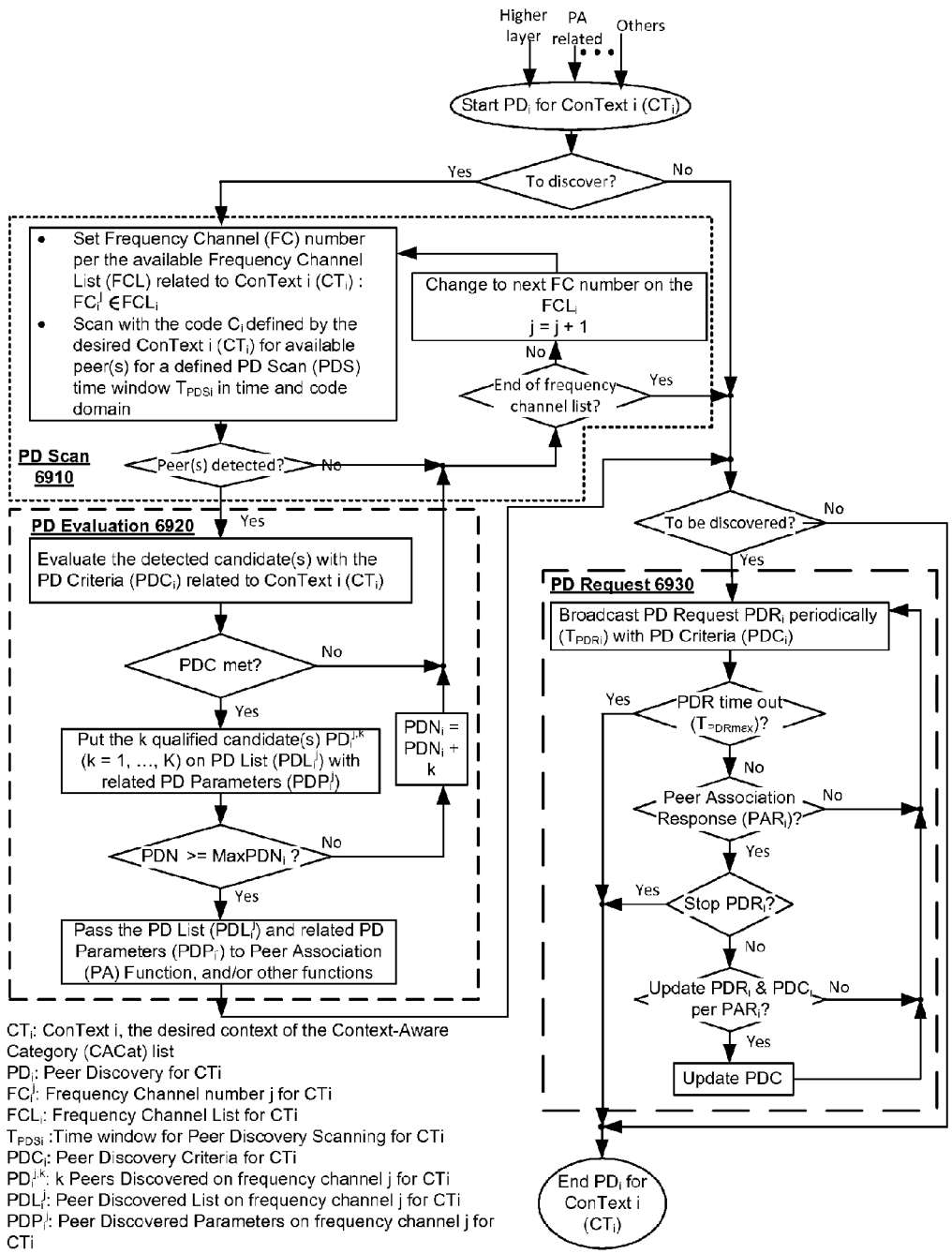
FIG. 69 illustrates an example of a context-aware peer discovery method.

FIG. 69 illustrates an example of a context-aware peer discovery method. For example. as shown in FIG. 69, context-aware PD procedure may include one or more of a PD Scan 6910, PD Evaluation 6920, and/or PD Request 6930.

For example, during the PD Scan 6910 stage, a peer may scan one or more of a beacon channel, a pilot channel, a broadcast channel, a paging channel, a synchronization channel, and/or the like for information related to other potential peers. For example, during the PD scan 6910, a peer may attempt to determine one or more items of context information (e.g., as include in a CAID) included in one or more of across frequency, time, and/or code domains, to detect any potential P2PNW(s) and/or peer(s). For example, peers may broadcast context information (e.g., such as CAIDs) using one or more of frequency division, time division, and/or code division multiplexing, and peers may be configured to scan across the corresponding domain (e.g., frequency, timer, and/or code) within a predefined scanning window. The detected P2PNW(s) and/or peer(s) may be passed to PD evaluation 6920 stage for qualification.

At the PD Evaluation 6920 stage, the peer may evaluate the discovered P2PNW(s) and/or peer(s) using one or more discovery criteria. For example, the discovery criteria may be used to qualify and/or disqualify the discovered candidate(s) (e.g., P2PNW(s) and/or peer(s)). The qualified P2PNW(s) and/or peer(s) (e.g., and/or their associated parameters) may be used during peer association or attachment for setting up a P2P logical connection. The PD outputs may be passed to the higher layers and/or used in the next PD process.

PD Request 6930 may be performed so that the peer may be discovered by other potential peers. For example, during PD Request 6930 s peer may broadcasts PD Request information such as one or more of desired context information and/or context information about the peers, for example using a CAID. For example, Table 4 indicates examples of context information that may be include in a CAID for one or more of service-based, user-based, and/or device based discover mechanisms.

TABLE 4

| Service Based | | | | |
|---|---|---|---|---|
| Context-aware Category (CACat) | Service ID (SID) | User ID (UID) | AP Parameters (APParam) | Others |
| Emergency | War Fire Medical . . . | Homeland Security Police Patient . . . | Region, broadcast/multi-cast . . . Location, severity, help center . . . Hospital, doctor, privacy level . . . . . . | |
| High Priority | Flood watch . . . | Weather forecast center . . . | Region, time, severity, help center . . . | |
| Connection | Facebook . . . | Facebook User ID | Chat, status update . . . | |
| Advertisement | Service x Product y . . . | Agent or store Manufacture or store . . . | Price, discount, forward credit . . . Price, club coupon, expiring date . . . . . . | |
| User Centric Activities | Content exchange | User ID | Content name, size, privacy . . . | |
| Smart Environment | Device Sync | User ID | Device list, items to synchronize . . . | |
| Smart Transportation | Traffic | Traffic controller | Location, time, status . . . | |
| Network of Network | Network name | Network ID | Context, load, parent network . . . | |
| User Based | | | | |
| Context-aware Category (CACat) | User ID (UID) | | User Parameters (UParam) | Others |
| Gamer | User ID or virtual User ID | | Games, game skill level . . . | |
| Multi-hopper | User ID | | Level of hops, number of peers behind . . . | |
| Device Based | | | | |
| Context-aware Category (CACat) | Device ID (DID) | | Device Parameters (DParam) | Others |
| Tablet | Device ID | | Manufacturer, operating system . . . | |
| Monitoring System | Device ID | | Manufacturer, model . . . | |

For example, the CAID and/or other context information/PI may be transmitted on one of more o of a beacon channel, a pilot channel, a broadcast channel, a paging channel, a synchronization channel, and/or the like. A PD request may be terminated by a timeout procedure, for example based on one or more of a maximum PD request time elapsing, receiving a response from a PA, the higher layer instructions, and/or information/instructions received from a peer and/or central controller.

If a P2PNW is formed, a virtual leader (VL) of the P2PNW may perform the PD request broadcasting, for example to avoid the congestions and/or interference caused by too many peers broadcasting the same PD request. For example, a first peer broadcasting the PD request may be selected to be the default VL, for example unless the VL is reselected during the peer association or attachment. The first P2PNW may be to be the default SuperVL, for example unless the SuperVL is reselected later among the VLs in the proximity.

One or more of PD Scans, PD Evaluations, and/or PD Requests may be performed or otherwise implemented at different entities and/or logic functions. For example, the device, peer, MS, UE, WTRU, etc. may perform PD Scan and PD Evaluation, and a coordinator and/or eNB may perform the PD Request broadcasting.

Many different types of discovery implementations may be derived from this general PD procedure. For example, the discovery procedure may be tailored to the specific context-based services or applications being utilized. Discovery policies, for example one or more of security settings and/or privacy setting (and/or the like) may be dependent on the purpose of the discovery procedure. In some example, peers may be configured to discover other peers while remaining undiscoverable by the other peers, to refrain from discovering while remaining discoverable by other peers, and/or to discover other peers while being discoverable to the other peers.

For example, a peer may be configured to discover other peers while remaining undiscoverable by the other peers. For example, a peer may be configured to perform one or more PD Scans and/or one or more PD Evaluations without performing PD Request functionality. The peer may still discover one or more qualified P2PNW(s) and/or peer(s)

and/or may be timed out and/or otherwise directed to stop the scan. For example, scanning and evaluating potential peers while remaining undiscoverable may be useful of peers searching for the commercial advertisements, peers looking for public safety support, peers acquiring any broadcast services and/or lawful interceptions, and/or the like.

In an example, a peer may be configured to refrain from discovering other potential P2PNW(s) and/or other potential peer(s) while remaining discoverable by other potential P2PNW(s) and/or other potential peer(s). For example, a peer may be configured to process PD requests (e.g., perform the PD Request stage) while refraining from performing PD scans and/or PD evaluation. For example, a peer may remain in the PD Request stage and may broadcast PD requests until timed out and/or otherwise directed to stop. For example, it may be useful to refrain from performing discovery while remaining discoverable when broadcasting commercial advertisements, when broadcasting services provided by agents, etc.

For peers that are configured to discover other peers while remaining discoverable themselves, the peers may be configured to perform each of the PD scan stage, the PD evaluation stage, and the PD discovery stage. If a discovery scan is successful, for example if one or more peers are detected (e.g., PD Scan identifies one or more potential peers) and meet the relevant PD criteria (e.g., PD Evaluation criteria are met for one or more potential peers), a peer may switch to the PD Request stage to be discovered. If a discovery scan is unsuccessful, for example if less than a minimum number of peers are detected/meet the relevant PD criteria, a peer may switch to the PD Request stage to be discovered. In an example, the peer may broadcast a PD request, which may include context information such as the CAID and/or PI, for example until timed out and/or directed to stop. An example of when it may be useful to both discover and be discoverable may include typical two-way pair and/or group communication sessions (e.g., such as social networking, keep alive, personalized advertisement, gaming, conference meeting, etc.).

In an example, peers may be configured to perform context-aware Fast Peer Discovery. For example, to avoid the overhead of protocol stack signaling and delays associated with processing to obtain higher layer information, a context-aware identifier (CAID) may be at the PHY/MAC layer for fast peer discovery.

Figure 70:
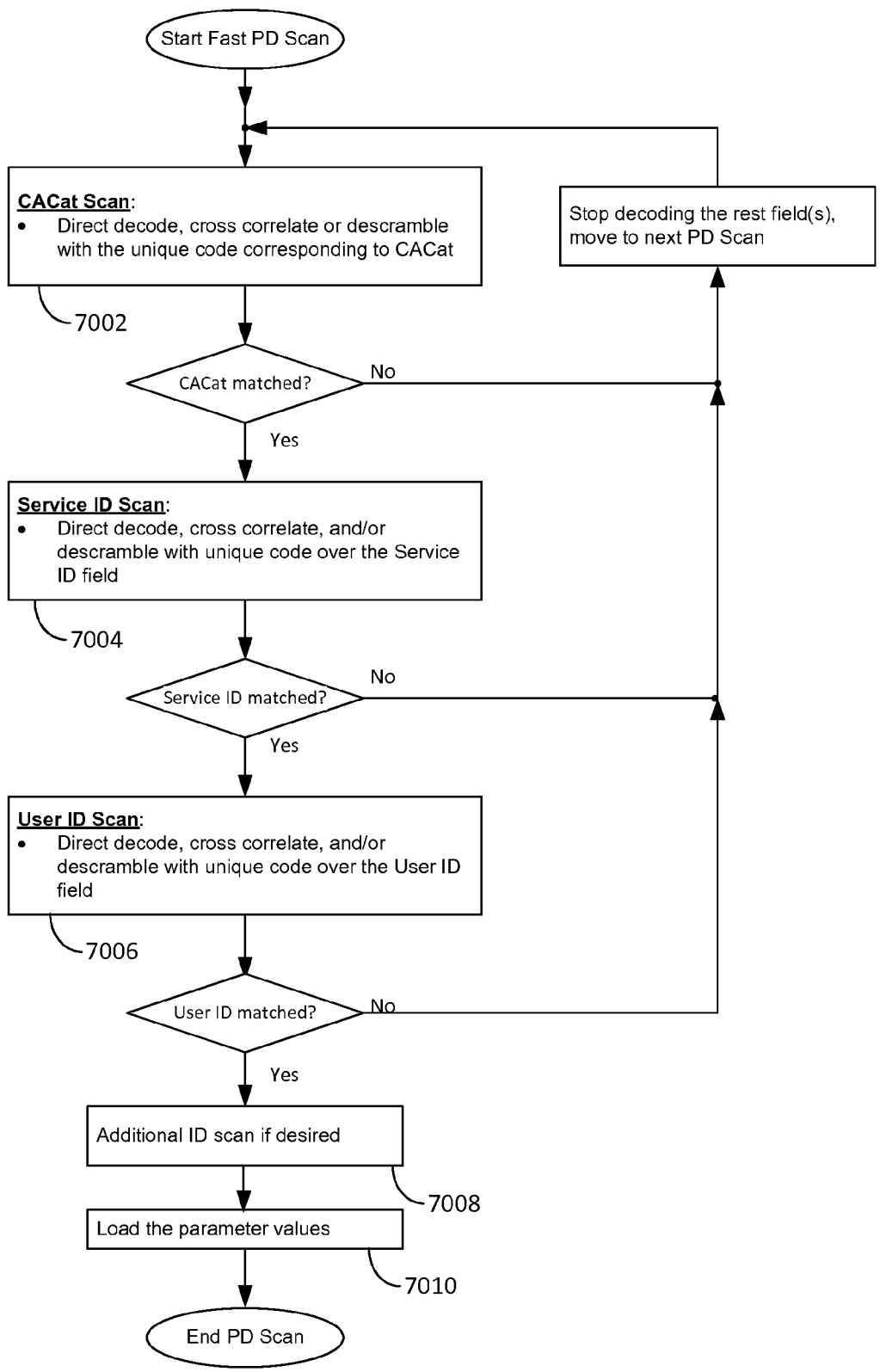
FIG. 70 illustrates an example context-aware fast peer discovery PD scan procedure for service-based discovery.

FIG. 70 illustrates an example context-aware fast peer discovery PD scan procedure. For example, to increase the speed of a PD Scan while ensuring potential candidates are interested in the same services, users, and/or devices as the scanning peer, a hierarchical CAID scanning approach for context aware discovery may be used. One or more of device-based discovery, service-based discovery, and/or user-based discovery may be utilized, although the types of context information and/or the levels of the hierarchy may vary depending on the type of context-based discovery (e.g., the combination of one or more of user-based, service-based, and/or device-based).

For example, a peer may perform a scan of CAIDs being broadcast by other peers in the vicinity. Each peer may broadcast a locally unique CAID that is indicative of context information for the peer. For example, the CAID may be separately decodable than other parts of the message (e.g., payload, other message fields) that may include one or more items of context information, for example in a hierarchal order. An example category of context information that may be included in the CAID may include a CACat. For example, at 7002 a peer may decode the CACat portion of a CAID to determine the CACat of another peer in the vicinity. If the CACat broadcast by the other peer matches a CACat that the scanning peer is interested in, the scanning user may continue evaluating the peer, for example based on other context information included in the CAID. If the CACat does not match a CACat that the scanning peer is interested in, then the scanning peer may determine that the broadcasting peer is not a peer that should be selected, and may begin scanning for other peers and/or decoding other CAID broadcasts. The evaluation to move to the next potential peer may be achieved without fully decoding the entire CAID, instead may be based on decoding the CACat portion of the CAID.

For one or more peers that match the CACat desired by the scanning peer, the scanning peer may evaluate other portions of the CAID to determine additional context information about the potential peer(s). For example, at 7004 the scanning peer may evaluate a service ID portion of the CAID(s). For example, the service-ID portion of the CAIDs may indicate an application or service that the peer is interested in using in a P2P session. If the CAID of the potential peers include a service ID that the scanning peer is interested in, then the scanning peer may continue to evaluate the potential peer(s), for example based on additional criteria. If the service ID indicates a service that the scanning peer is not interested in, the scanning peer may stop evaluating the broadcasting peer and move to a next peer in the scan.

For one or more peers that match the CACat desired by the scanning peer and match the service ID desired by the scanning peer, the scanning peer may evaluate other portions of the CAID to determine additional context information about the potential peer(s). For example, at 7006 the scanning peer may evaluate a user ID portion of the CAID(s). For example, the user-ID portion of the CAIDs may indicate an identity of a user and/or group associated with the peer. If the CAID of the potential peers include a user ID that the scanning peer is interested in, then the scanning peer may continue to evaluate the potential peer(s), for example based on additional criteria. If the user ID portion indicates a user and/or group that the scanning peer is not interested in, the scanning peer may stop evaluating the broadcasting peer and move to a next peer in the scan.

The number of iterations in the context information/CAID portion evaluation process may depend on the application and/or settings of the peer. One or more additional scan/evaluations may be performed at 7008 until a desired level of granularity of context information has been reached. As a result of the fast, context-aware peer discovery process, a peer may be made aware of potential association candidates that share a desired connection context with the scanning peer. The context information may be determined as-needed during the scanning process without having to fully decode the CAID at the beginning of the scan, if desired. Additionally, by obtaining the context information without having to decode payload information (e.g., which may be decoded higher up the protocol stack), additional time savings may be achieved. At 7010, the parameter values and/or context information 7010 may be passed to other portions of the discovery and/or association processes for further evaluation.

Figure 71:
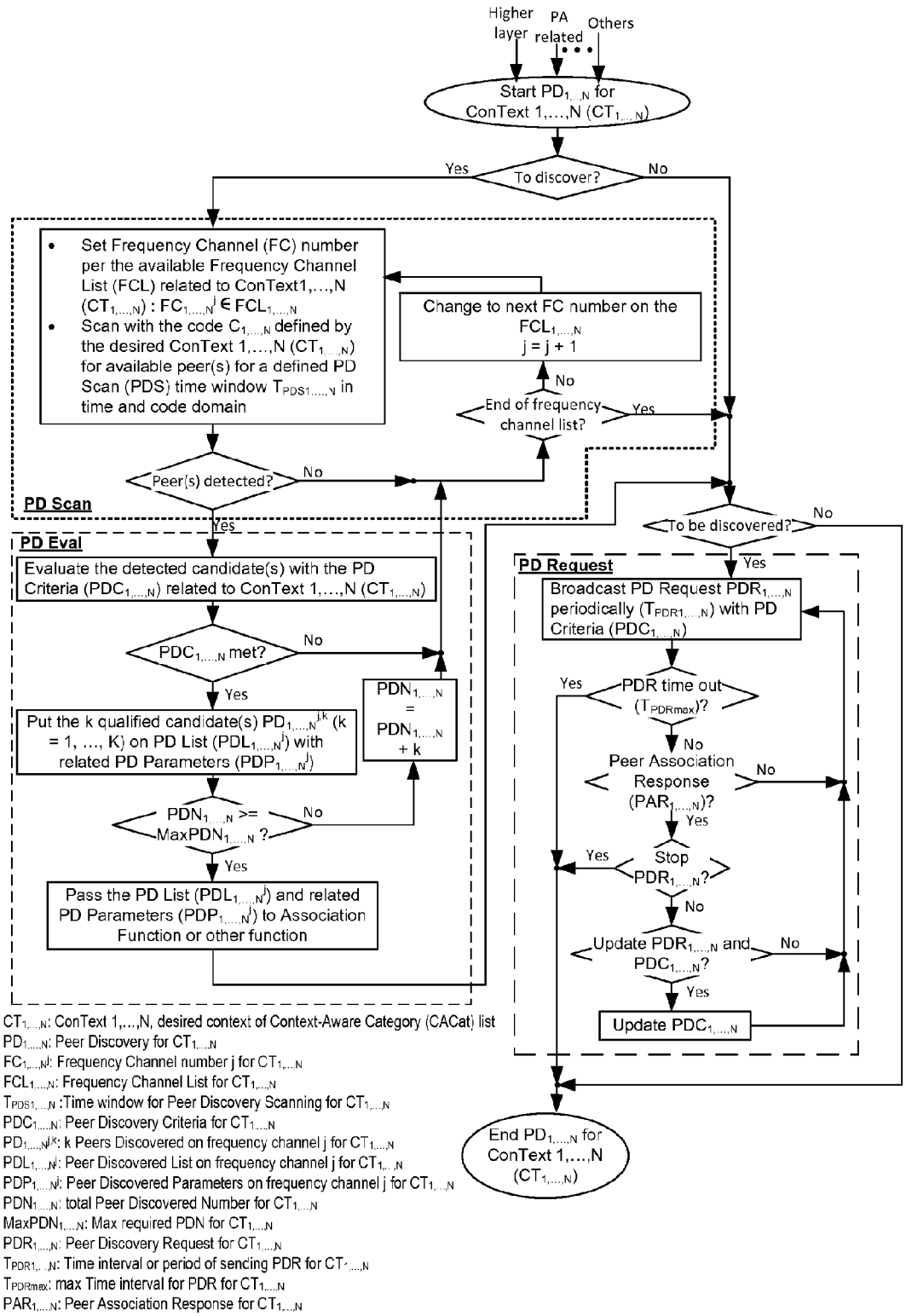
FIG. 71 illustrates an example of a context-aware fast one-to-many peer discovery function.

FIG. 71 illustrates an example of a context-aware fast one-to-many peer discovery function. One-to-many peer discovery may be utilized such that a single peer may discover one or more potential peers (e.g., N potential peers) based on context information provided by one or more of the N peers. For example, the peer may discover N existing peers that are sharing the same context-based service or application (e.g., group communication) and/or N existing peers that request one or more different context-based services or applications (N multi-service or multi-application peers). Context-based, one-to-many peer discovery is similar to context-based peer discovery as described herein, except that the N context-based peers may be discovered in a sequential manner for frequency division and/or time division multiplexing and/or in a parallel (e.g., with N codes corresponding to the N contexts) for code division multiplexing. Thus, a code division multiplexing approach based on the CAIDs (and/or portions thereof) may be an efficient mechanism for evaluating contexts of multiple potential peers in parallel (e.g., the N peers may utilize N orthogonal and/or N PN codes to indicate the appropriate context information).

Figure 72B:
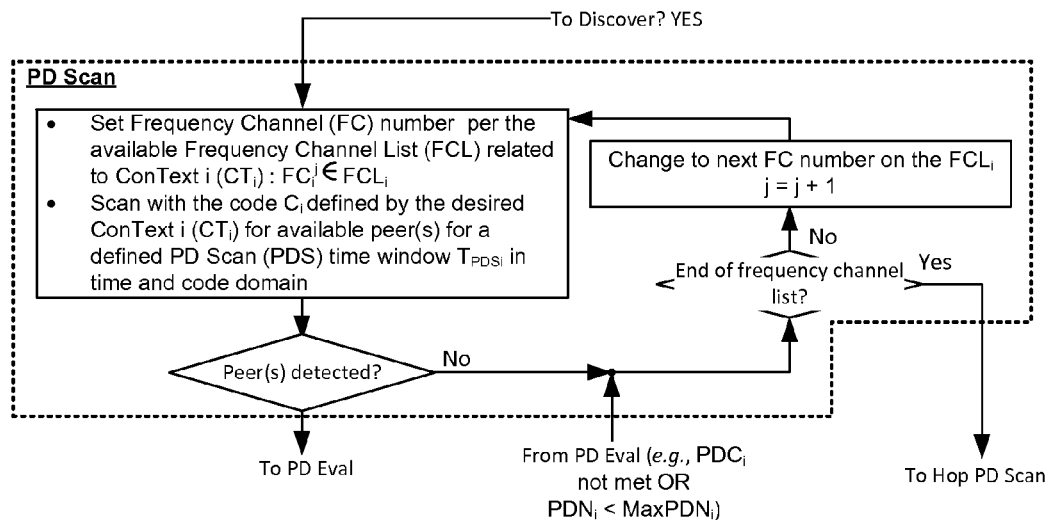
FIG. 72B illustrates an example of a context-aware PD scan.
Figure 72C:
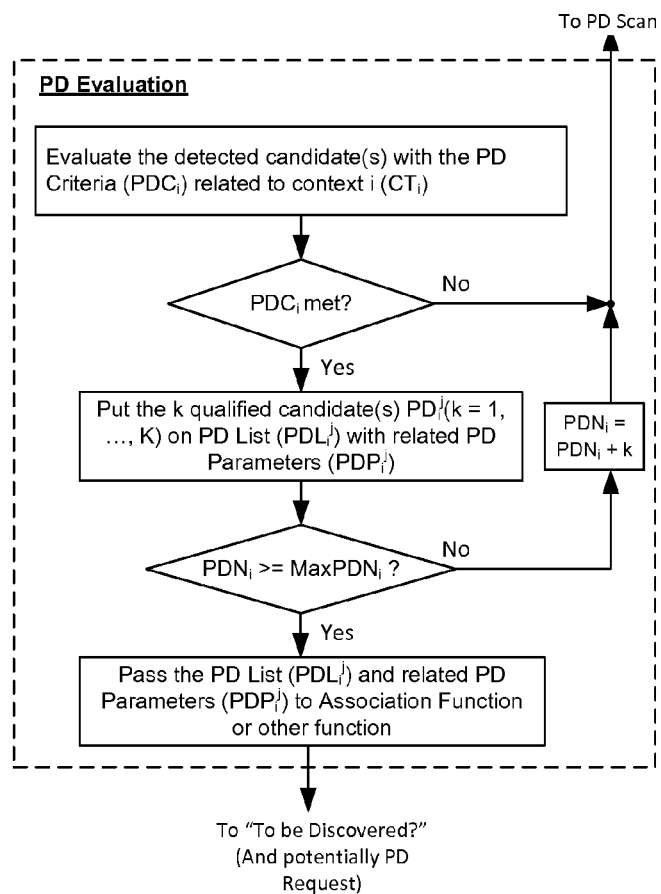
FIG. 72C illustrates an example of a context-aware PD evaluation.
Figure 72D:
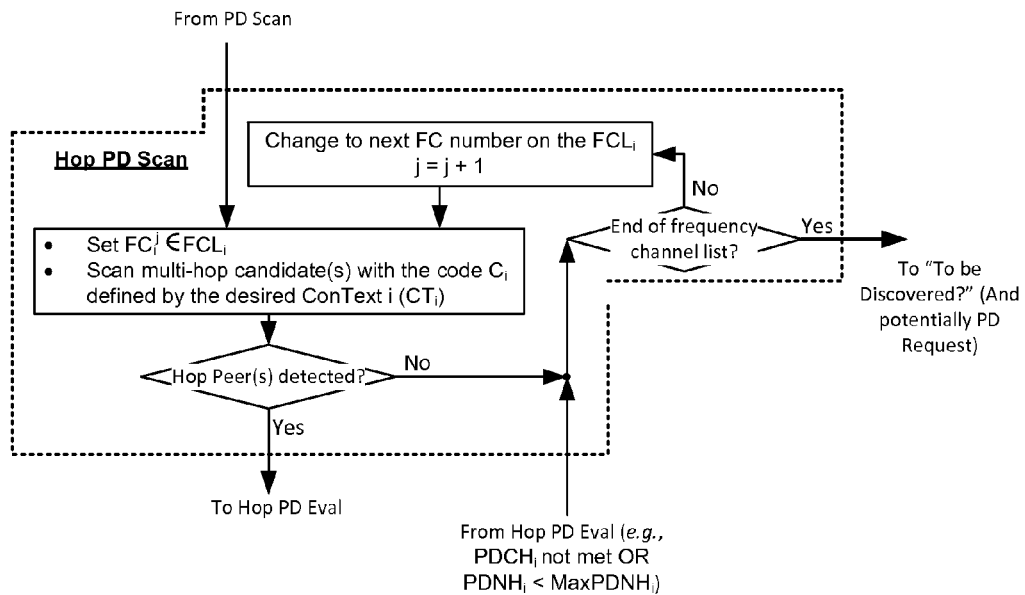
FIG. 72D illustrates an example of a context-aware hop PD scan.
Figure 72E:
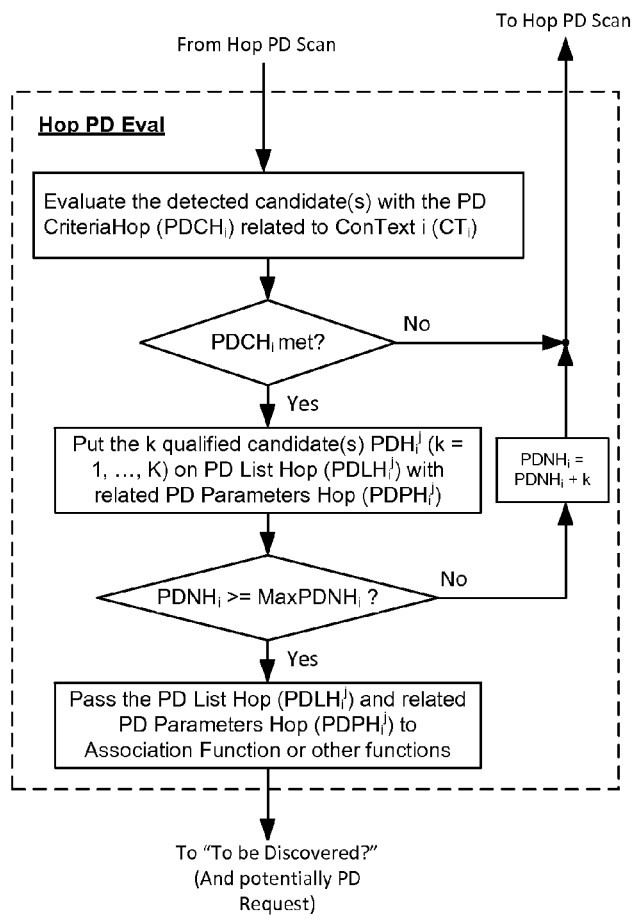
FIG. 72E illustrates an example of a context-aware hop PD evaluation.
Figure 72F:
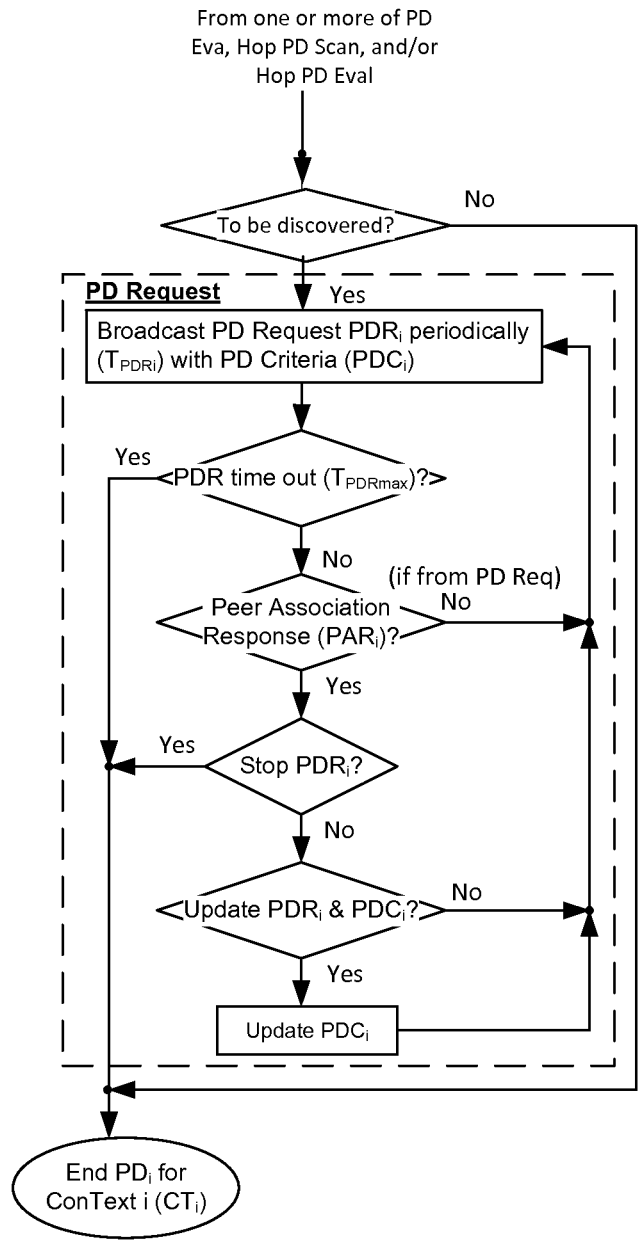
FIG. 72F illustrates an example of a context-aware PD request

In an example, context-aware fast multi-hop peer discovery may be performed. For example, FIGS. 72A-72F illustrate an example process for context-aware fast multi-hop discovery. For example, FIG. 72A illustrates an example context-aware hop discovery process. A context-aware hop discovery process may include one or more of a context-aware PD scan, a context-aware PD evaluation, a PD aware HOP PD scan, and/or a context-aware hope PD evaluation. FIG. 72B illustrates an example of a context-aware PD scan. FIG. 72C illustrates an example of a context-aware PD evaluation. FIG. 72D illustrates an example of a context-aware hop PD scan. FIG. 72E illustrates an example of a context-aware hop PD evaluation. FIG. 72F illustrates an example of a context-aware PD request. Context-aware multi-hop peer discovery is very similar to single hop context-aware peer discovery as described herein, except that a hop discovery (e.g., a hop scan and/or hop evaluation process) may be performed prior to the PD request stage.

For example, a peer may perform a one-hop PD scan (e.g., FIG. 72B) and a one-hop PD evaluation (e.g., FIG. 72C) for the desired context, for example based on detected CAIDs and/or portions thereof. If the peer is unable to discover a sufficient number of peer(s) during one-hop context-aware PD, the peer may perform one or more of a Hop PD scan (e.g., FIG. 72D) and/or context-aware hop PD evaluation (e.g., FIG. 72E) for the desired context. If a peer locates one or more hop-peer(s) behind a hopper (e.g., a relay or intermediary peer or node), the peer may store the relevant peer information and send an indication of the multi-hop peer (and/its associated parameters such as a hop-peer list) to the peer association process when multi-hop peer association may commence. Depending on whether the peer wants to be discoverable, the peer may or may not perform a PD request stage (e.g., FIG. 72F) so that other peers may discover it. The hopper (e.g., the relay or intermediary peer or node) may selected to be the SubVL of the discovered subgroup of the hop-peers.

For multi-hop PD, the peer may iterate the Hop PD stages for multiple levels of Hop PDs. For example, a peer may want to find four peers for a game, and may discover fewer than four peers interested in the game in the proximity of the peer during the one Hop PD stages. The peer may then begin the Hop PD stages to find the hop-peers behind the detected peers and may pass the detected peer list (e.g., peers and hop-peers) and associated parameters to the appropriate peer association process (e.g., single- and/or multi-hop association).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer

* * *

What is claimed:

1. A method for determining context information for one or more peers, the method comprising:
receiving a message, the message comprising a context-aware identifier (CAID), wherein the CAID comprises a plurality of items of context information that are arranged in a hierarchal structure using a plurality of portions of the CAID, wherein each of the plurality of items of context information are associated with a peer, and the CAID comprises at least an indication of an identity of the peer;
determining a first item of context information associated with the peer based on a first portion of the CAID, wherein the first portion of the CAID is separately decodable from at least a second portion of the CAID, and the second portion of the CAID is associated with a second item of context information associated with the peer; and
determining whether to process the second portion of the CAID based on the first item of context information.

2. The method as in claim 1, wherein the first item of context information comprises an indication of a context-aware category (CACat) that is indicative of a type of service.

3. The method as in claim 2, wherein determining whether to process the second portion of the CAID based on the first item of context information comprises:
determining if a local service is associated with the CACat; and
determining to process the second portion of the CAID when it is determined that a local service is associated with the CACat.

4. The method as in claim 3, further comprising:
decoding the second portion of the CAID to determine the second item of context information associated with the peer, wherein the second item of context information comprises an indication of an application associated with the CACat;
determining if a local instance of the application is being executed; and
determining to process a third portion of the CAID when it is determined that the local instance of the application is being executed.

5. The method as in claim 4, further comprising:
decoding the third portion of the CAID to determine a third item of context information associated with the peer, wherein the third item of context information comprises an indication of a user identity for the peer;

determining if a local user is interested in communicating with a peer user associated with the user identity; and determining to continue processing one or more of a fourth portion of the CAID or a payload of the message when it is determined that the local user is interested in communicating with the peer user associated with the user identity.

6. The method as in claim 1, further comprising determining one or more of a user-based association identifier (UAID), a device-based association identifier (DAID), or a service-based association identifier (SAID) for the peer based on one or more items of context information indicated by the CAID.

7. The method as in claim 1, wherein the CAID comprises a hierarchal identifier and a lower level of the hierarchal identifier is decoded on condition a higher level of the hierarchal identifier indicates a service that is of interest to a decoding peer.

8. The method as in claim 1, further comprising attempting to associate with the peer based on the one or more items of context information associated with the peer comprised in the CAID.

9. The method as in claim 1, wherein the CAID is encoded using one or more of a orthogonal code or pseudo-random number (PN) sequence derived from the one or more items of context information.

10. A peer device for discovering potential peers based on context information, the peer device comprising a processor configured to:
    perform a peer discovery (PD) scan based on one or more desired items of context information;
    identify a context-aware identifier (CAID) for a potential peer during the PD scan, wherein the CAID comprises a plurality of portions, and each portion is associated with one or more items of context information associated with the potential peer, at least one of the items of context information comprising an indication of an identity of the potential peer;
    process the CAID in a hierarchal manner, wherein the peer device is configured to use a first item of context information encoded in a first portion of the CAID to determine whether or not to attempt to decode at least a second portion of the CAID, the second portion of the CAID being associated with a second portion of context information; and
    perform a PD evaluation of the potential peer using the one or more items of context information associated with the potential peer to determine whether to initiate an association procedure with the potential peer.

11. The peer device as in claim 10, wherein the processor is further configured to perform a PD request procedure in order to be discovered by the potential peer based on determining that the one or more items of context information associated with the potential peer match at least one item of context information for a local peer associated with the peer device.

12. The peer device as in claim 10, wherein the processor is configured to perform the PD scan based on the one or more desired items of context information by being configured to determine whether one or more of a plurality of broadcast CAIDs are associated with the desired items of context information.

13. The peer device as in claim 12, wherein the plurality of broadcast CAIDs are broadcast using one or more of code division multiplexing, time division multiplexing, or frequency division multiplexing based on context information included in the plurality of broadcast CAIDs.

14. A wireless transmit receive unit (WTRU), the WTRU comprising a processor configured to:
    receive a message during a context-aware peer discovery procedure, wherein the message comprises a context-aware identifier (CAID) associated with a potential peer, and the CAID is a hierarchal identifier that arranges a plurality of items of context information associated with the potential peer into separately decodable portions of the CAID;
    process a first portion of the CAID to determine a first item of context information associated with the potential peer, wherein the first item of context information comprises indication of a category of service that the potential peer is requesting using the CAID; and
    determine whether or not to process a second portion of the CAID based on the category of service indicated by the first portion of the CAID, wherein the second portion of the CAID comprises an indication of a specific application associated with the category of service.

15. The WTRU as in claim 14, wherein the processor is further configured to generate a locally unique context-aware association identification (AID) for an association with the peer corresponding to the CAID, wherein the AID is maintained after disassociation.

16. The WTRU as in claim 14, wherein the CAID is broadcast by a peer that is a virtual leader for a service associated with the CAID.

17. The WTRU as in claim 16, wherein the processor is further configured to perform one or more of a context-aware association update, a context-aware re-association, or a context-aware disassociation with a given peer in order to change the virtual leader for the service associated with the CAID.

18. The WTRU as in claim 14, wherein the processor is further configured to:
    send an first association request message to the potential peer, wherein the first association request message comprises a second CAID, and the second CAID comprises one or more of first context information regarding the potential peer, first context information regarding the WTRU, or first context information regarding a channel to be used for a data session;
    receive an first association response message from the potential peer, wherein the first association response message comprises a third CAID, and the third CAID comprises one or more of second context information regarding the potential peer, second context information regarding the WTRU, or second context information regarding a channel to be used for a data session; and
    associate with the potential peer based on the first association request message and the first association response message.

19. The WTRU as in claim 14, wherein the processor is configured to associate with the peer corresponding to the CAID using an intermediary or relay peer.

20. The WTRU as in clam 19, wherein the intermediary or relay peer comprises one of a Node-B (NB) or an evolved Node-B (eNB) of a third generation partnership (3GPP) radio access network (RAN).

* * * * *